United States Patent
Hajj et al.

(10) Patent No.: US 11,796,334 B2
(45) Date of Patent: Oct. 24, 2023

(54) USER INTERFACES FOR PROVIDING NAVIGATION DIRECTIONS

(71) Applicant: Apple Inc., Cupertino, CA (US)

(72) Inventors: Usama M. Hajj, London (GB); Darious LeJuan Allen, San Francisco, CA (US); Vincent Patrick Arroyo, Union City, CA (US); Giovanni S. Luis, Manhattan Beach, CA (US); Hollie Renee Figueroa, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/030,091

(22) Filed: Sep. 23, 2020

(65) Prior Publication Data

US 2021/0356287 A1   Nov. 18, 2021

Related U.S. Application Data

(60) Provisional application No. 63/025,688, filed on May 15, 2020.

(51) Int. Cl.
*G01C 21/36* (2006.01)
*G01C 21/34* (2006.01)
*G01C 21/00* (2006.01)

(52) U.S. Cl.
CPC ..... *G01C 21/3632* (2013.01); *G01C 21/3423* (2013.01); *G01C 21/3461* (2013.01); *G01C 21/3492* (2013.01); *G01C 21/362* (2013.01); *G01C 21/367* (2013.01); *G01C 21/3629* (2013.01); *G01C 21/3652* (2013.01);
(Continued)

(58) Field of Classification Search
CPC ............ G01C 21/3632; G01C 21/3423; G01C 21/3461; G01C 21/3492; G01C 21/362; G01C 21/3629; G01C 21/3652; G01C 21/3655; G01C 21/367; G01C 21/3691; G01C 21/3826
See application file for complete search history.

(56) References Cited

U.S. PATENT DOCUMENTS

| | | |
|---|---|---|
| 5,311,434 A | 5/1994 | Tamai |
| 5,790,976 A | 8/1998 | Boll et al. |
| 5,857,066 A | 1/1999 | Wyche et al. |

(Continued)

FOREIGN PATENT DOCUMENTS

| | | |
|---|---|---|
| DE | 102007050021 A1 | 4/2009 |
| EP | 1275936 A2 | 1/2003 |

(Continued)

OTHER PUBLICATIONS

Final Office Action received for U.S. Appl. No. 16/460,507, dated Aug. 11, 2020, 37 pages.
(Continued)

*Primary Examiner* — Rachid Bendidi
*Assistant Examiner* — Abdalla A Khaled
(74) *Attorney, Agent, or Firm* — Kubota & Basol LLP

(57) ABSTRACT

In some embodiments, an electronic device displays indications of safety characteristics of one or more navigational segments of a navigation route. In some embodiments, an electronic device displays navigation options. In some embodiments, an electronic device presents indications of navigation directions while navigation along a route.

24 Claims, 52 Drawing Sheets

(52) U.S. Cl.
CPC ..... *G01C 21/3655* (2013.01); *G01C 21/3691* (2013.01); *G01C 21/3826* (2020.08)

(56) References Cited

U.S. PATENT DOCUMENTS

| | | | |
|---|---|---|---|
| 5,948,040 A | 9/1999 | Delorme et al. | |
| 6,181,991 B1 | 1/2001 | Kondo et al. | |
| 6,188,957 B1* | 2/2001 | Bechtolsheim | G01C 21/3407 |
| | | | 701/1 |
| 6,323,846 B1 | 11/2001 | Westerman et al. | |
| 6,340,936 B1 | 1/2002 | Mcgaffey et al. | |
| 6,570,557 B1 | 5/2003 | Westerman et al. | |
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,212,924 B1* | 12/2015 | Salowitz | G08G 1/096883 |
| 9,348,458 B2 | 5/2016 | Hotelling et al. | |
| 9,417,933 B2 | 8/2016 | Narayanan et al. | |
| 9,933,937 B2 | 4/2018 | Lemay et al. | |
| 10,184,800 B2* | 1/2019 | Fowe | G01C 21/32 |
| 10,360,518 B2 | 7/2019 | Hirose et al. | |
| 10,371,536 B2* | 8/2019 | König | G01C 21/3484 |
| 10,424,195 B2 | 9/2019 | Kim et al. | |
| 10,488,215 B1 | 11/2019 | Yu | |
| 10,699,347 B1* | 6/2020 | Slusar | G01C 21/3461 |
| 10,760,917 B2* | 9/2020 | Moore | G01C 21/3492 |
| 11,015,952 B1* | 5/2021 | Lyle | G01C 21/367 |
| 11,092,459 B2 | 8/2021 | Hoffman et al. | |
| 11,196,665 B1 | 12/2021 | Pereira et al. | |
| 11,391,597 B2 | 7/2022 | Teske | |
| 2002/0015024 A1 | 2/2002 | Westerman et al. | |
| 2002/0082773 A1 | 6/2002 | Ikeuchi et al. | |
| 2003/0178482 A1 | 9/2003 | Kisliakov | |
| 2005/0190059 A1 | 9/2005 | Wehrenberg | |
| 2005/0193117 A1 | 9/2005 | Morris | |
| 2005/0222766 A1 | 10/2005 | Burch et al. | |
| 2006/0017692 A1 | 1/2006 | Wehrenberg et al. | |
| 2006/0033724 A1 | 2/2006 | Chaudhri et al. | |
| 2006/0190167 A1 | 8/2006 | Inukai | |
| 2006/0197753 A1 | 9/2006 | Hotelling | |
| 2007/0088500 A1 | 4/2007 | Spinelli | |
| 2008/0120171 A1 | 5/2008 | Ikeuchi et al. | |
| 2008/0136612 A1 | 6/2008 | Machii et al. | |
| 2008/0195314 A1 | 8/2008 | Green | |
| 2008/0262714 A1 | 10/2008 | Abramovich | |
| 2009/0027399 A1 | 1/2009 | Sato et al. | |
| 2009/0112462 A1 | 4/2009 | Lo | |
| 2009/0271109 A1 | 10/2009 | Lee et al. | |
| 2010/0036599 A1* | 2/2010 | Froeberg | G01C 21/3461 |
| | | | 701/532 |
| 2010/0131190 A1 | 5/2010 | Terauchi et al. | |
| 2010/0321406 A1 | 12/2010 | Iwase et al. | |
| 2011/0074350 A1 | 3/2011 | Kocher | |
| 2011/0112710 A1 | 5/2011 | Meyer-Ebeling et al. | |
| 2011/0172909 A1 | 7/2011 | Kahn et al. | |
| 2011/0177845 A1* | 7/2011 | Fasold | G09B 29/007 |
| | | | 715/764 |
| 2011/0178698 A1 | 7/2011 | Aben et al. | |
| 2011/0224852 A1 | 9/2011 | Profitt-Brown et al. | |
| 2011/0238457 A1 | 9/2011 | Mason et al. | |
| 2011/0246055 A1 | 10/2011 | Huck et al. | |
| 2012/0004841 A1 | 1/2012 | Schunder | |
| 2012/0066035 A1 | 3/2012 | Stanger et al. | |
| 2012/0136567 A1 | 5/2012 | Wang et al. | |
| 2012/0179521 A1 | 7/2012 | Nelson | |
| 2012/0253596 A1 | 10/2012 | Ibrahim et al. | |
| 2012/0259541 A1* | 10/2012 | Downey | G01C 21/20 |
| | | | 701/433 |
| 2012/0271547 A1 | 10/2012 | Mori | |
| 2012/0324228 A1 | 12/2012 | Padhye et al. | |
| 2013/0024112 A1 | 1/2013 | Tate, Jr. | |
| 2013/0060462 A1 | 3/2013 | Hansen | |
| 2013/0116919 A1 | 5/2013 | Furuhata et al. | |
| 2013/0124006 A1 | 5/2013 | Anantha et al. | |
| 2013/0132019 A1* | 5/2013 | Suzuno | G01C 21/32 |
| | | | 702/94 |
| 2013/0179057 A1 | 7/2013 | Fisher et al. | |
| 2013/0226443 A1 | 8/2013 | Scofield et al. | |
| 2013/0297201 A1* | 11/2013 | Van Hende | G01C 21/3407 |
| | | | 701/425 |
| 2013/0304377 A1* | 11/2013 | Van Hende | G01C 21/20 |
| | | | 701/533 |
| 2013/0328861 A1* | 12/2013 | Arikan | G01C 21/3815 |
| | | | 345/419 |
| 2013/0332070 A1 | 12/2013 | Fleizach et al. | |
| 2013/0345959 A1 | 12/2013 | Van Os et al. | |
| 2013/0345975 A1 | 12/2013 | Vulcano et al. | |
| 2014/0107919 A1 | 4/2014 | Venkatraman et al. | |
| 2014/0180582 A1 | 6/2014 | Pontarelli et al. | |
| 2014/0197924 A1 | 7/2014 | Wegelin et al. | |
| 2014/0214261 A1 | 7/2014 | Ramamoorthy et al. | |
| 2014/0244110 A1 | 8/2014 | Tharaldson et al. | |
| 2014/0365120 A1 | 12/2014 | Vulcano et al. | |
| 2014/0365122 A1 | 12/2014 | Mcgavran et al. | |
| 2015/0015513 A1 | 1/2015 | Kwak et al. | |
| 2015/0032366 A1 | 1/2015 | Man et al. | |
| 2015/0051829 A1 | 2/2015 | Gearhart et al. | |
| 2015/0081210 A1* | 3/2015 | Yeh | G06F 3/0481 |
| | | | 701/428 |
| 2015/0125042 A1 | 5/2015 | Haden et al. | |
| 2015/0192426 A1 | 7/2015 | Foster et al. | |
| 2015/0285652 A1 | 10/2015 | Peri et al. | |
| 2015/0300823 A1 | 10/2015 | Kahn et al. | |
| 2015/0338223 A1 | 11/2015 | Letz | |
| 2015/0345958 A1 | 12/2015 | Graham | |
| 2016/0047666 A1* | 2/2016 | Fuchs | G01C 21/3697 |
| | | | 701/423 |
| 2016/0078037 A1 | 3/2016 | Ziezold et al. | |
| 2016/0102992 A1 | 4/2016 | Otero Diaz et al. | |
| 2016/0124707 A1 | 5/2016 | Ermilov et al. | |
| 2016/0138927 A1 | 5/2016 | Ettinger et al. | |
| 2016/0187152 A1 | 6/2016 | Tanizaki et al. | |
| 2016/0210834 A1 | 7/2016 | Dayal | |
| 2016/0252363 A1 | 9/2016 | Tertoolen et al. | |
| 2016/0290818 A1* | 10/2016 | Kim | G01C 21/3423 |
| 2016/0313138 A1 | 10/2016 | Chupakhin | |
| 2016/0356613 A1 | 12/2016 | Hajj et al. | |
| 2016/0375306 A1* | 12/2016 | Gu | G01C 21/32 |
| | | | 701/430 |
| 2017/0001649 A1 | 1/2017 | Dickow | |
| 2017/0023373 A1 | 1/2017 | Buchholz et al. | |
| 2017/0061708 A1 | 3/2017 | Sol | |
| 2017/0074669 A1* | 3/2017 | Newlin | G01C 21/3423 |
| 2017/0176195 A1 | 6/2017 | Rajagopalan et al. | |
| 2017/0276502 A1* | 9/2017 | Fischer | G01C 21/3614 |
| 2017/0328734 A1 | 11/2017 | Devkar et al. | |
| 2018/0058868 A1 | 3/2018 | Kang et al. | |
| 2018/0080788 A1* | 3/2018 | Belvadi Shankaraiah | |
| | | | G01C 21/3484 |
| 2018/0088966 A1 | 3/2018 | Chourasiya | |
| 2018/0100742 A1 | 4/2018 | Greenwood et al. | |
| 2018/0113606 A1 | 4/2018 | Crawford et al. | |
| 2018/0129276 A1 | 5/2018 | Nguyen et al. | |
| 2018/0143029 A1 | 5/2018 | Nikulin et al. | |
| 2018/0266842 A1 | 9/2018 | Di Censo et al. | |
| 2019/0003849 A1* | 1/2019 | Pahwa | G01C 21/362 |
| 2019/0178660 A1* | 6/2019 | Greenberg | G01C 21/3461 |
| 2019/0178672 A1* | 6/2019 | Woolley | G01C 21/3635 |
| 2019/0219410 A1 | 7/2019 | Burgess et al. | |
| 2019/0219411 A1 | 7/2019 | Christen et al. | |
| 2019/0266890 A1* | 8/2019 | Lei | G08G 1/096716 |
| 2019/0293447 A1* | 9/2019 | O'Beirne | G09B 29/008 |
| 2019/0303088 A1 | 10/2019 | Yuan | |

(56) References Cited

U.S. PATENT DOCUMENTS

| | | | |
|---|---|---|---|
| 2019/0383637 A1 | 12/2019 | Teske | |
| 2020/0012391 A1 | 1/2020 | Fleizach et al. | |
| 2020/0026946 A1 | 1/2020 | Hu et al. | |
| 2020/0096358 A1 | 3/2020 | Dal Bo et al. | |
| 2020/0200551 A1* | 6/2020 | Fischer | G01C 21/343 |
| 2020/0273333 A1 | 8/2020 | Elshenawy | |
| 2021/0004627 A1 | 1/2021 | Chen et al. | |
| 2021/0102819 A1* | 4/2021 | Gallo | G01C 21/3407 |
| 2021/0213959 A1* | 7/2021 | Shahriari | G05D 1/0214 |
| 2021/0233393 A1* | 7/2021 | Sievers | G08G 1/081 |
| 2021/0302175 A1* | 9/2021 | Pishdadian | G01C 21/3626 |
| 2021/0356281 A1 | 11/2021 | Hajj | |
| 2021/0356288 A1 | 11/2021 | Hajj et al. | |
| 2021/0374285 A1 | 12/2021 | D'agostino | |
| 2021/0389142 A1 | 12/2021 | Kim et al. | |
| 2021/0389143 A1 | 12/2021 | Kim et al. | |
| 2021/0389144 A1 | 12/2021 | Kim et al. | |
| 2022/0089177 A1* | 3/2022 | Wang | B60W 60/001 |
| 2022/0221292 A1* | 7/2022 | Putnam | G06N 20/00 |
| 2022/0390248 A1 | 12/2022 | Apuy et al. | |
| 2022/0391074 A1 | 12/2022 | Apuy et al. | |

FOREIGN PATENT DOCUMENTS

| | | |
|---|---|---|
| EP | 2378249 A1 | 10/2011 |
| EP | 2721844 A2 | 4/2014 |
| EP | 2825902 A1 | 1/2015 |
| EP | 3104122 A1 | 12/2016 |
| EP | 3343472 A1 | 7/2018 |
| EP | 3534119 A1 | 9/2019 |
| KR | 10-2013-0033948 A | 4/2013 |
| WO | 2012/141827 A2 | 10/2012 |
| WO | 2013/138183 A1 | 9/2013 |
| WO | 2013/169849 A2 | 11/2013 |
| WO | 2014/105276 A1 | 7/2014 |
| WO | 2016/090282 A1 | 6/2016 |

OTHER PUBLICATIONS

Final Office Action received for U.S. Appl. No. 16/460,507, dated Aug. 18, 2021, 40 pages.
Final Office Action received for U.S. Appl. No. 17/028,638, dated Mar. 22, 2021, 15 pages.
International Search Report received for PCT Patent Application No. PCT/US2021/032640, dated Oct. 13, 2021, 7 pages.
International Search Report received for PCT Patent Application No. PCT/US2021/037124, dated Jan. 21, 2022, 9 pages.
Non Final Office Action received for U.S. Appl. No. 17/030,131, dated Apr. 4, 2022, 51 pages.
Non-Final Office Action received for U.S. Appl. No. 16/460,507, dated Apr. 6, 2020, 37 pages.
Non-Final Office Action received for U.S. Appl. No. 16/460,507, dated Feb. 22, 2022, 50 pages.
Non-Final Office Action received for U.S. Appl. No. 16/460,507, dated Feb. 25, 2021, 37 pages.
Non-Final Office Action received for U.S. Appl. No. 17/028,638, dated Nov. 2, 2021, 17 pages.
Non-Final Office Action received for U.S. Appl. No. 17/028,638, dated Nov. 16, 2020, 16 pages.
Non-Final Office Action received for U.S. Appl. No. 17/028,675, dated Jan. 20, 2022, 13 pages.
Non-Final Office Action received for U.S. Appl. No. 17/030,165, dated Feb. 1, 2022, 30 pages.
Non-Final Office Action received for U.S. Appl. No. 17/485,344, dated Dec. 7, 2021, 40 pages.
Google, "Biking Directions on Google Maps", Available online at: <https://www.youtube.com/watch?v=JN5_NBSu7LW>, [Retrieved Mar. 7, 2022], Mar. 10, 2010, 1 page.
Non-Final Office Action received for U.S. Appl. No. 17/028,638, dated Jun. 7, 2022, 20 Pages.
Notice of Allowance received for U.S. Appl. No. 17/485,344, dated Apr. 19, 2022, 9 Pages.
Restriction Requirement received for U.S. Appl. No. 17/028,322, dated Apr. 13, 2022, 6 Pages.
Corrected Notice of Allowance received for U.S. Appl. No. 17/485,344, dated Oct. 3, 2022, 3 pages.
Final Office Action received for U.S. Appl. No. 17/028,638, dated Dec. 7, 2022, 24 pages.
Final Office Action received for U.S. Appl. No. 17/030,165, dated Nov. 15, 2022, 50 pages.
International Search Report received for PCT Patent Application No. PCT/US2022/072600, dated Sep. 2, 2022, 5 pages.
Notice of Allowance received for U.S. Appl. No. 16/460,507, dated Sep. 15, 2022, 35 Pages.
Notice of Allowance received for U.S. Appl. No. 17/030,131, dated Dec. 7, 2022, 11 pages.
Notice of Allowance received for U.S. Appl. No. 17/485,344, dated Sep. 9, 2022, 9 pages.
Baum et al., "Shortest Feasible Paths with Charging Stops for Battery Electric Vehicles", ARXIV.org, Cornell University Library, Available online at: <https://doi.org/10.48550/arXiv.1910.09812>, [Retrieved Sep. 8, 2022], Oct. 22, 2019, pp. 1-43.
Zündorf, Tobias, "Electric Vehicle Routing with Realistic Recharging Models", Available online at: <https://i11www.iti.kit.edu/_media/teaching/theses/ma-zuendorf-14.pdf>, [Retrieved Aug. 22, 2022], Nov. 24, 2014, 94 pages.
ABRP 3.7 app, Apple store release notes, Available online at: <https://web.archive.org/web/20191225192637/https://apps.apple.com/us/app/a-better-routeplanner-abrp/id1490860521>, 2019, 16 pages.
Final Office Action received for U.S. Appl. No. 17/028,675, dated Jul. 11, 2022, 14 pages.
Non-Final Office Action received for U.S. Appl. No. 17/028,322, dated Jul. 28, 2022, 22 Pages.
Waze, Available online at: <https://waze.uservoice.com/forums/59223-waze-suggestion-box/suggestions/803059-add-pause-option-for-stops?page=3&per_page=20>, 2010, 7 pages.
Electrek ,Tesla launches a new web-based trip planning tool using the Supercharger network, Available online at: <https://electrek.co/2018/01/04/ tesla-launches-new-web-based-trip-planning-tool-supercharger-network/>, 2018, 6 pages.
enrg.io , What are the Best EV Route Planners?, Available online at: <https://enrg.io/what-are-the-best-ev-route-planners/>, 2019, 10 pages.
Jon, Fingas ,Tesla's in-car trip planning tool is available on the web, Engadget, Available online at: <https://www.engadget.com/2018-01-04- tesla-trip-planner-available-on-web.html#:-:text=There's%20now%20a%20better%20way,particular%20Tesla%20you're%20driving.>, 2018, 5 pages.
Final Office Action received for U.S. Appl. No. 17/028,322, dated Jan. 3, 2023, 22 pages.
Notice of Allowance received for U.S. Appl. No. 17/028,322, dated Apr. 18, 2023, 8 pages.
Notice of Allowance received for U.S. Appl. No. 17/028,638, dated Apr. 4, 2023, 26 pages.
Notice of Allowance received for U.S. Appl. No. 17/028,675, dated Jan. 13, 2023, 9 pages.
Welcome to EV Trip Planner Version 2.8, VTripPlanner, Available Online at: <https://web.archive.org/web/20180807120132/https://www.evtripplanner.com/planner/2-8/>, 2018, 3 pages.

\* cited by examiner

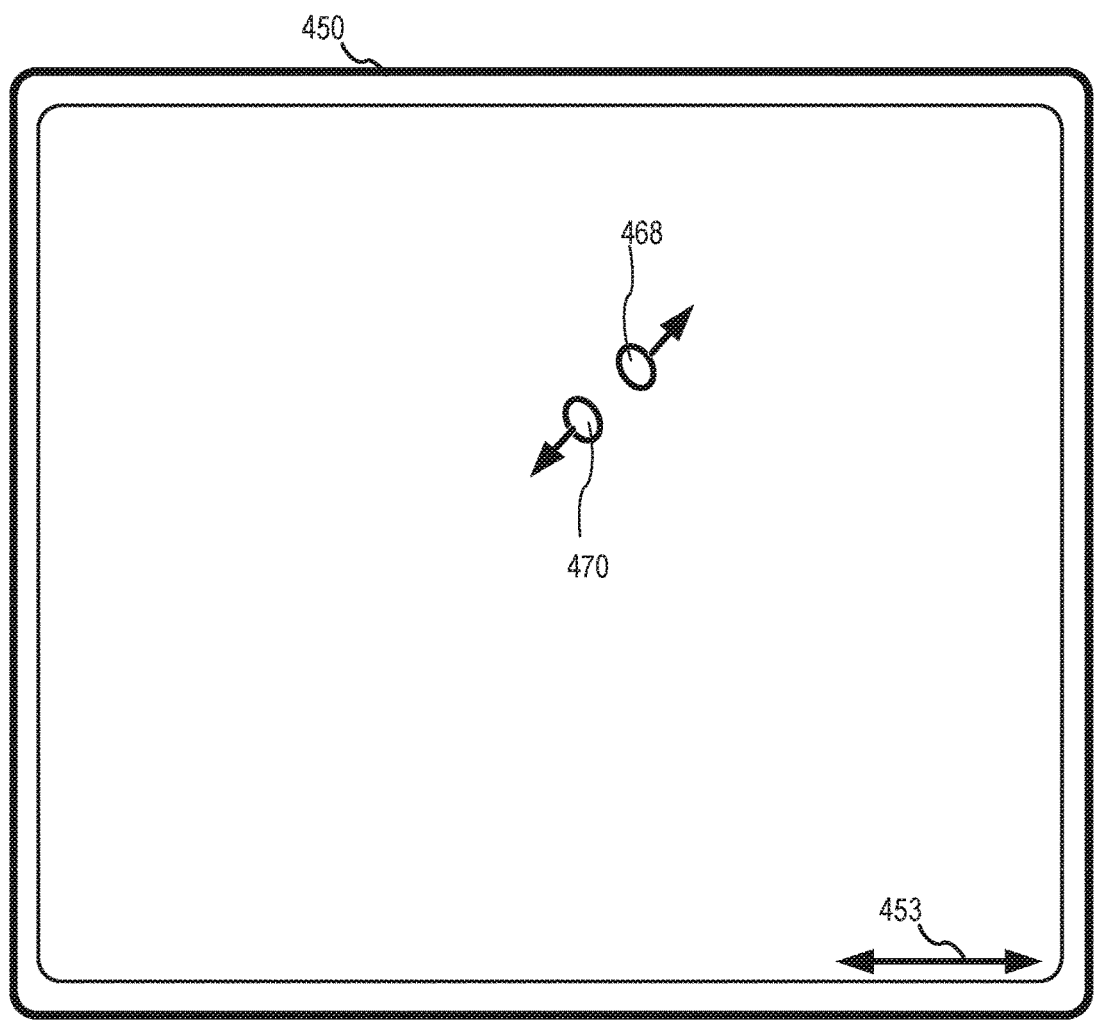
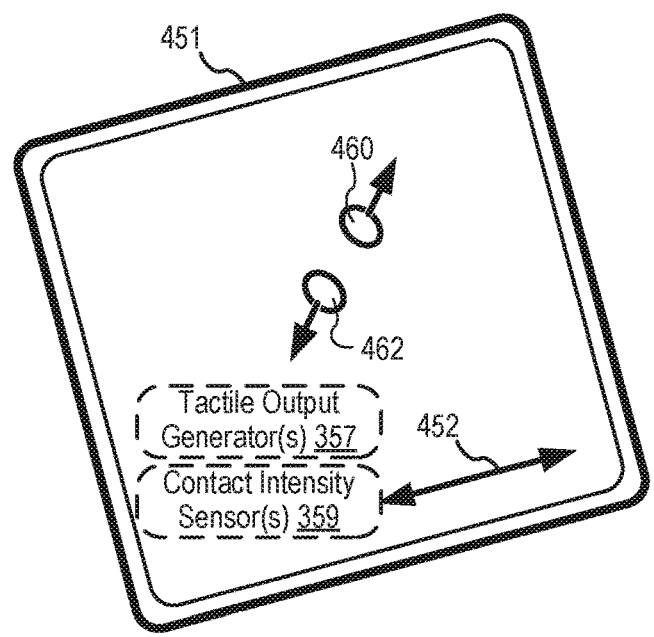
*FIG. 4B*

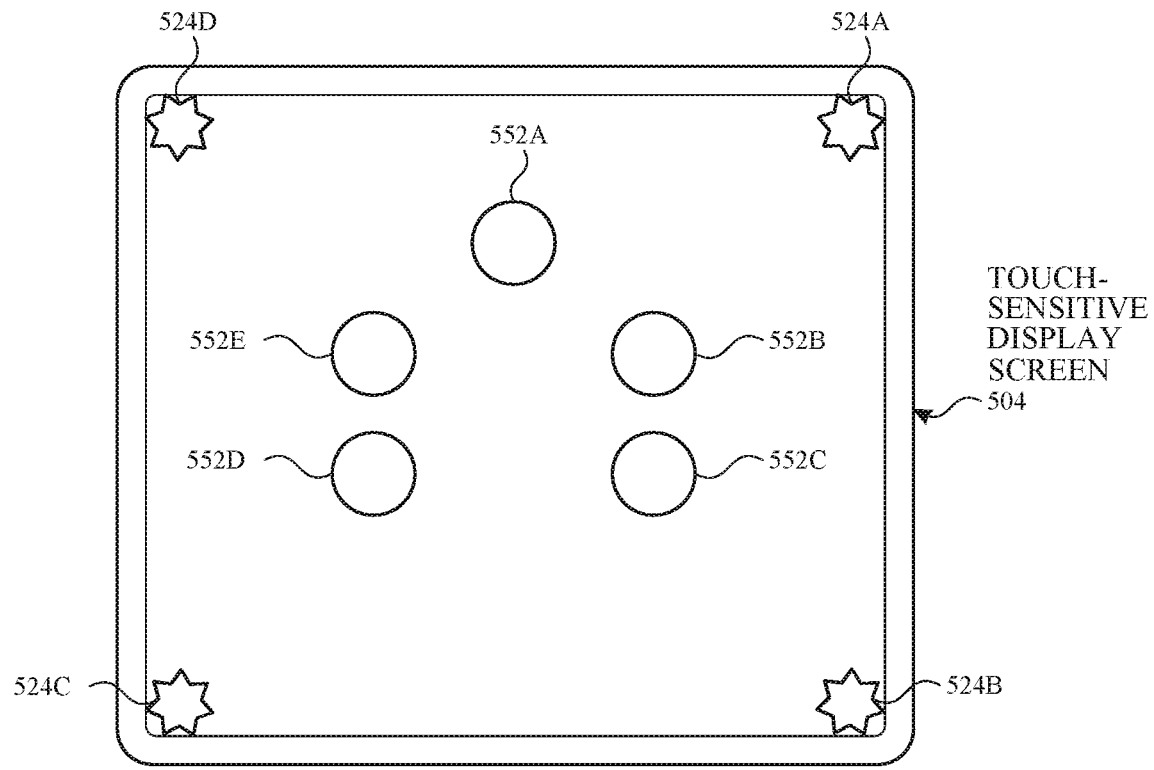
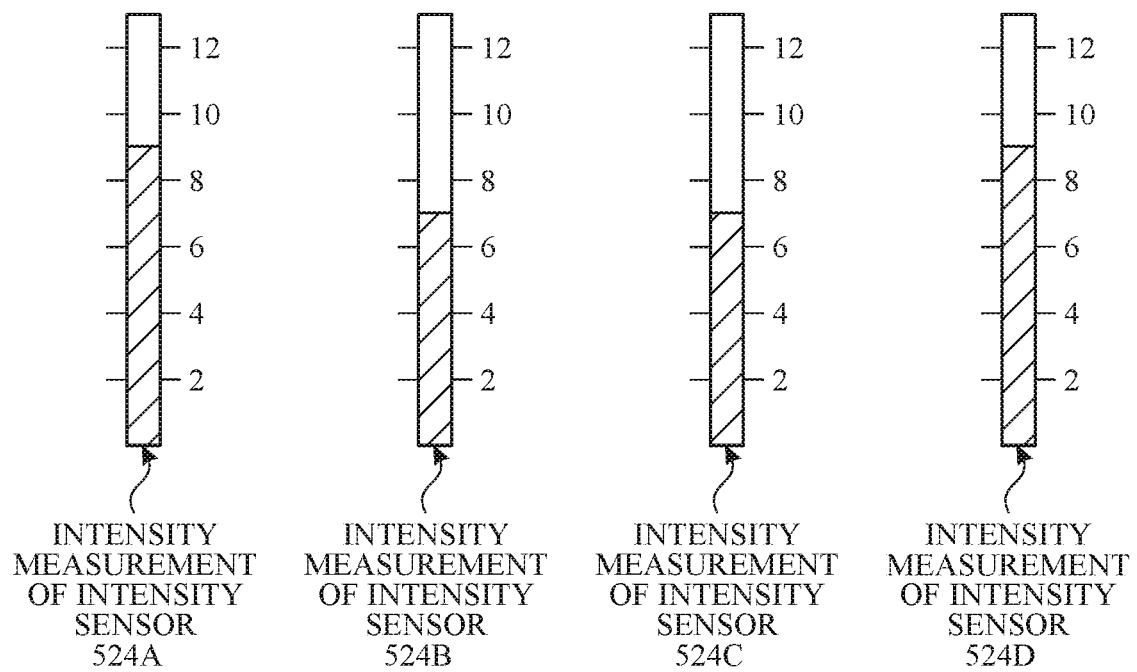
FIG. 5C

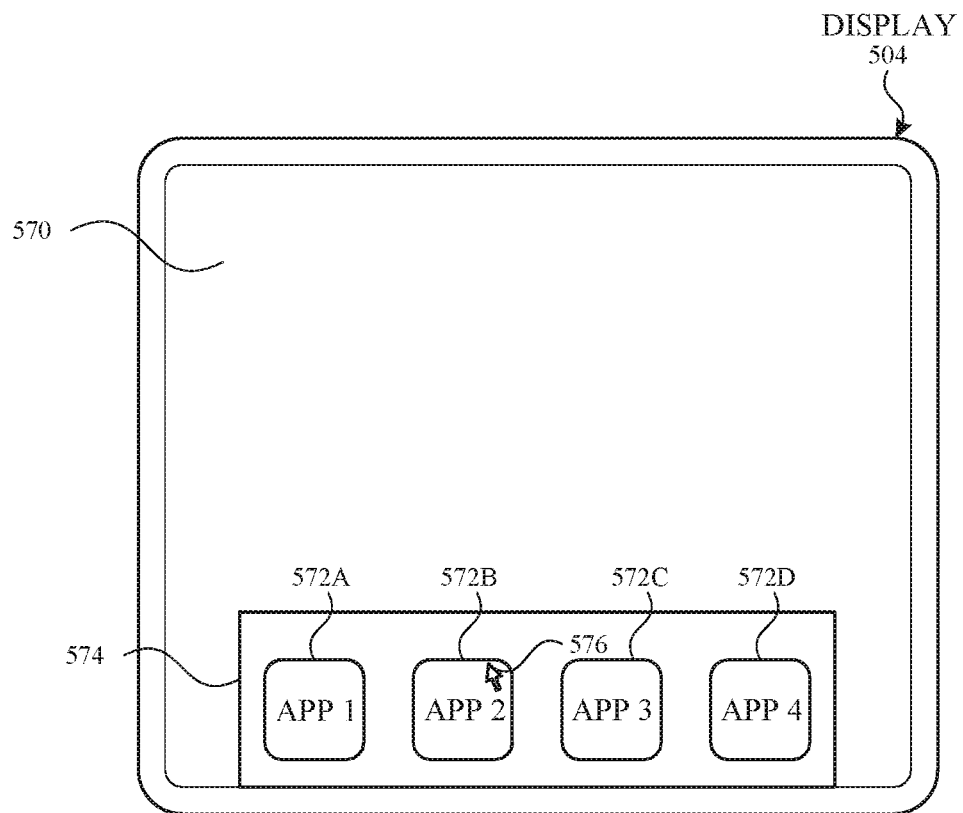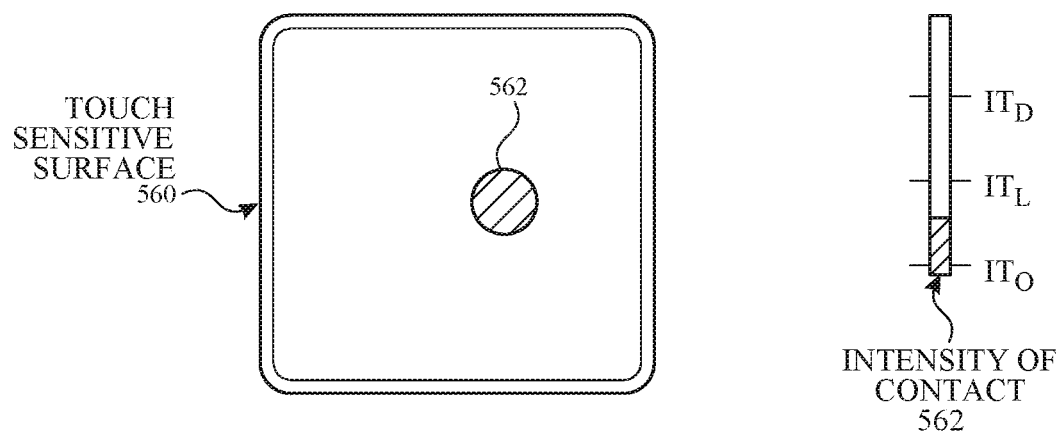
*FIG. 5E*

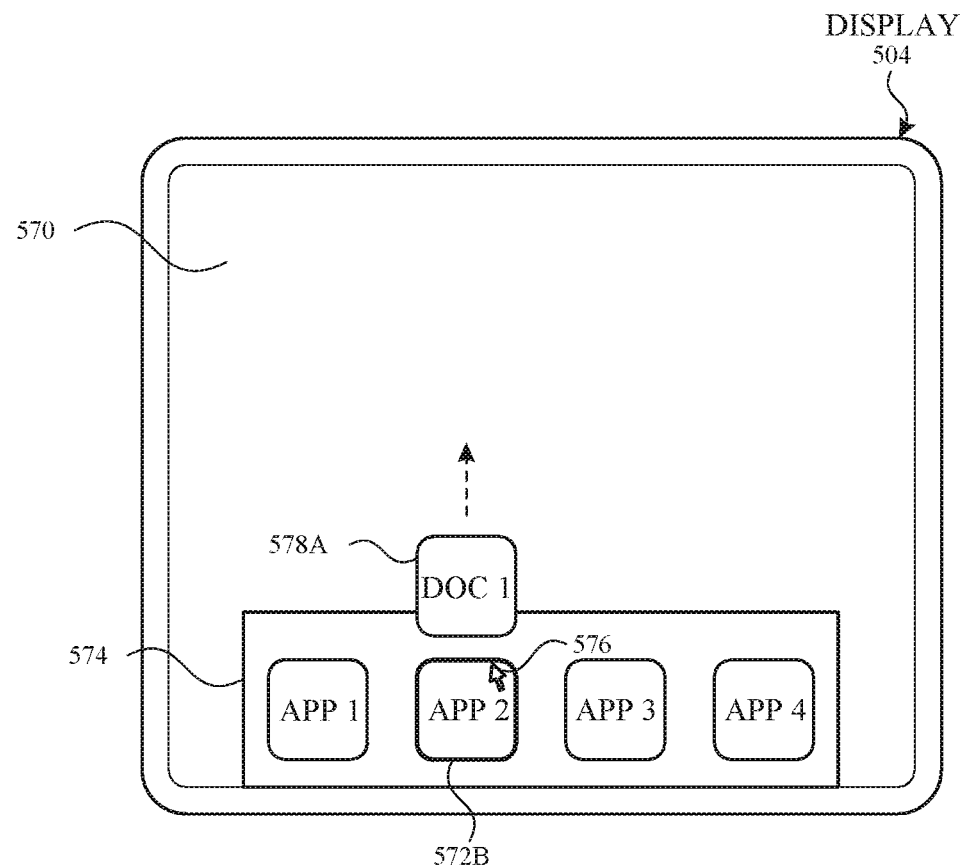
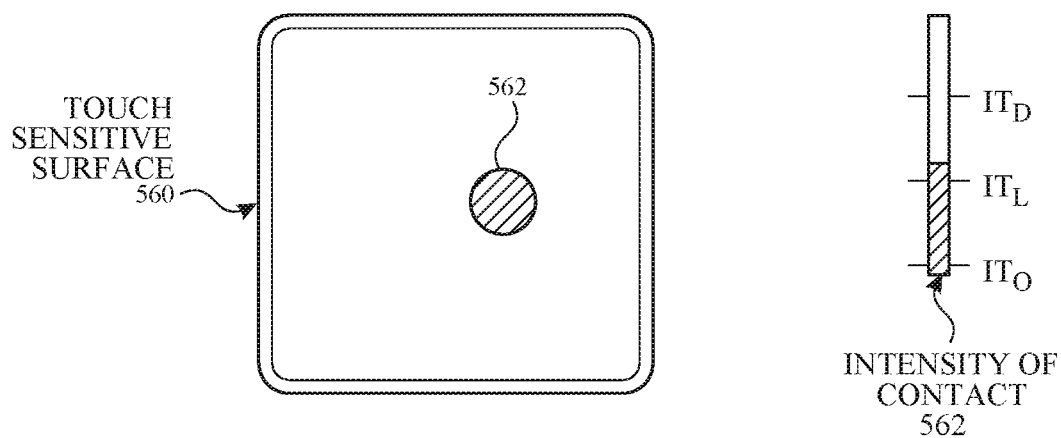
*FIG. 5F*

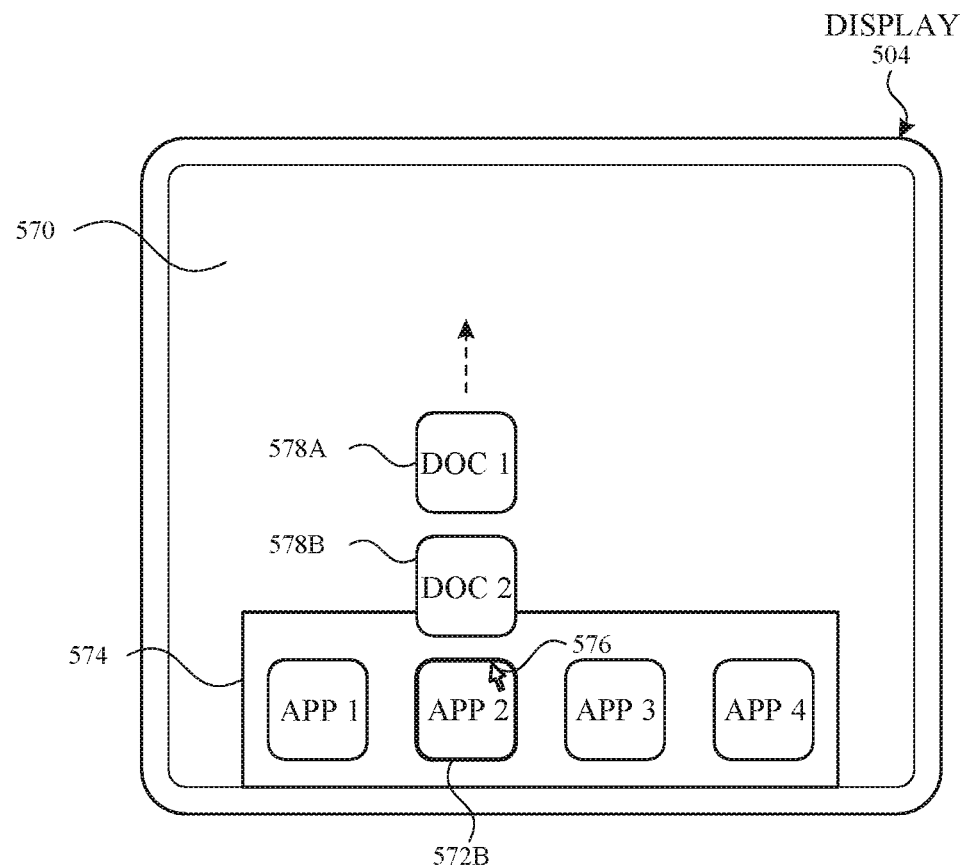
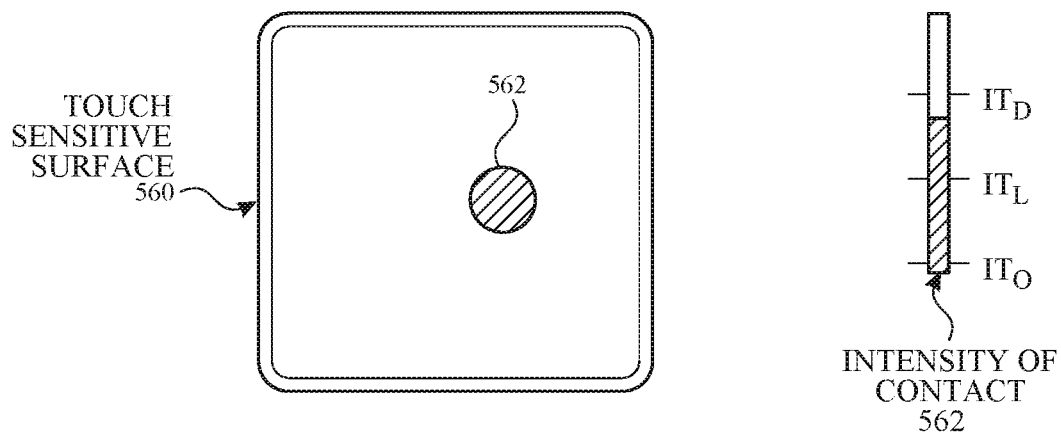
FIG. 5G

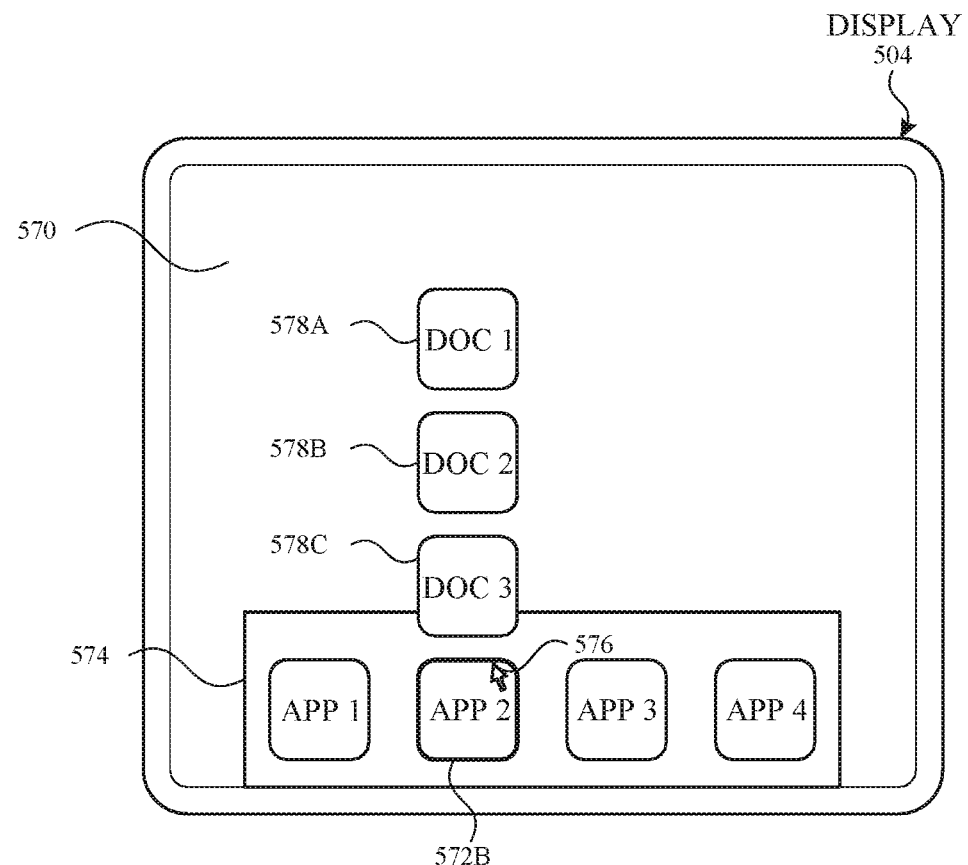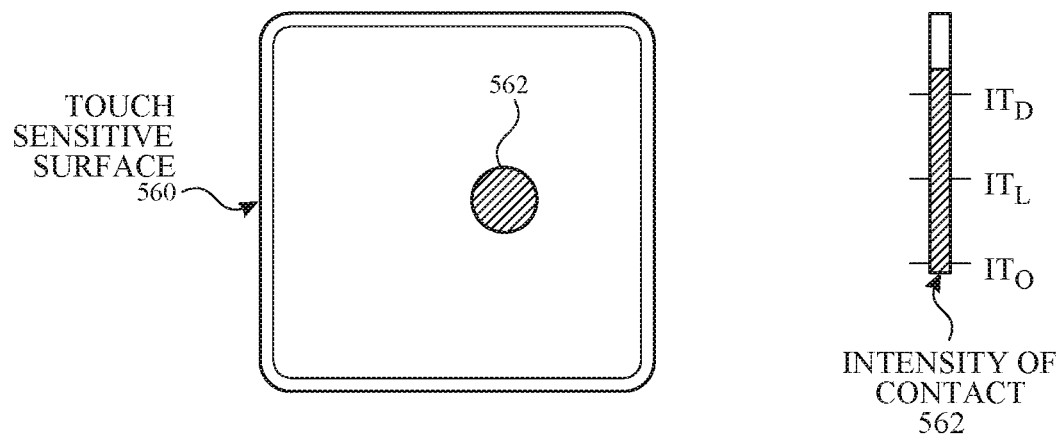
FIG. 5H

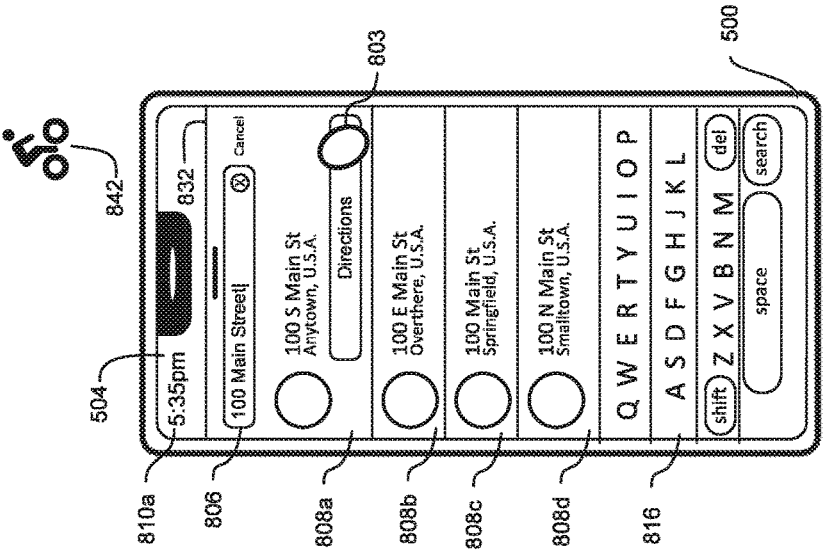
FIG. 8B
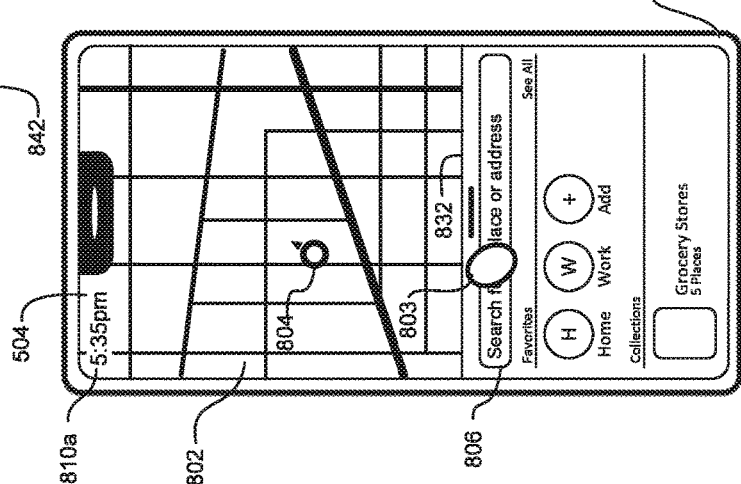
FIG. 8A

US 11,796,334 B2

USER INTERFACES FOR PROVIDING NAVIGATION DIRECTIONS

CROSS-REFERENCE TO RELATED APPLICATIONS

This application claims benefit of U.S. Provisional Patent Application No. 63/025,688, filed May 15, 2020, the contents of all of which are hereby incorporated by reference in its entirety for all purposes.

FIELD OF THE DISCLOSURE

This specification relates generally to electronic devices that provide navigation directions from one physical location to another physical location, and user interactions with such devices.

BACKGROUND

User interaction with electronic devices has increased significantly in recent years. These devices can be devices such as computers, tablet computers, televisions, multimedia devices, mobile devices, and the like. In some circumstances, users wish to obtain navigation directions on an electronic device. An electronic device can provide a user with navigation directions from a given location to a destination.

SUMMARY

Some embodiments described in this disclosure are directed to ways of displaying indications of safety characteristics of one or more navigational segments of a navigation route on an electronic device. Some embodiments described in this disclosure are directed to ways of displaying navigation options for navigation directions on an electronic device. Some embodiments described in this disclosure are directed to ways of presenting indications of navigation directions while navigation along a route using an electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

DETAILED DESCRIPTION

Description of Embodiments

Figure 1A:
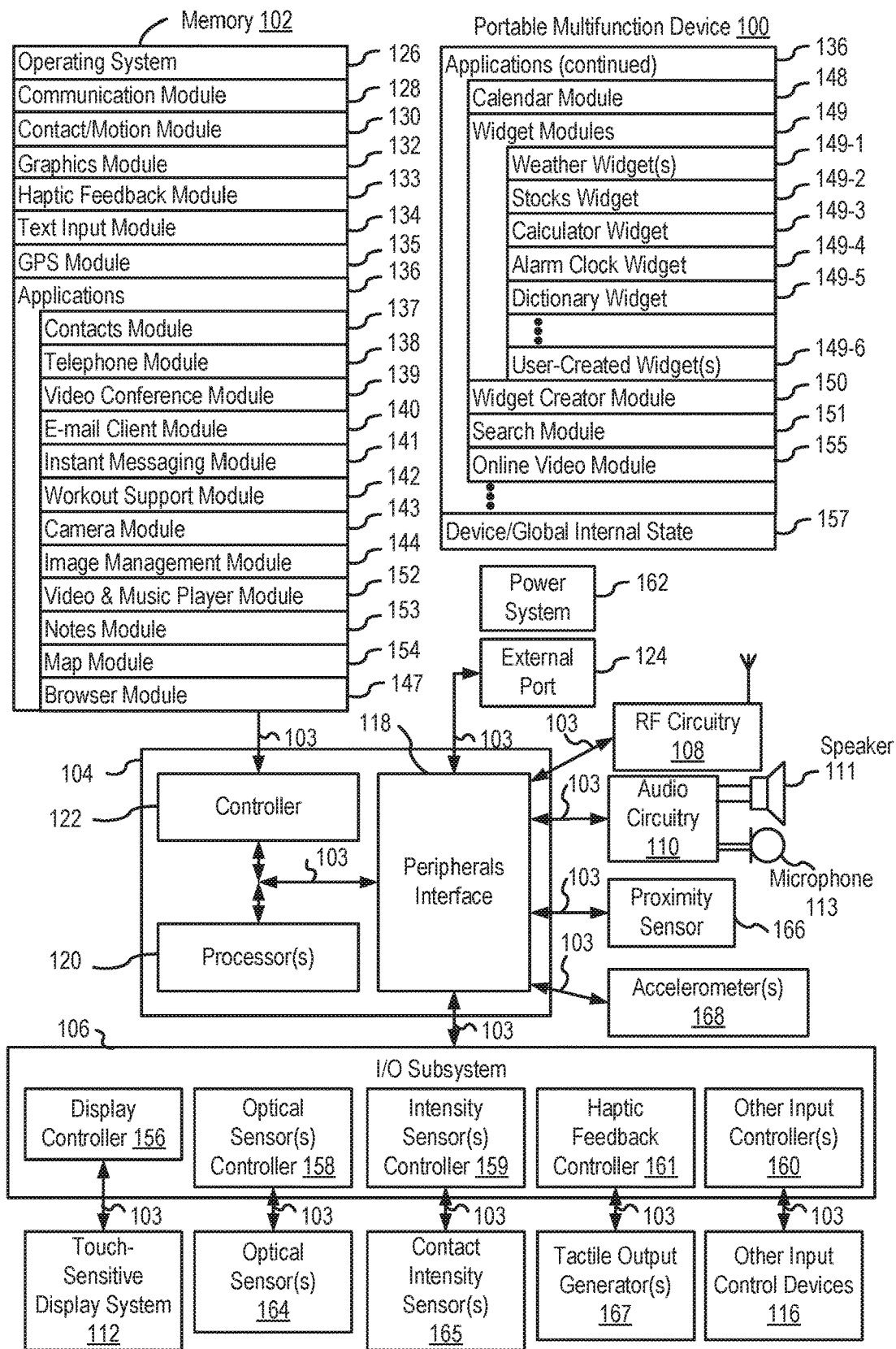
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device presents navigation directions from one physical location to another physical location using particular modes of transportation including bicycles. In some implementations, bicycle directions take into account obstacles along a route and other safety characteristics of a route. Such techniques can reduce the cognitive burden on a user who uses an example electronic device and effectively alert a user to potential dangers or challenges of a route In some implementations, an example electronic device presents an indication of an available route via a respective mode of transportation different from a requested mode of transportation if there is no route satisfying one or more criteria using the requested mode of transportation. Such techniques can reduce the cognitive burden on a user by reducing the number of inputs needed to determine a suitable alternative mode of transportation. In some implementations, an example electronic device modifies the way it presents indications of upcoming maneuvers while navigating along a route depending on the mode of transportation being used. Such techniques can reduce the cognitive burden on the user by presenting information relevant to the mode of transportation being used without providing information that is less relevant to the mode of transportation being used. Further, these techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
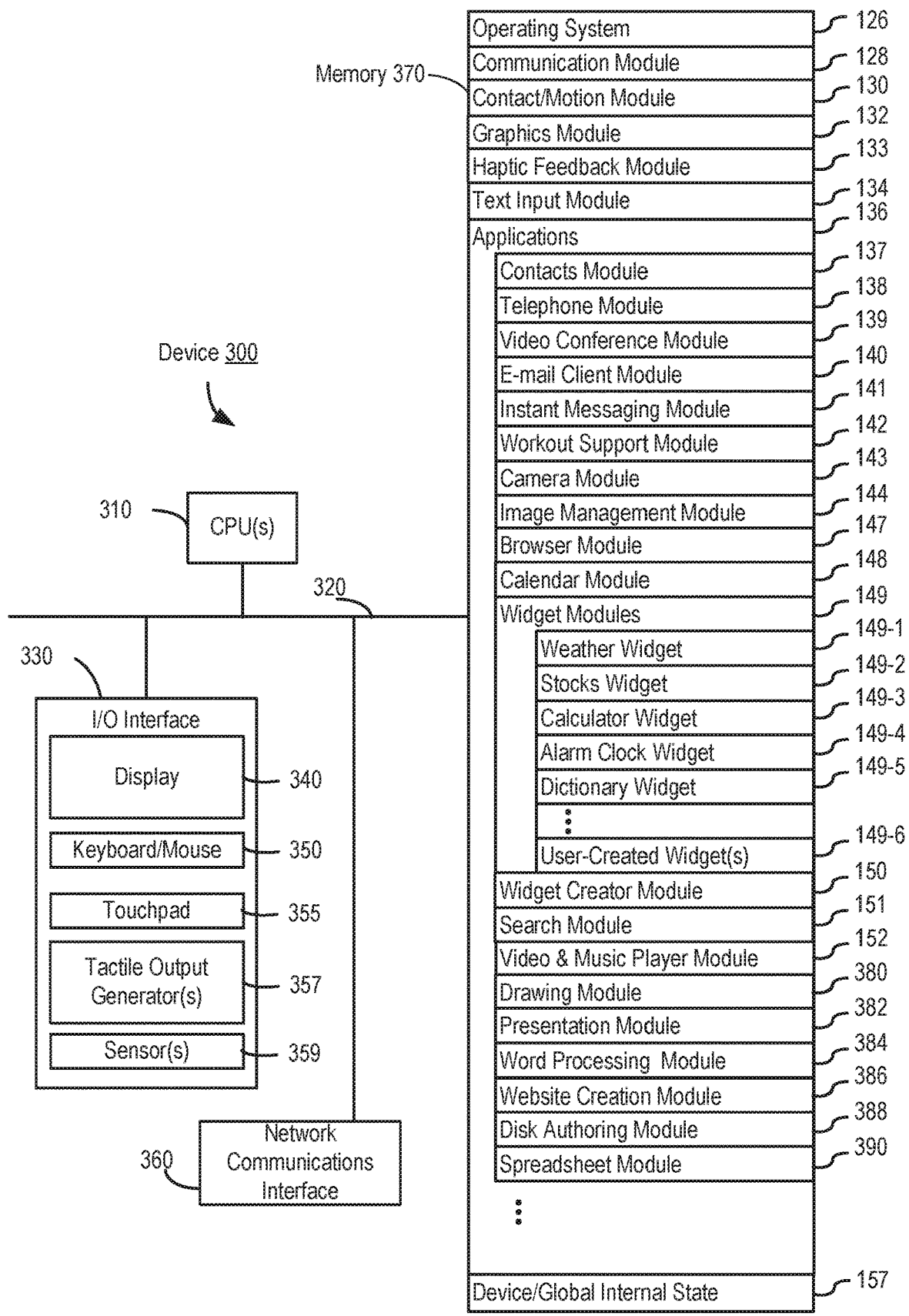
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
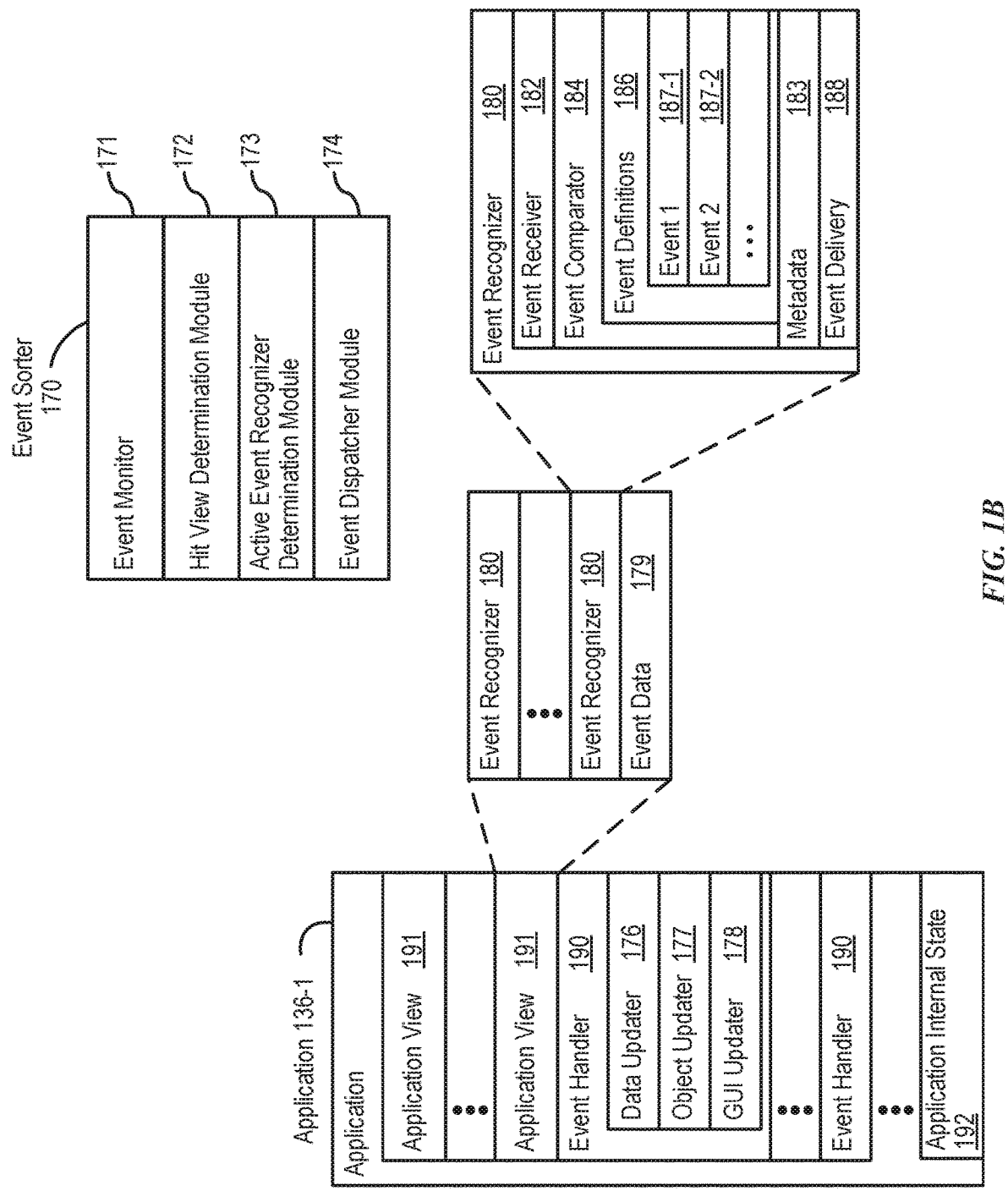
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
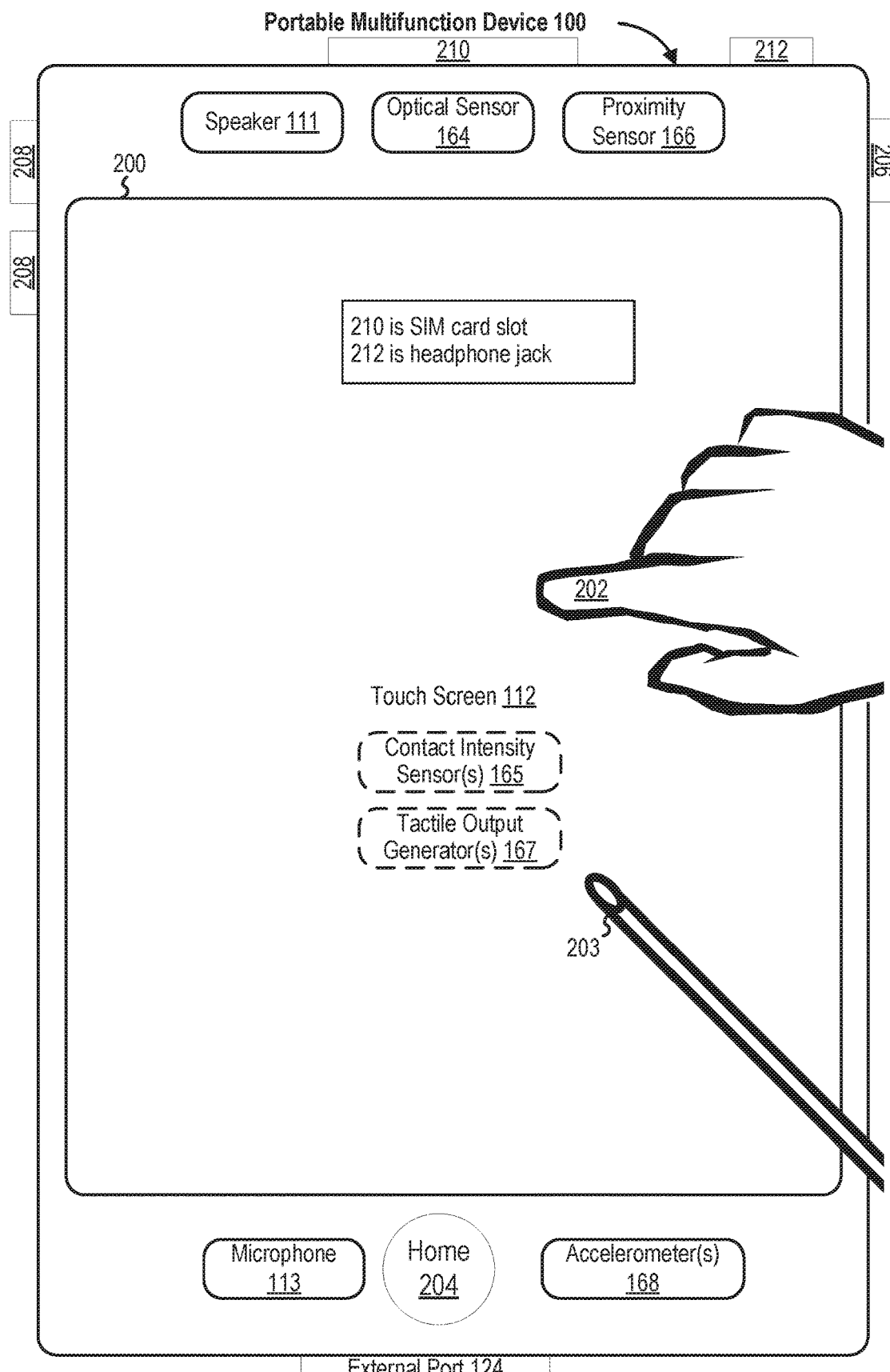
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
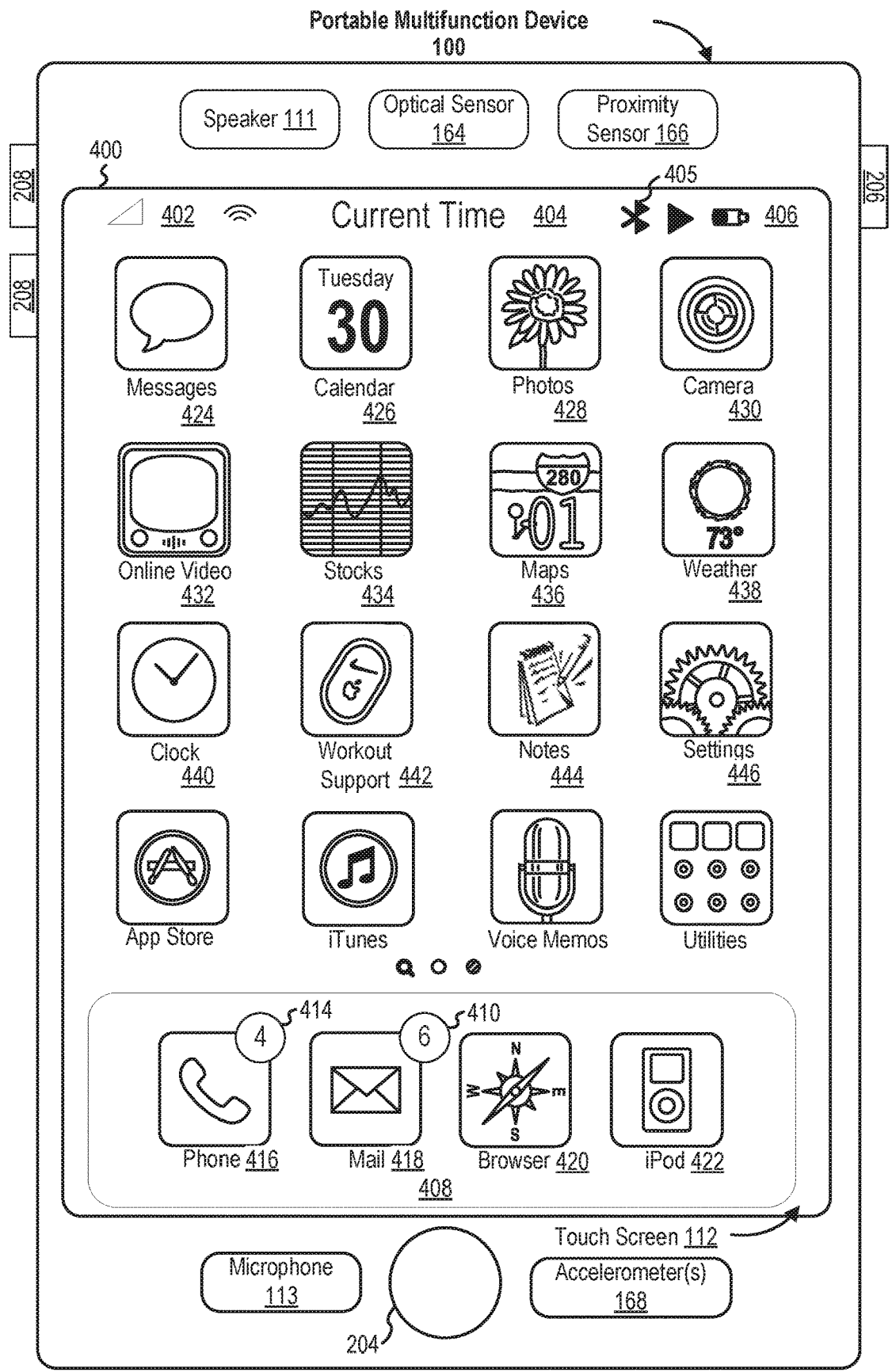
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to location 468 and contact 462 corresponds to location 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
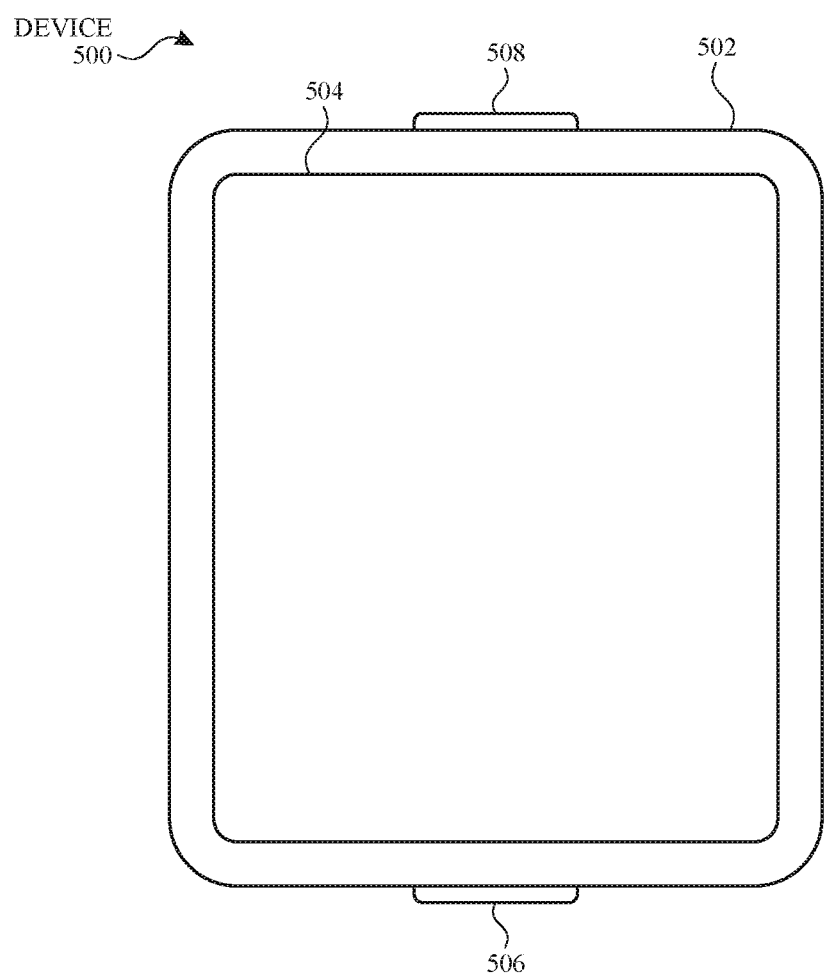
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
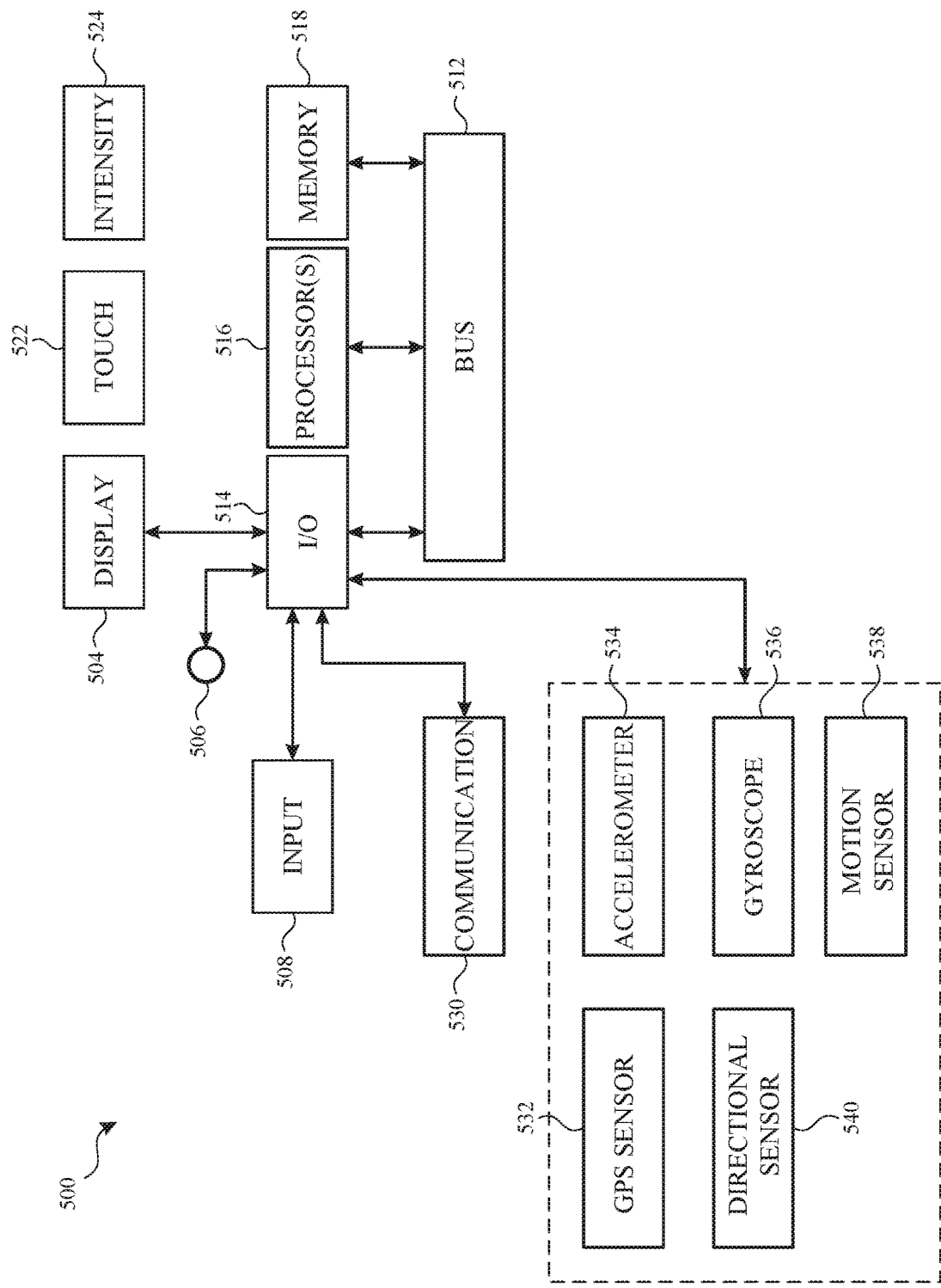
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
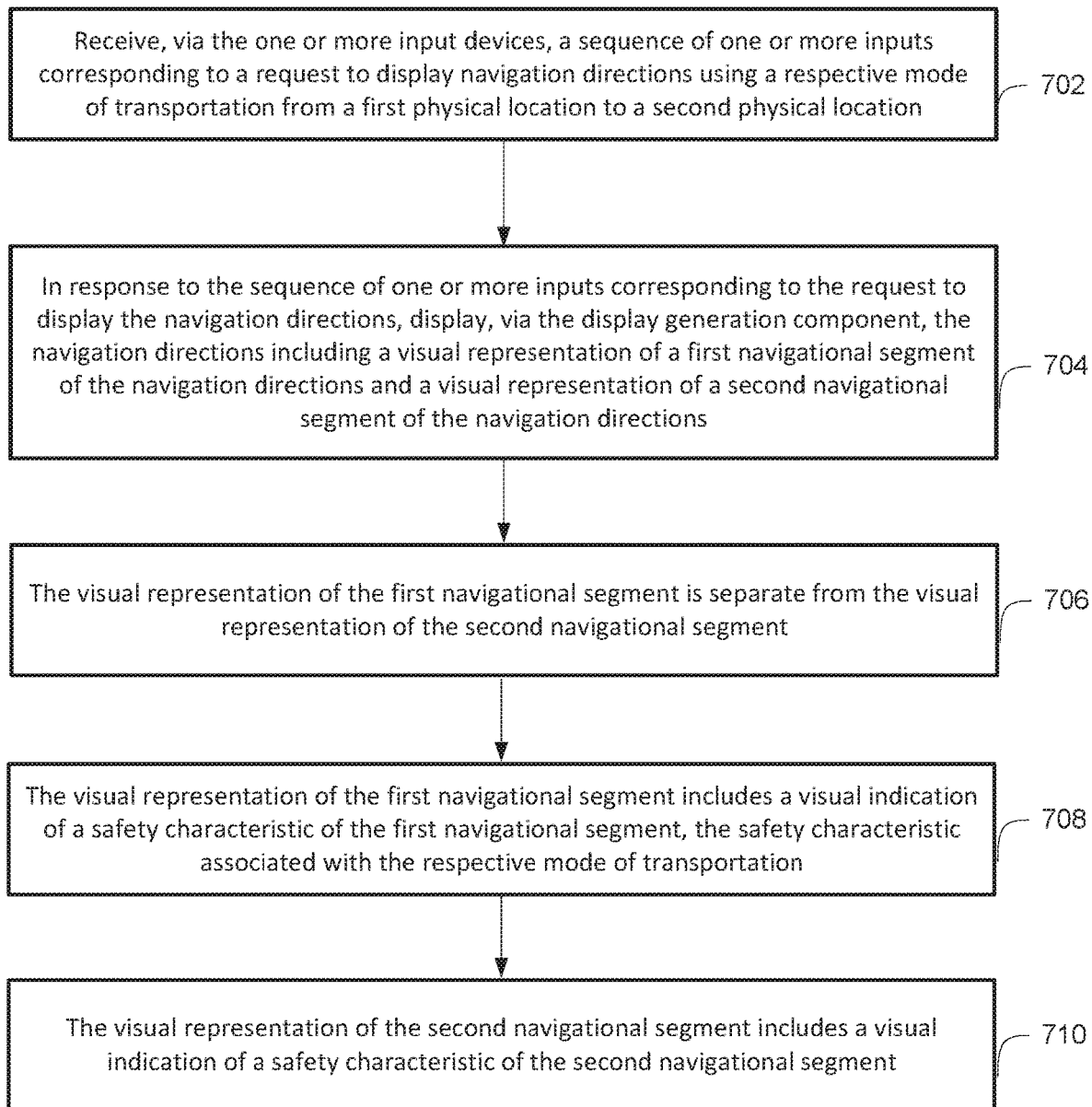
FIG. 7 is a flow diagram illustrating a method of displaying indications of safety characteristics along a navigation route in accordance with some embodiments of the disclosure.
Figure 9:
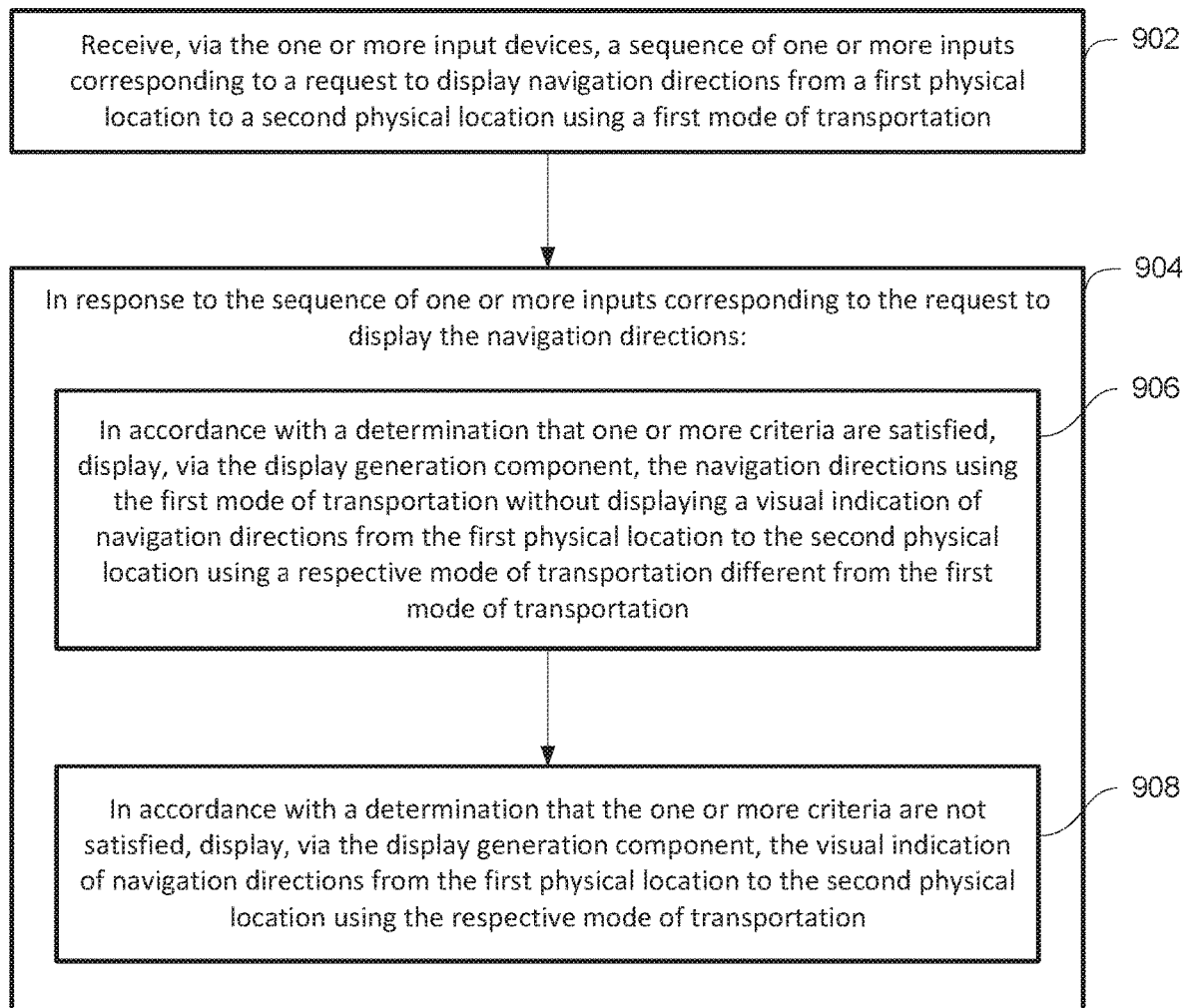
FIG. 9 is a flow diagram illustrating a method of presenting various navigation options according to some embodiments.
Figure 11:
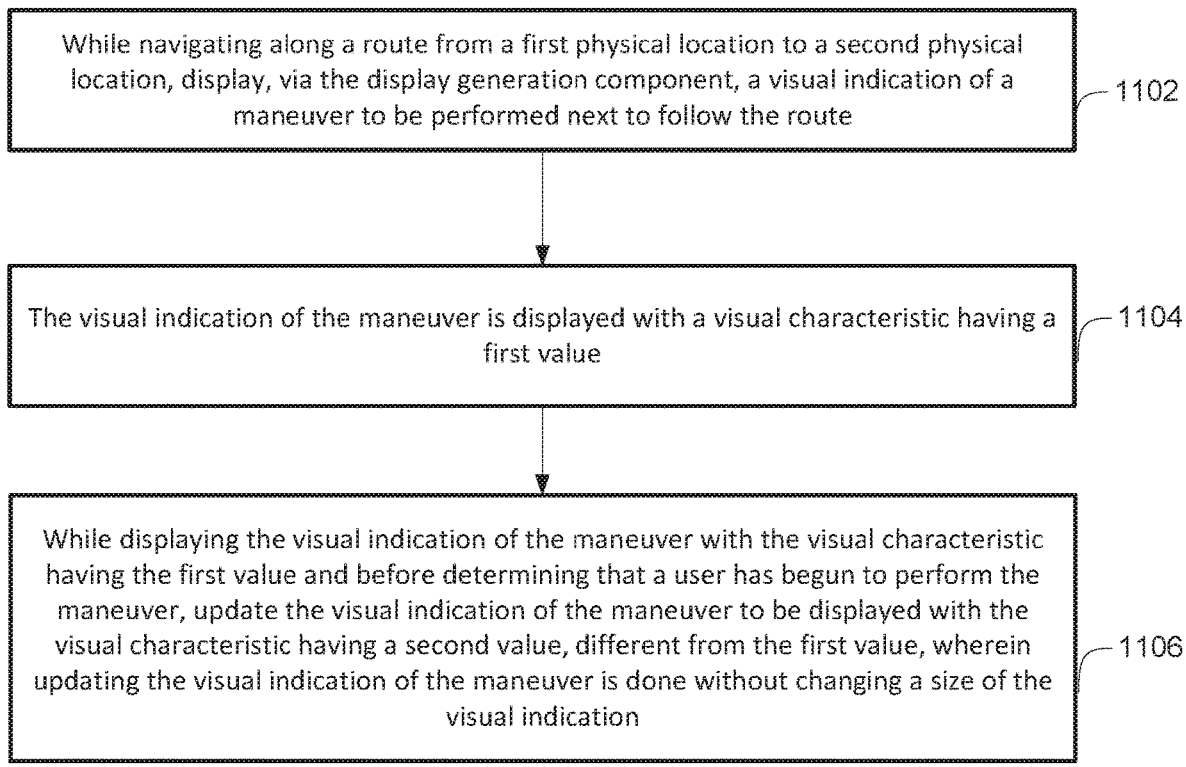
FIG. 11 is a flow diagram illustrating a method of presenting indications of navigation directions while navigating along a route according to some embodiments.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900 and 1100 (FIGS. 7, 9 and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
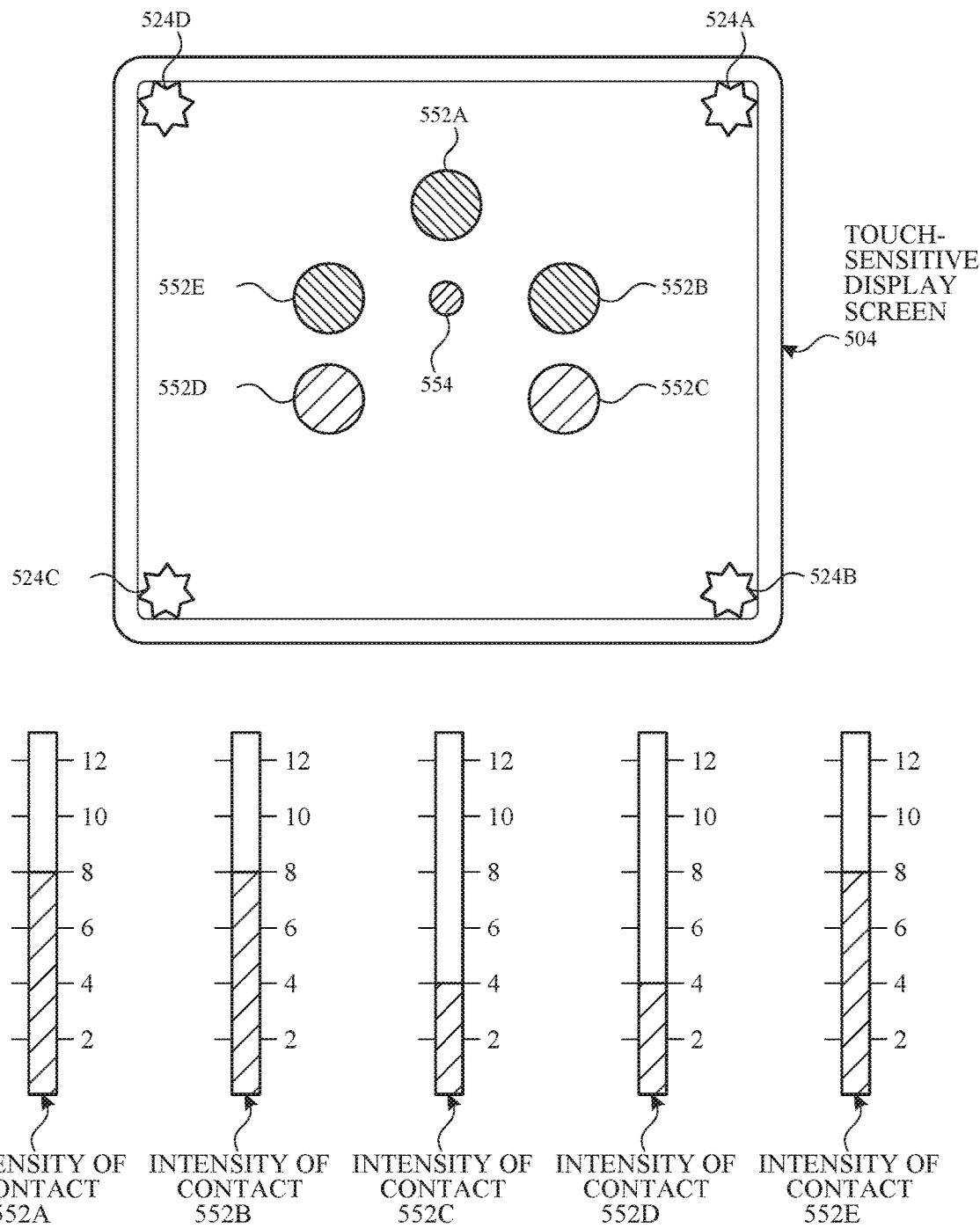
Figure 51:
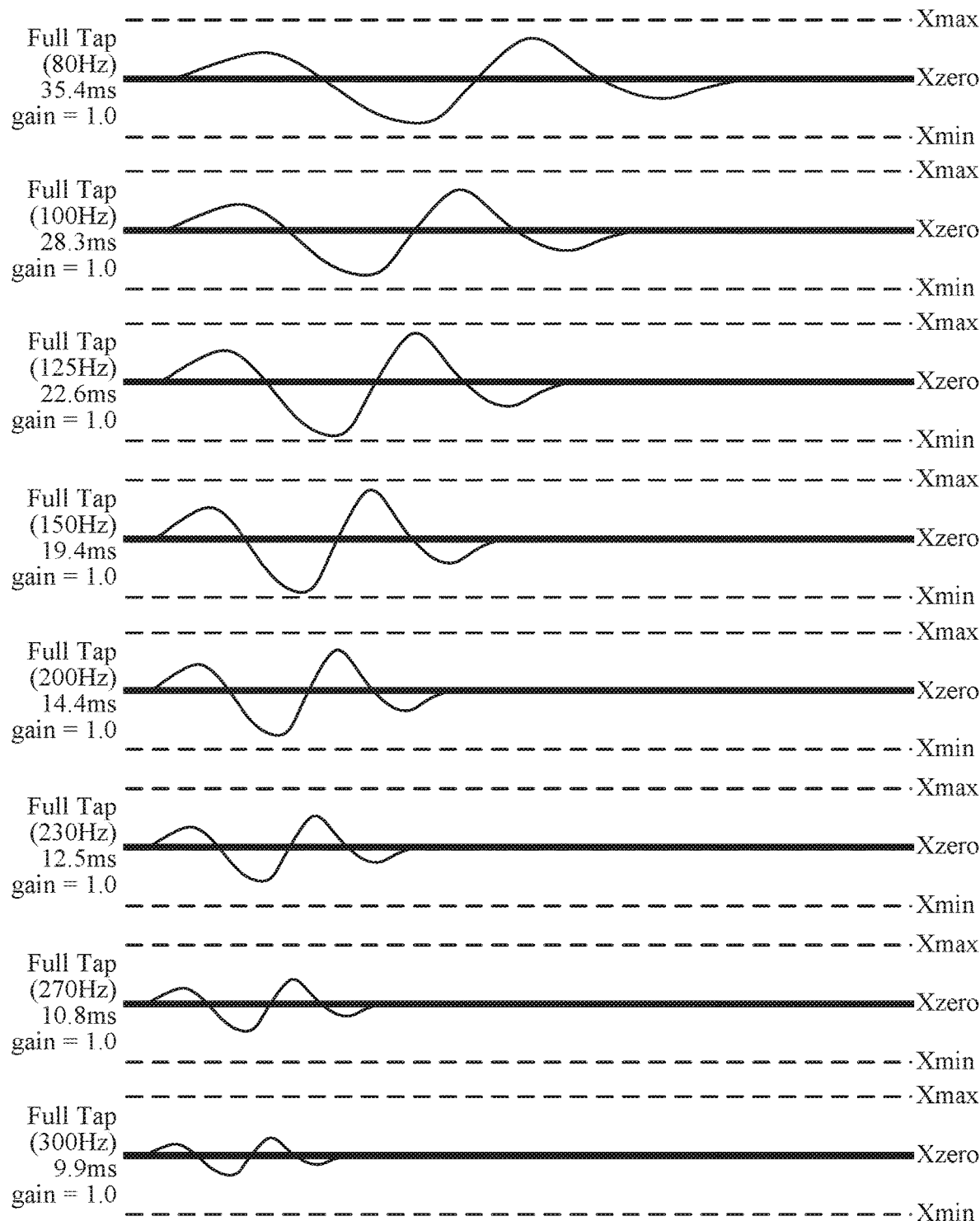

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
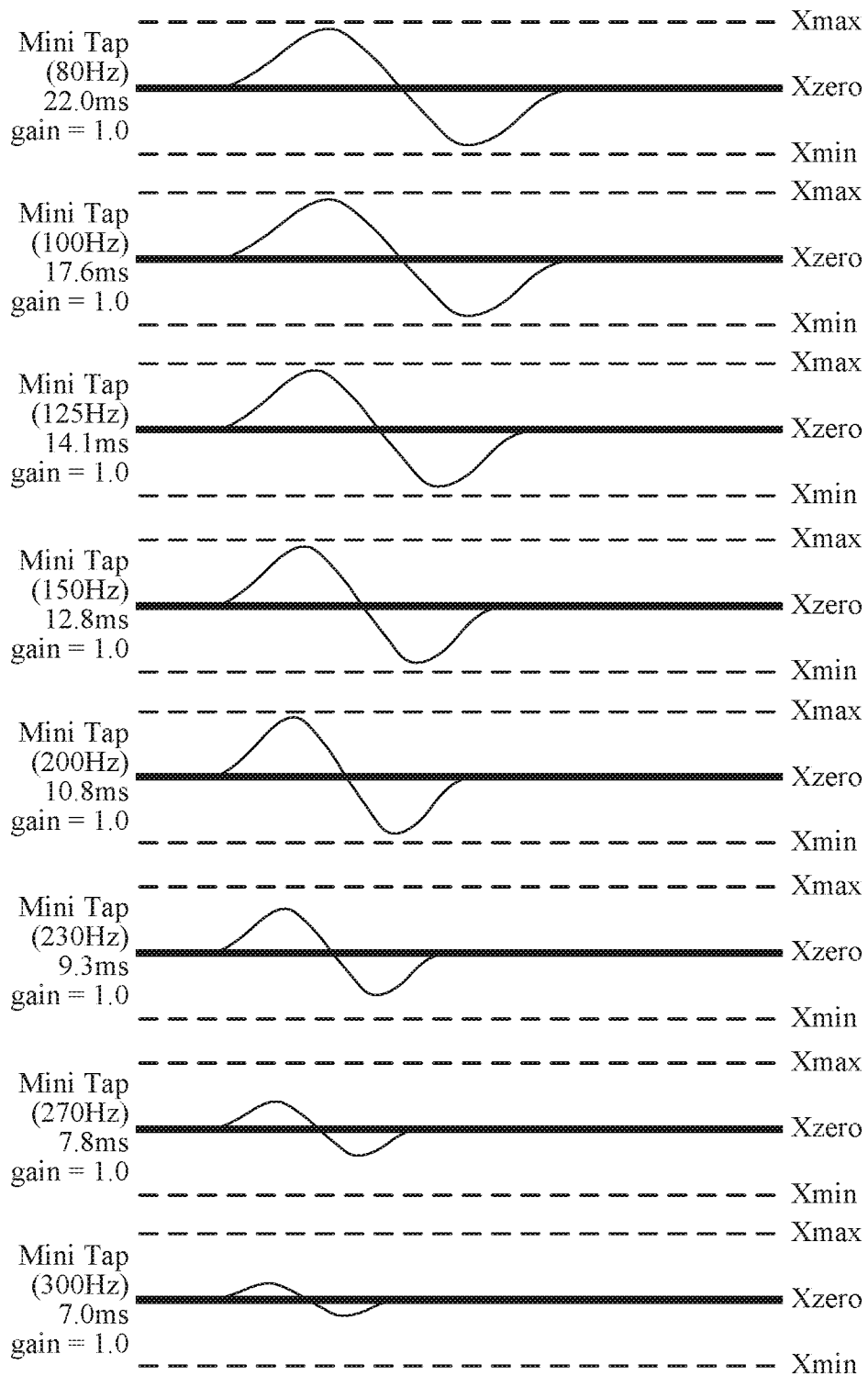
Figure 5K:
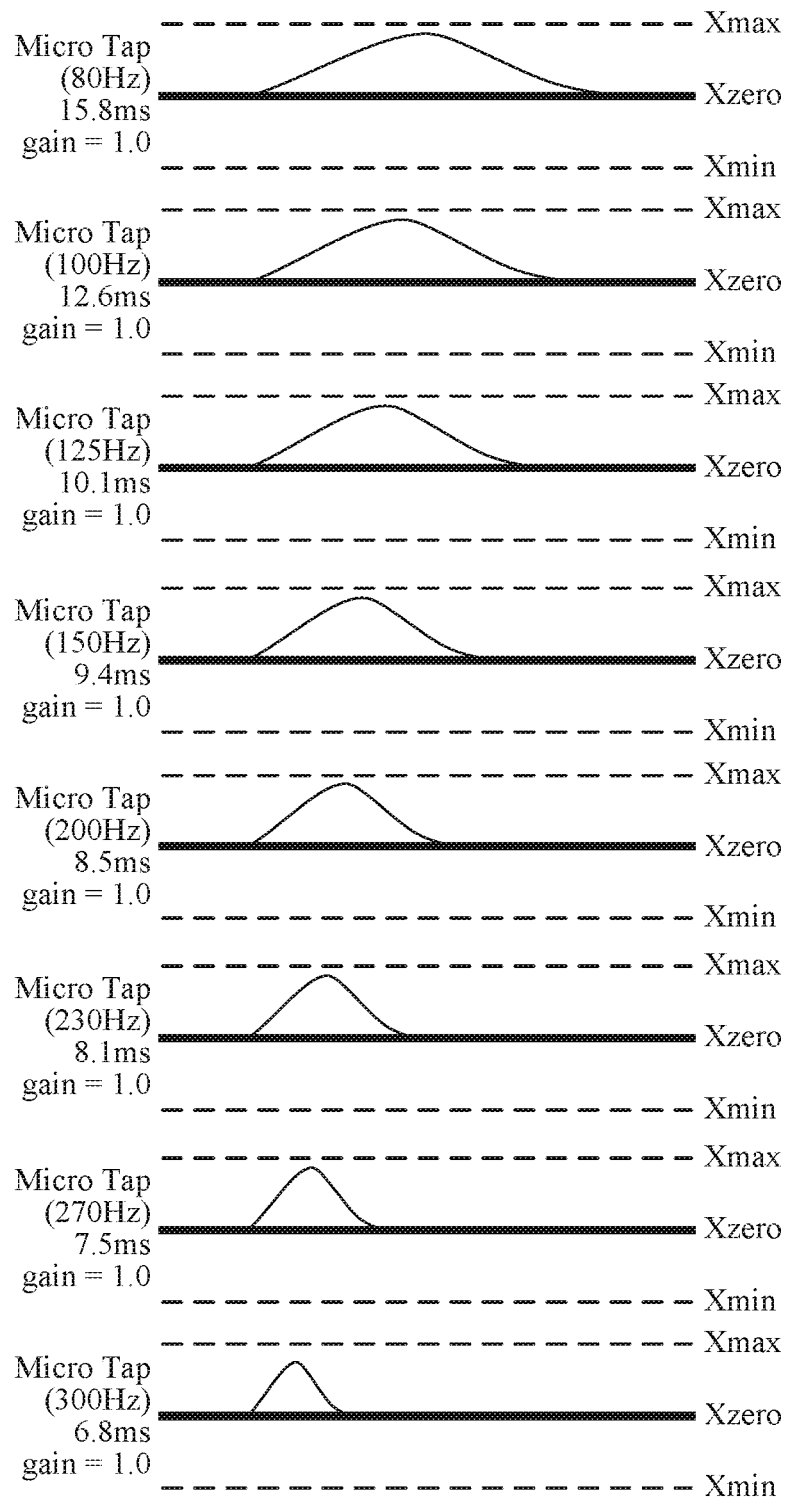
Figure 5L:
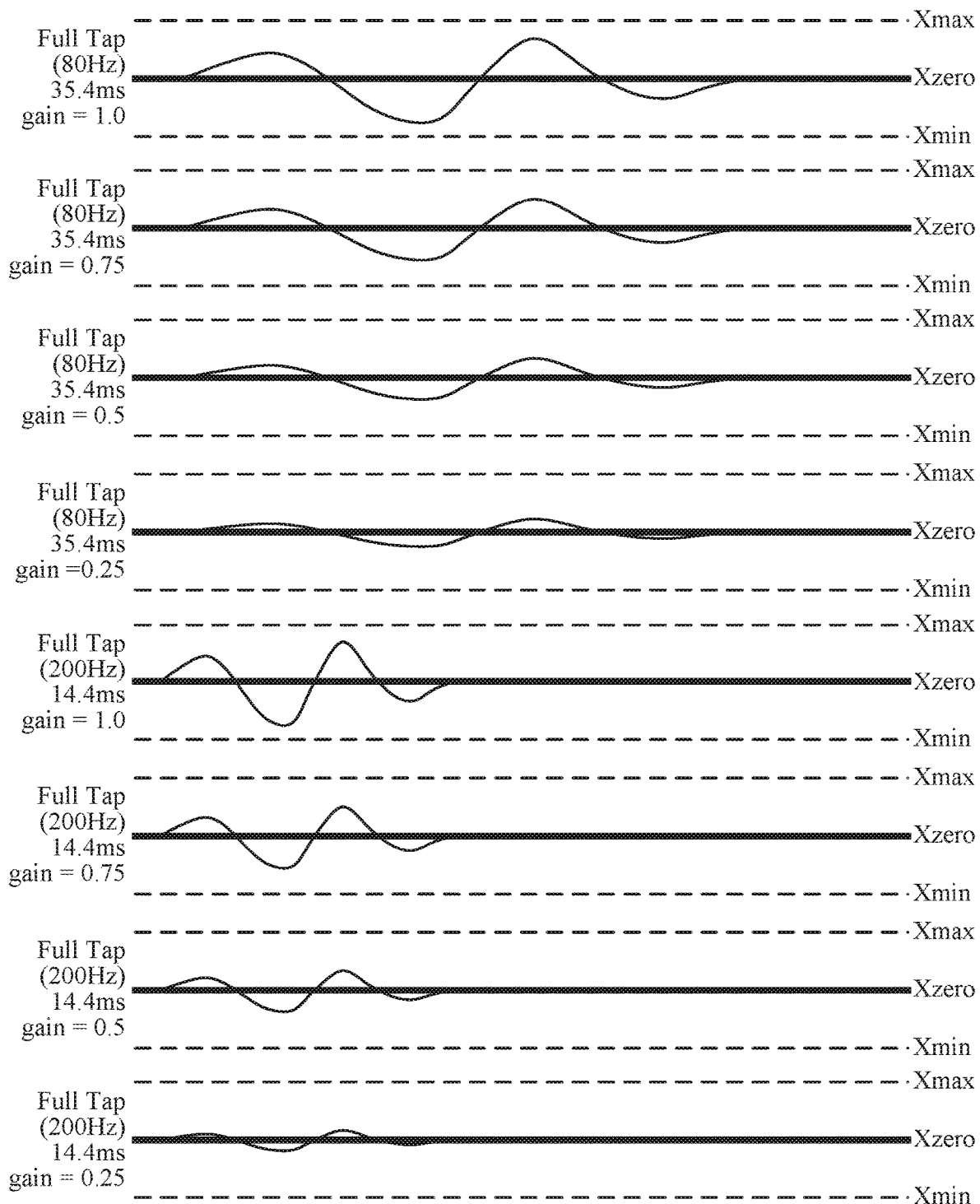
Figure 5M:
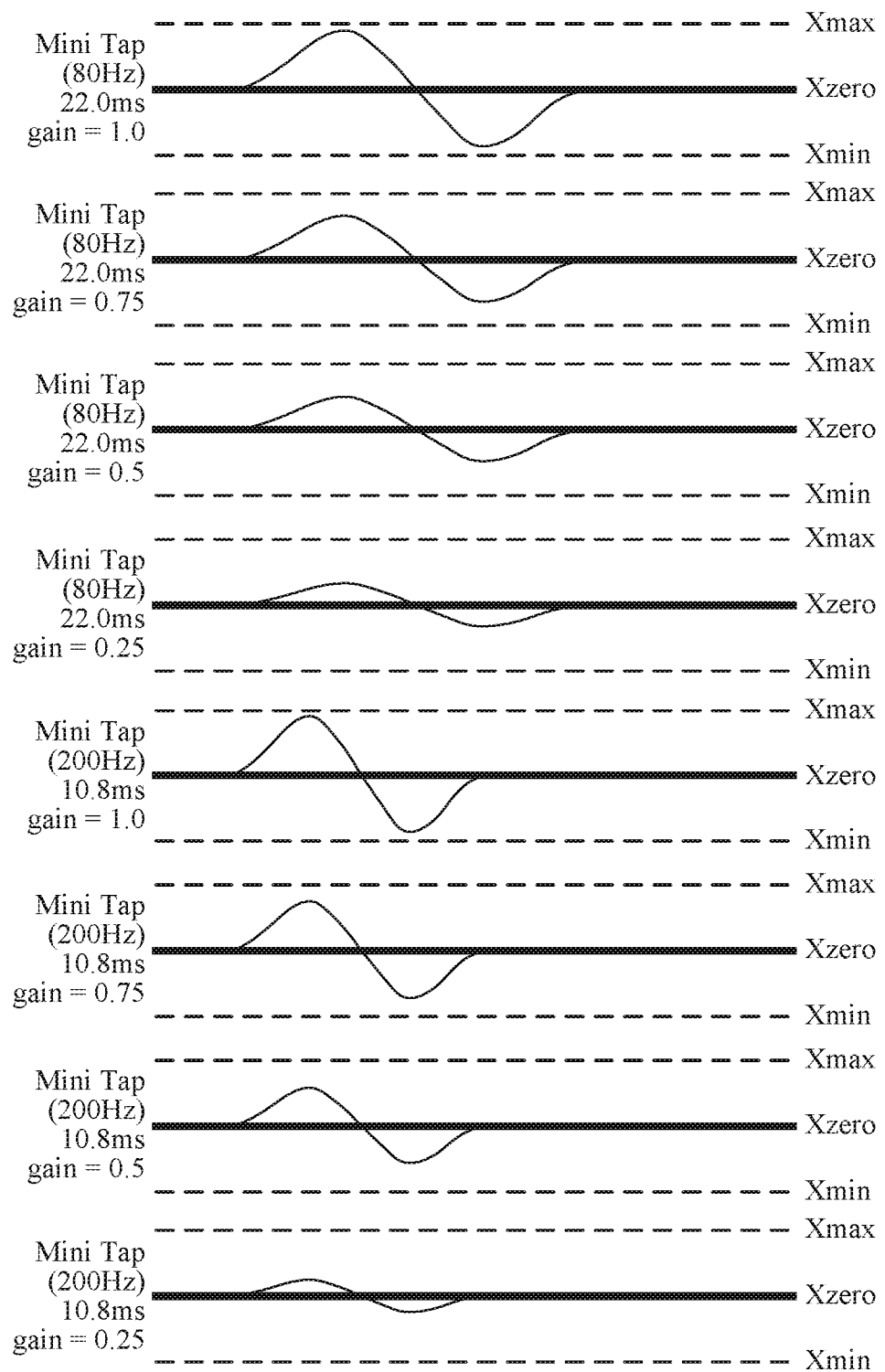
Figure 5N:
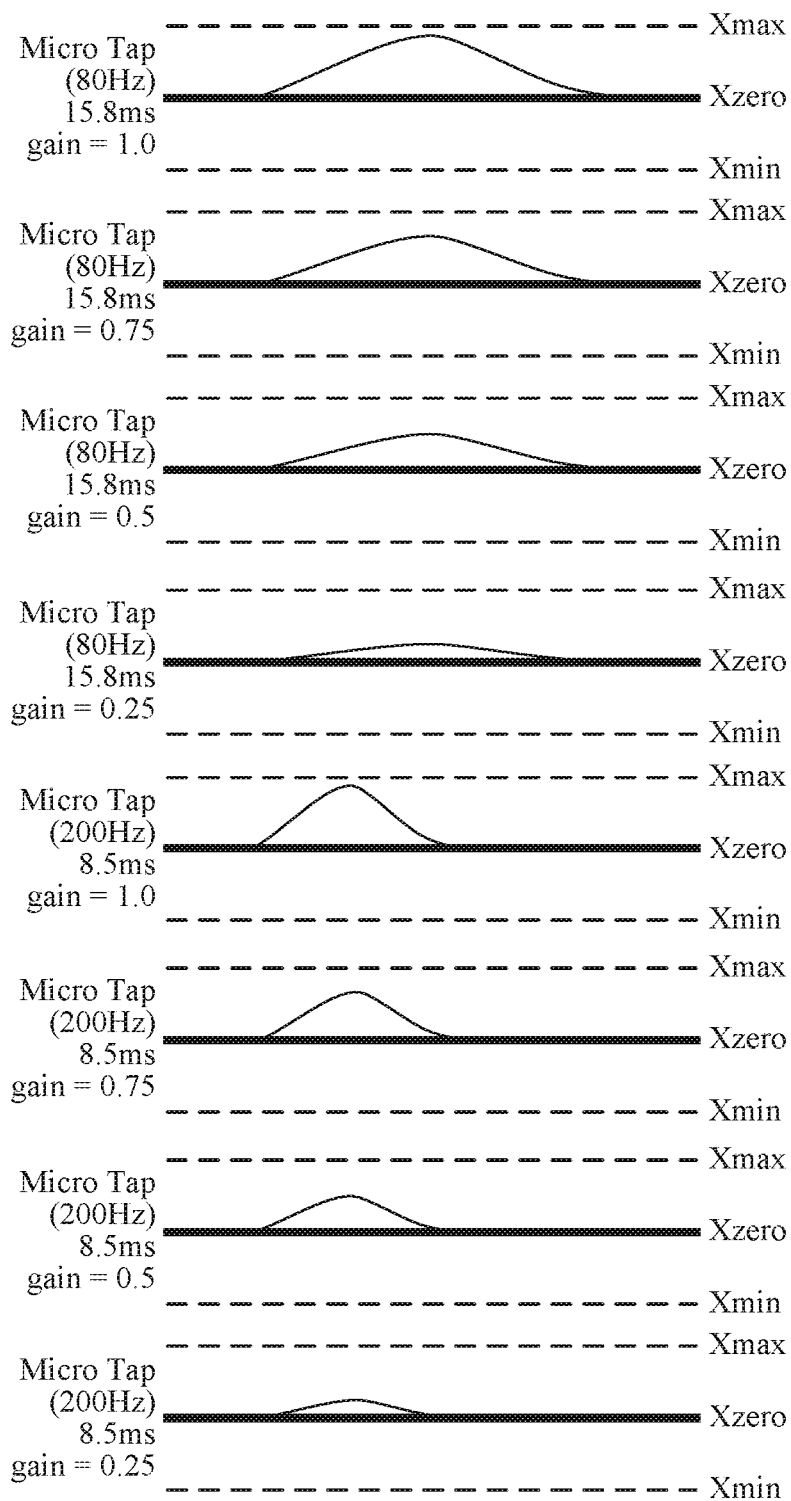

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

In some embodiments, an electronic device 500 can include a navigation application. For example, the navigation application can present maps, routes, location metadata, and/or imagery (e.g., captured photos) associated with various geographical locations, points of interest, etc. The navigation application can obtain map data that includes data defining maps, map objects, routes, points of interest, imagery, etc., from a server. For example, the map data can be received as map tiles that include map data for geographical areas corresponding to the respective map tiles. The map data can include, among other things, data defining roads and/or road segments, metadata for points of interest and other locations, three-dimensional models of the buildings, infrastructure, and other objects found at the various locations, and/or images captured at the various locations. The navigation application can request, from the server through a network (e.g., local area network, cellular data network, wireless network, the Internet, wide area network, etc.), map data (e.g., map tiles) associated with locations that electronic device 500 frequently visits. The navigation application can store the map data in a map database. The navigation application can use the map data stored in map database and/or other map data received from the server to provide the navigation application features described herein (e.g., navigation routes, maps, navigation route previews, etc.).

In some implementations, a system can include a server. For example, the server can be a computing device, or multiple computing devices, configured to store, generate, and/or serve map data to various user devices (e.g. device 500), as described herein. For example, the functionality described herein with reference to the server can be performed by a single computing device or can be distributed amongst multiple computing devices.

User Interfaces for Displaying Characteristics of a Navigation Route

Users interact with electronic devices in many different manners, including using electronic devices to obtain navigation routes from a first physical location to a second physical location. The embodiments described below provide ways in which an electronic device displays safety characteristics of one or more segments of a navigation route provided by the electronic device. Displaying safety characteristics enhances interactions with a device, thus reducing the amount of time a user needs to perform navigational operations and reducing the power usage of the device, which increases battery life for battery-powered devices. It is understood that people use devices. When a person uses a device, that person is optionally referred to as a user of the device.

When interacting with a map application, a user may want to determine a navigation route from one physical location to another using a specific mode of transportation (e.g., driving, public transportation, walking, or bicycling). FIGS. 6A-6W illustrate exemplary ways in which an electronic device 500 allows a user to obtain a navigation route from a first location to a second and displays indications of safety characteristics along the navigation route in accordance with some embodiments. The embodiments in these figures are used to illustrate the processes described below, including the processes described with reference to FIG. 7. Although FIGS. 6A-6W illustrate various examples of ways an electronic device is able to perform the processes described below with FIG. 7, it should be understood that these examples are not meant to be limiting, and the electronic device is able to perform one or more processes described below with reference to FIG. 7 in ways not expressly described with reference to FIGS. 6A-6W.

In FIG. 6A, the electronic device 500 displays a maps application user interface. The user interface includes a map 602 with an indication 604 of the current location of the electronic device 500, and a user interface 632 overlaid on the map 602 including a text box 606 into which input designating a navigation destination is directed. As shown in FIG. 6A, the user selects (e.g., with contact 603) the text box 606. Within the text box 606, the user inputs information corresponding to a destination address.

Figure 6B:
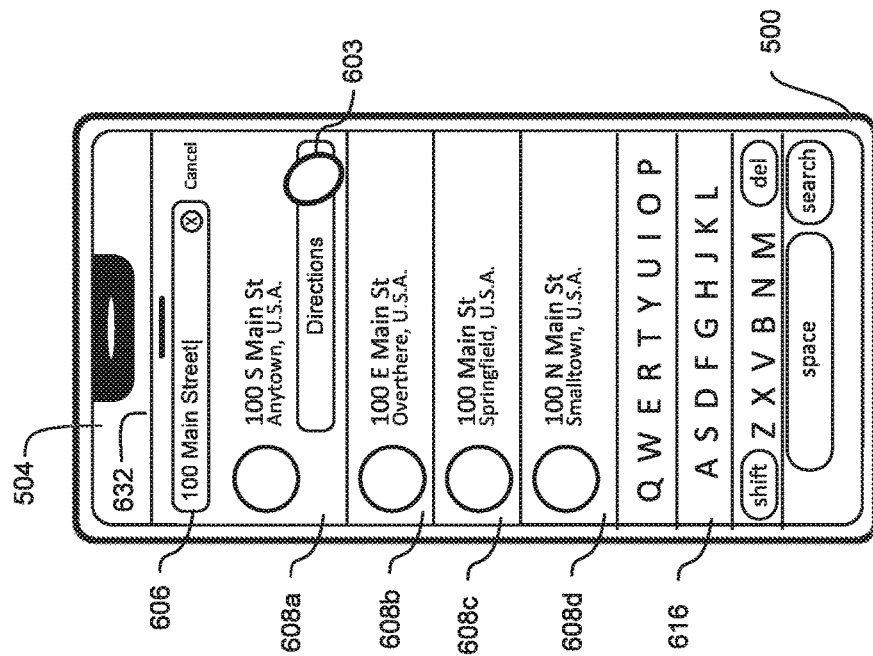
FIGS. 6A-6W illustrate exemplary ways in which an electronic device displays indications of safety characteristics along a navigation route in accordance with some embodiments.
Figure 6A:
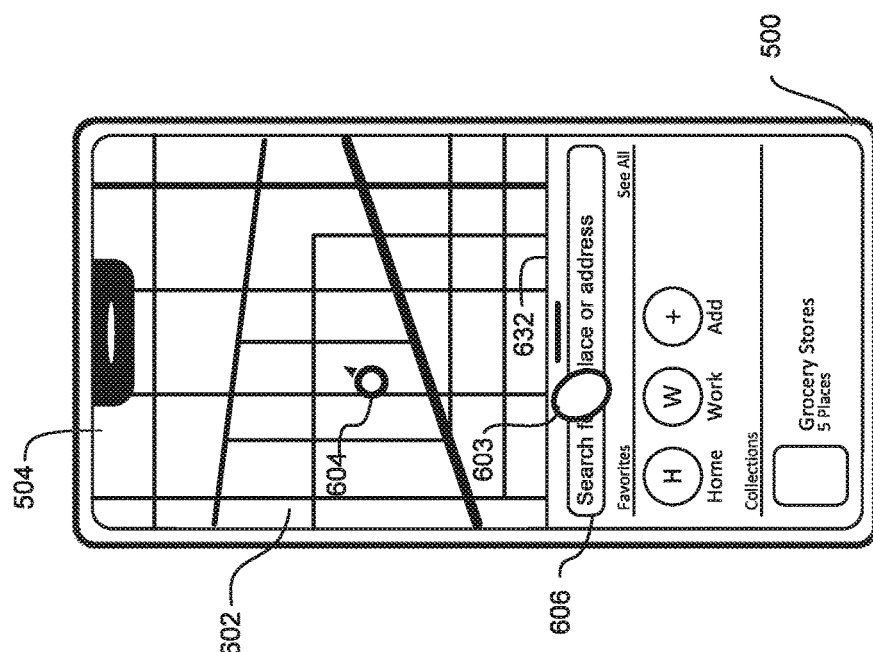
Figure 6D:
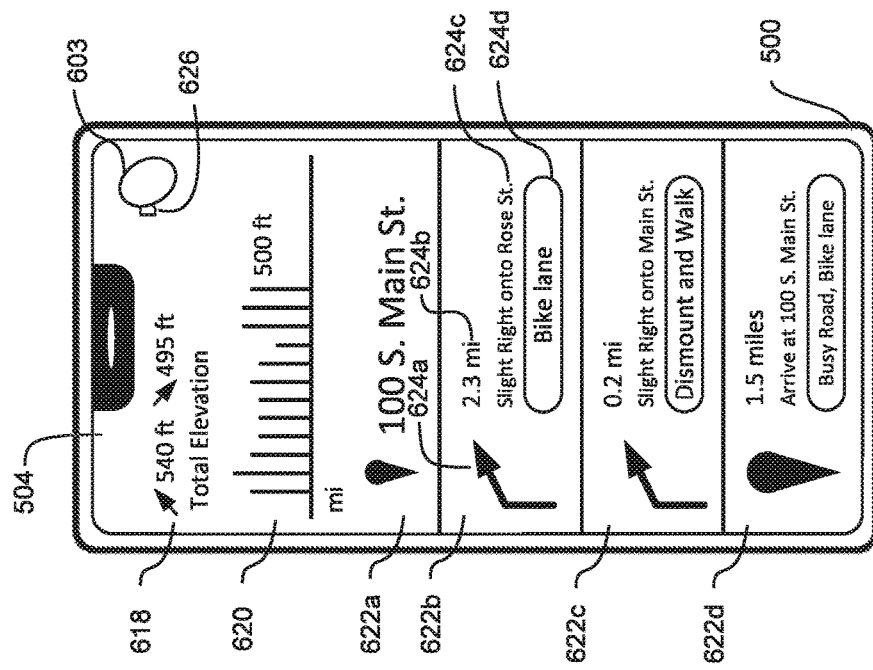

In FIG. 6B, the electronic device displays a user interface including a plurality of representations 608 of possible navigation destinations corresponding to a sequence of inputs, e.g., inputs corresponding to a destination address, provided by the user after selecting the text box 606 illustrated in FIG. 6A and inputting information using a soft keyboard 616. In some embodiments, the user interface shown in FIG. 6B is illustrated in response to an input requesting to display the search results corresponding to the input provided to text box 606, e.g., multiple addresses that correspond to the user's input. As shown in FIG. 6B, the user selects (e.g., with contact 603) one of the representations 608 of possible navigation destinations, e.g., representation 608a. In some implementations, the user additionally optionally is provided with a second input location, e.g., a text box, in which to input information corresponding to a start address. In some implementations, the user optionally chooses the starting point for navigational directions in a similar manner.

Figure 6C:
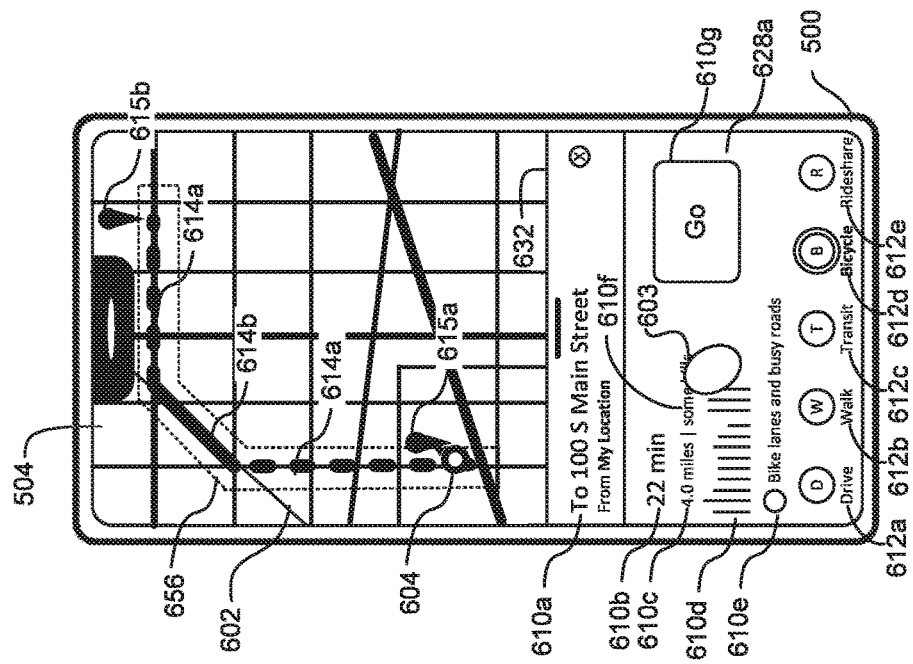

In response to the user's selection in FIG. 6B, the electronic device displays a preview 656 of the possible route from the starting point to the chosen destination as illustrated by the user interface in FIG. 6C using a specific mode of transportation. FIG. 6C illustrates the map 602 including a preview 656 of a possible route from the current location of the electronic device to the user's selected destination using a bicycle as the mode of transportation (as will be described in more detail later). Although FIG. 6C illustrates a preview 656 from the current location of the electronic device, in some implementations the map 602 includes a preview 656 of a possible route from the user's selected starting location to the user's selected destination. The map 602 optionally includes the indication 604 of the current location of the electronic device, an indication 615a of the starting point of the navigation directions if different from the current location of the electronic device, an indication 615b of the end point of the navigation directions, a plurality of navigation segments 614a that the user is able to travel via bicycle, and a navigation segment 614b at which the user will have to dismount their bicycle and walk. As shown in FIG. 6C, the navigation segments 614a for which the user is able to bicycle are displayed with a different visual characteristic than the navigation segment 614b for which the user will have to walk. Although FIG. 6C illustrates the use of dashed lines for biking segments 614b and a solid line for walking segment 614b, in some embodiments, other visual indications are used. For example, the biking segments 614a optionally are displayed in a first color (e.g., blue) and the walking segment 614b optionally are displayed in a second color (e.g., red).

FIG. 6C further illustrates a representation 628a of a navigation route between the starting point and the destination that corresponds to the preview 656 of the route. The representation 628a of the navigation route includes detailed information about the selected route. For example, this detailed information optionally includes an indication 610b of the expected time it will take to navigate along the route, an indication 610c of the distance of the route, an indication 610f of an elevation characteristic of one or more segments of the route, an indication 610d of the profile of the route, an indication 610e of safety characteristics of one or more segments of the route associated with the currently selected mode of transportation (e.g., bicycle), and a selectable option 610g that, when selected, causes the electronic device 500 to begin providing navigation directions while the user travels along the route. The indication 610f of the elevation characteristic of the route summarizes the elevation along the route (e.g., in prose text). The indication 610d of the elevation profile indicates how the elevation changes at each point along the route. The representation of the navigation route optionally includes information regarding particular safety characteristic along the route. For example, indicator 610e indicates the types of roads the route uses (e.g., in prose text), thereby allowing the user to determine the relative safety of using the particular mode of transportation (e.g., bicycling) along the route. In a bicycling mode of transportation, a bike lane may be relatively safe for the bike travel as compared to a road that does not include bike lanes, while a busy road may be relatively less safe for the bike travel than a quiet road. In some embodiments, other possible safety characteristics include "Shared Road," "Bike Path," "Quiet Road," "Bike Lane," "Steep Hill," or "Stairs," as shown in FIGS. 6V and 6W. In some embodiments, different safety characteristics are displayed for other modes of transportation that are relevant to the respective mode of transportation, even when following the same route. In some embodiments, the electronic device 500 forgoes displaying safety characteristics when navigating via a respective mode of transportation if the safety characteristics are not relevant to that mode of transportation (e.g., a "Bike Lane" indication is not relevant when driving a car).

The user interface illustrated in FIG. 6C further includes a plurality of selectable options 612*a-e* that, when selected, causes the electronic device 500 to change the mode of transportation for which to provide navigation directions. In FIG. 6C, the bicycle option 612*d* is displayed with an additional visual characteristic to indicate that the electronic device 500 is currently configured to provide navigation directions by bicycle. Although options 612*a-e* are illustrated in FIG. 6C as being displayed along the bottom of the user interface, it should be understood that, in some embodiments, the options 612*a-e* can be displayed at a different position in the user interface (e.g., between the destination details 610*a* and the indication 610*b* of the estimated route duration).

As shown in FIG. 6C, the user selects (e.g., with contact 603) the representation 628*a* of the navigation route (e.g., a location within the representation 628*a* other than the selectable option 610*g*). As shown in FIG. 6D, in response to the user's selection in FIG. 6C, the electronic device 500 presents an overview of the navigation route (e.g., before navigation has been initiated). The overview provides a turn-by-turn guide of the route and not merely a preview of the route as illustrated in the user interface illustrated in FIG. 6C. In some embodiments, a different sequence of inputs is used to view the overview of the navigation route.

As shown in FIG. 6D, the overview of the navigation route optionally includes detailed information about the navigation route. For example, as illustrated in FIG. 6D, the overview optionally contains an indication 618 of the total elevation change of the route (e.g., an indication of the total elevation increase, and an indication of the total elevation decrease), a graphical indication 620 of the elevation profile of the route, an indication 622*a* of the destination of the route, and indications 622*b-d* of the navigation steps/segments of the route. In some implementations, the overview of the navigation route additionally or alternatively includes a start of the route or other route-related information.

Navigation steps/segments are segments of navigation directions where the directions continue along a respective road or path. Navigation segments are optionally separated by maneuvers, such as turns, U-turns, continuations on a road or path that changes terrain or name, or other directions in which a user is instructed to take an action other than following a respective road or path. As illustrated in FIG. 6D, a navigation segment optionally is indicated by an icon (e.g., icon 624*ab*) representing a maneuver to be performed at the end of a respective navigational segment of the route, an indication 624*b* of the distance of the navigational segment of the route (e.g., the distance between the prior maneuver and the maneuver at the end of the segment), text 624*c* describing the maneuver to be performed at the end of the respective navigational segment of the route, and an indication 624*d* of a safety characteristic of the respective navigation segment. As described above, the safety characteristics of each navigational segment of the route provide information about traveling along the segment for the particular mode of transportation selected that enable the user to determine the relative safety of the navigational segment. Indications 622*c* and 622*d* include similar components to the components of indication 622*b*. As shown in FIG. 6D, other possible safety characteristics include "Dismount and Walk" and "Busy Road". In some embodiments, the electronic device can display more than one safety characteristic of each navigational segment. For example, the navigational segment corresponding to indication 622*d* can include an indications of "Busy Road" and "Bike lane" because the navigational segment includes segments of busy road, segments with a bike lane, and/or segments along a busy road with a bike lane. In some embodiments, there is no limit to the number safety characteristics displayed for a respective navigational segment. In some embodiments, more than one navigational segment of the route can include multiple safety characteristics. In some embodiments, all navigational segments of a route include one safety characteristic each.

As shown in FIG. 6D, the user selects (e.g., with contact 603) an option 626 to navigate back from the route overview user interface. In response to the user's selection, the electronic device 500 displays the user interface illustrated in FIG. 6C. If, instead of selecting the representation 628*a* of the navigation route as shown in FIG. 6C, the user scrolls the user interface down, the electronic device 500 displays the user interface illustrated in FIG. 6E. FIG. 6E illustrates representations 628*b* and 628*c* of other available navigation routes from the chosen starting point to the destination by bicycle. Representations 628*b* and 628*c* include the components similar to the components 610*a-g* of representation 628*a* described above with reference to FIG. 6C. In some embodiments, as shown in FIG. 6E, the user interface includes indications of the elevation profiles of each available route (e.g., similar to elevation profile 610*d* displayed in FIG. 6C or elevation profile 620 displayed in FIG. 6D). The elevation profiles optionally have different widths that may be proportional to the total distance of the route. In some embodiments, there is a minimum width and a maximum width at which the electronic device will display the elevation profiles. For example, if the distance of a respective route corresponds to a width that is less than the minimum width, the electronic device displays the elevation profile with the minimum width. Likewise, in some embodiments, if the distance of a respective route corresponds to a width that is greater than the maximum width, the electronic device displays the elevation profile with the maximum width. Additionally, as shown in FIG. 6E, representation 628*c* of one of the available navigation routes includes an indication 610*i* that the route includes an incline over 8%. The other indications 628*a* and 628*b* do not include an indication, e.g., indication 610*i*, of the incline over 8% because these routes do not include inclines over 8%. In some embodiments, indications of inclines that meet or exceed a certain threshold, e.g., inclines over 8% are displayed when navigating using one or more first modes of transportation (e.g., including cycling) and are not displayed when navigating using one or more other modes of transportation (e.g., driving a car).

As shown in FIG. 6E, the user scrolls the user interface, e.g., up or down. In response to the user's scrolling, the electronic device displays additional content of the user interface illustrated in FIG. 6F.

Figure 6F:
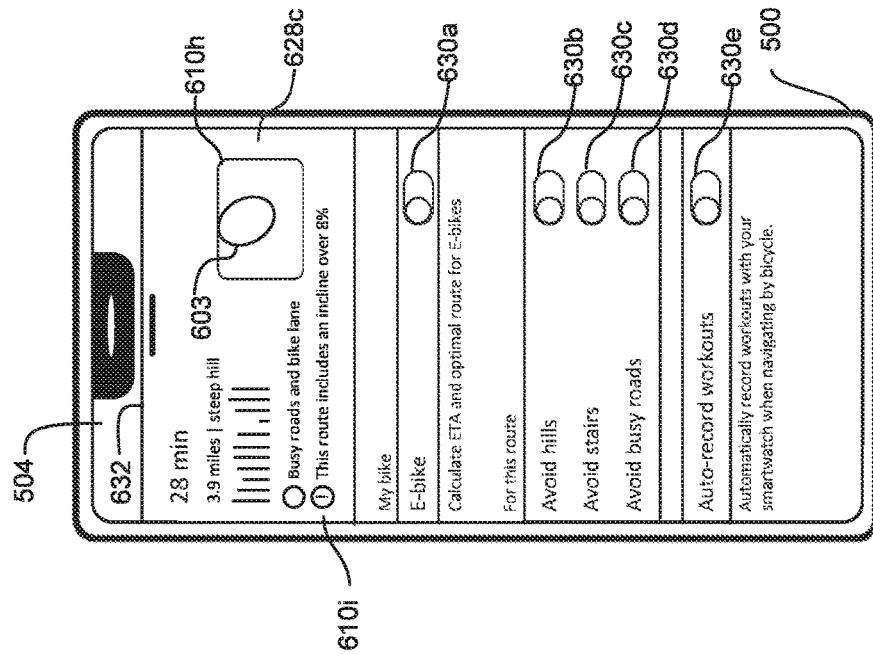
Figure 6E:
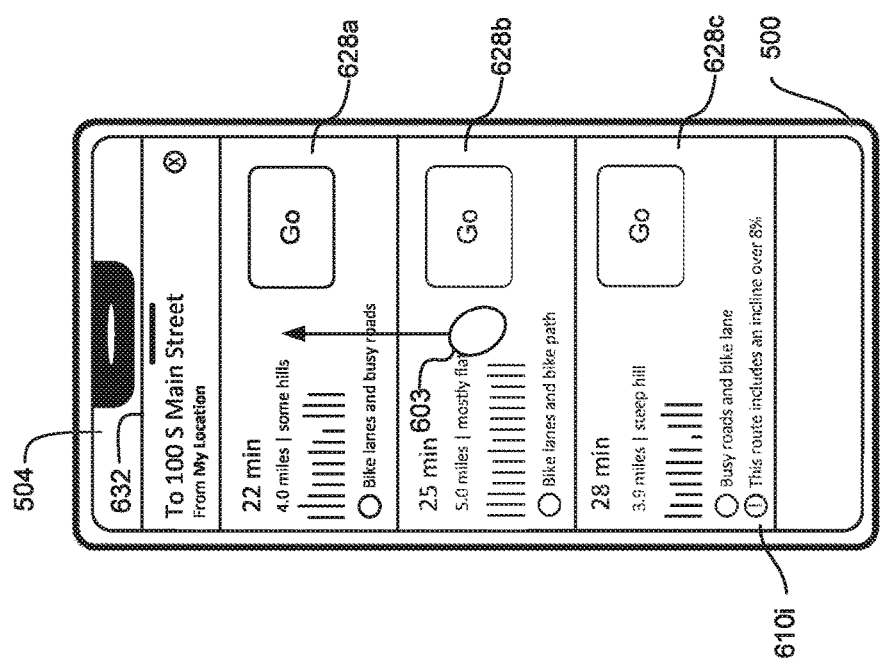
Figure 6H:
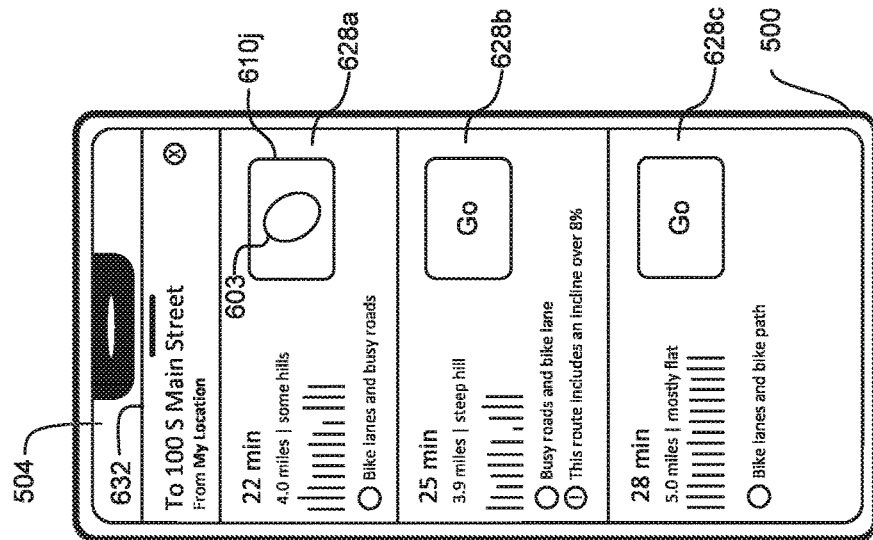

FIG. 6F illustrates a number of selectable options for changing one or more navigation settings of the electronic device 500 (e.g., settings that optionally cause device 500 to display different navigation routes than the ones displayed in FIG. 6E). For example, a user may customize bicycle navigation based on the user's bicycle and the user's personal bicycle preferences. An e-bike option 630*a* is selectable to optimize navigation routes for e-bikes. Navigation routes may be optimized for e-bikes in one or more ways such as by accepting more hills along a route than would be accepted for a bicycle that is not an e-bike, assigning heavier negative weighting to navigation routes that require the user to dismount and walk, and using (e.g., displaying) estimated times of arrival calculated based on the increased speed that is possible with an e-bike. In some embodiments, once the e-bike option is activated, it remains activated for all future cycling routes until it is deactivated. In some implementations, a user may choose to activate options that avoid one or more obstacles. The avoid hills option 630b, avoid stairs option 630c, and avoid busy roads option 630d are each selectable to avoid a respective obstacle, e.g., hills, stairs, or busy roads, for the current request for navigation directions. In some embodiments, these settings only remain in effect for one route and are automatically deactivated for future navigation requests. In some implementations, additional or alternative obstacles may be selectable to avoid in order to make a bicycling navigation experience more enjoyable for a user. In some embodiments, one or more of the options 630b, 630c, and/or 630d are not displayed. In some embodiments, the user is able to change a setting from the user interface illustrated in FIG. 6F, which may be a user interface of a maps or navigation application, or within a settings application or settings user interface to permanently avoid one or more obstacles until the respective setting is turned off, e.g., set to permanently avoid the one or more obstacles. A user may also have the option to auto-record a workout while navigating using a particular navigational mode, e.g., walking or bicycling. The auto-record workouts option 630e is selectable to enter a mode in which the electronic device 500 collects and/or record exercise data (e.g., including heart rate, location, movement, and other data) from another electronic device (e.g., a wearable device) when the other electronic device is paired to the electronic device 500 and the electronic device 500 is providing navigation directions in for a particular mode of transportation, e.g., via cycling. In some embodiments, the electronic device does not display option 630e (e.g., in embodiments in which the electronic device does not include an automatic workout tracking mode).

As shown in FIG. 6F, the user selects (e.g., with contact 603) the selectable option 610h to begin viewing navigation directions for the route represented by representation 628c. In some embodiments, in response to the user's selection, the electronic device 500 displays the user interface shown in FIG. 6G. In some embodiments, the electronic device 500 displays the user interface shown in FIG. 6G in response to a different sequence of inputs, such as selection of a region of representation 628c other than the option 6120h.

Figure 6G:
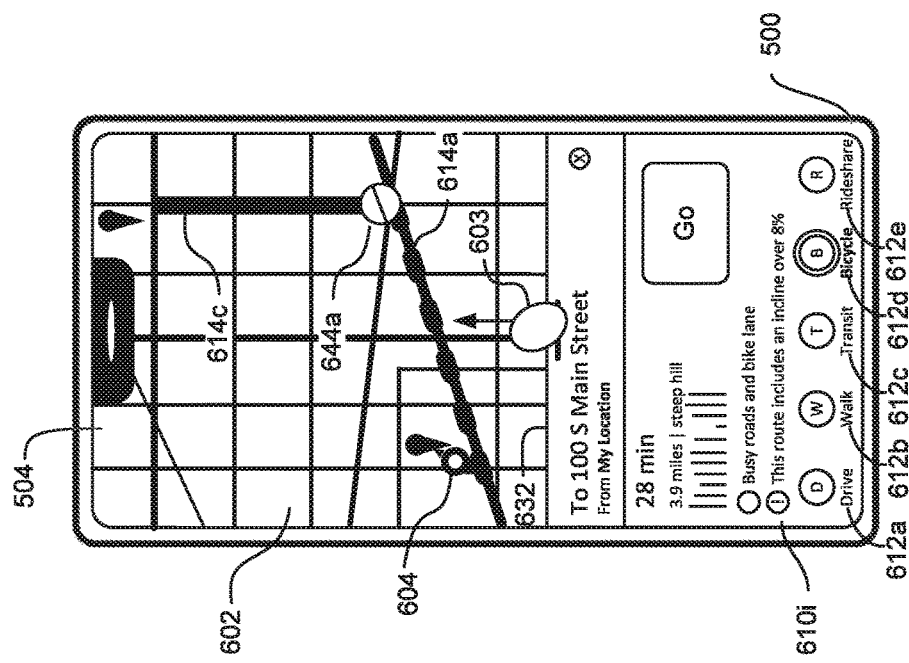
Figure 6J:
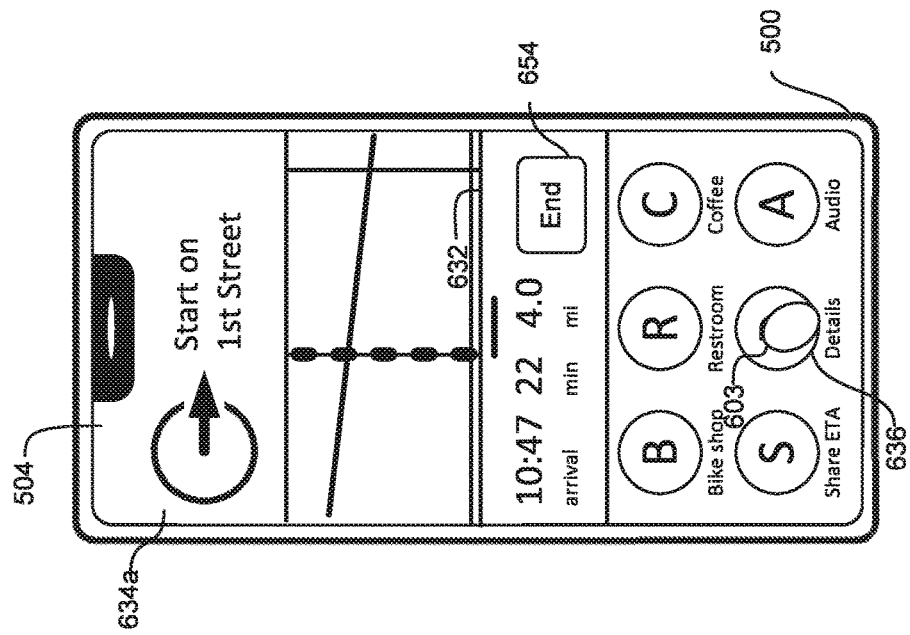

FIG. 6G illustrates the map user interface with a preview of one of the available routes (e.g., the route associated with selectable option 610h). The user interface includes a map 602 with a preview of the route, including a segment 614a on which the user is able to cycle normally and a segment 614c that has an obstacle, e.g., a hill with an incline over 8%. As shown in FIG. 6G, the navigational segments 614a that are not do not include obstacles, e.g., hills at an incline over 8%, are displayed with a first visual characteristic (e.g., solid lines) and the navigational segment 614c that includes an obstacle, e.g., a hill at an incline over 8%, is displayed with a second visual characteristic (e.g., dashed line). In some embodiments, a different visual characteristic can be used to distinguish the segment 614c having an obstacle, e.g., an incline over 8%, from segments that do not include obstacles. For example, the segments 614a that are not at an incline over 8% can be displayed in a first color (e.g., blue) and the segment 614c that is at the incline over 8% can be displayed in a second color (e.g., red). The map 602 can also include an indication 644a of the obstacle, e.g., the incline over 8%, displayed at a location on the map 602 at which the obstacle is located or for a hill, where an incline begins, and the user interface includes an additional indication 610i of the obstacle, e.g., the incline over 8%, displayed in the representation of the overall route in user interface element 632.

As shown in FIG. 6G, the user swipes (e.g., with contact 603) the user interface element 632 overlaid on the map 602 up. In response to the user's input in FIG. 6G, the electronic device presents the user interface illustrated in FIG. 6H that includes the representations 628a-c of the available navigation routes. The user interface illustrated in FIG. 6H is similar to the user interface illustrated in FIG. 6E. As shown in FIG. 6H, the user selects (e.g., with contact 603) an option 610j to begin viewing navigation directions for the route represented by indication 628a.

Figure 6I:
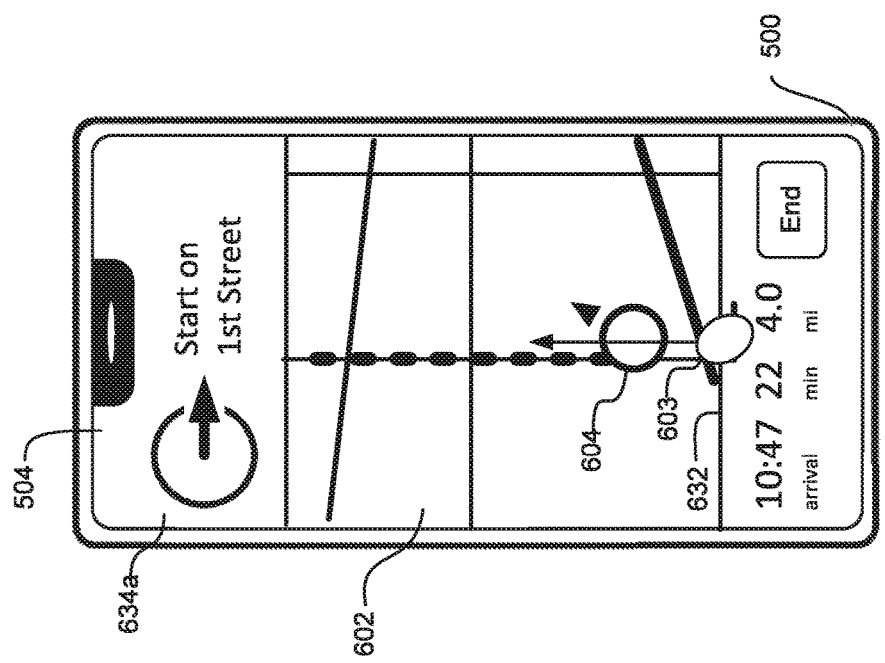

In response to one or more inputs including the input illustrated in FIG. 6H, the electronic device 500 displays the navigation user interface illustrated in FIG. 6I. As shown in FIG. 6I, the navigation user interface includes a map 602, an indication 604 of the starting point, e.g., a current location of the electronic device, an indication 634a of the next maneuver in the navigation directions, and a user interface element 632 overlaid on the map. The user interface element 632 includes information about the route, such as the estimated time of arrival, the estimated duration of the route, and the distance remaining on the route as well as a selectable option that, when selected, causes the electronic device 500 to cease presenting the navigation directions.

As shown in FIG. 6I, the user swipes (e.g., with contact 603) the user interface element 632 up. In response to the user input illustrated in FIG. 6I, the electronic device displays the user interface illustrated in FIG. 6J. As shown in FIG. 6J, the user interface element 632 is expanded to include a plurality of selectable options described in more detail below with reference to FIG. 10G. In some embodiments, one or more of the selectable options are optionally not displayed or one or more additional or alternative options are displayed. The selectable options include an option 636 that, when selected, causes the electronic device 500 to present an overview of the navigation route.

As shown in FIG. 6J, the user selects (e.g., with contact 603) the option 636 to view the overview of the navigation route. In response to the user's selection in FIG. 6J, the electronic device 500 presents the user interface illustrated in FIG. 6K. As shown in FIG. 6K, the electronic device presents an overview of the navigation route that is similar to the user interface illustrated described above with reference to FIG. 6D. Unlike the user interface illustrated in FIG. 6D, the user interface in FIG. 6K updates as the current location of the electronic device 500 updates (e.g., such as by scrolling to a location in the user interface corresponding to the next maneuver to be performed based on the location of the electronic device) because the user interface illustrated in FIG. 6K is displayed while navigating along a route, while the user interface illustrated in FIG. 6D is displayed before beginning to navigate along a route.

As described above with reference to FIG. 6F, the electronic device 500 presents a number of selectable options for adjusting one or more settings related to the navigation routes presented by the electronic device 500. The one or more settings related to navigation routes are optionally displayed while the electronic device 500 is not presenting a navigation route, thereby allowing the user to select the settings to be used for the next navigation request, for example. In some embodiments, in response to selecting an option 652 to dismiss the user interface illustrated in FIG. 6K, the electronic device 500 displays the user interface illustrated in FIG. 6J. In response to detecting selection of the option 654 to cease presenting navigation directions, the electronic device 500 presents the user interface illustrated in FIG. 6A. As described above with reference to FIGS. 6A-6F, the user is able to navigate to a user interface including a number of settings, such as the user interface illustrated in FIGS. 6F and 6L.

Figure 6L:
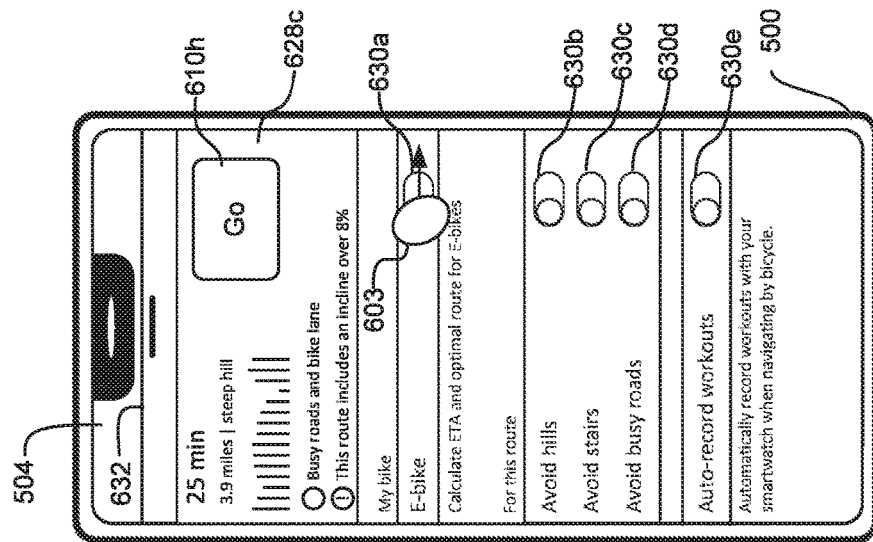
Figure 6K:
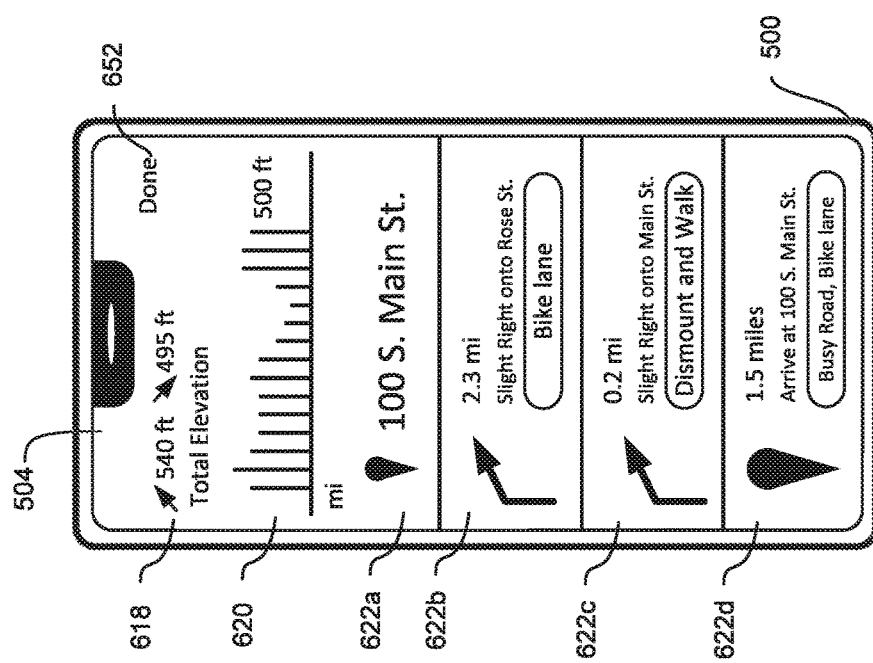
Figure 6N:
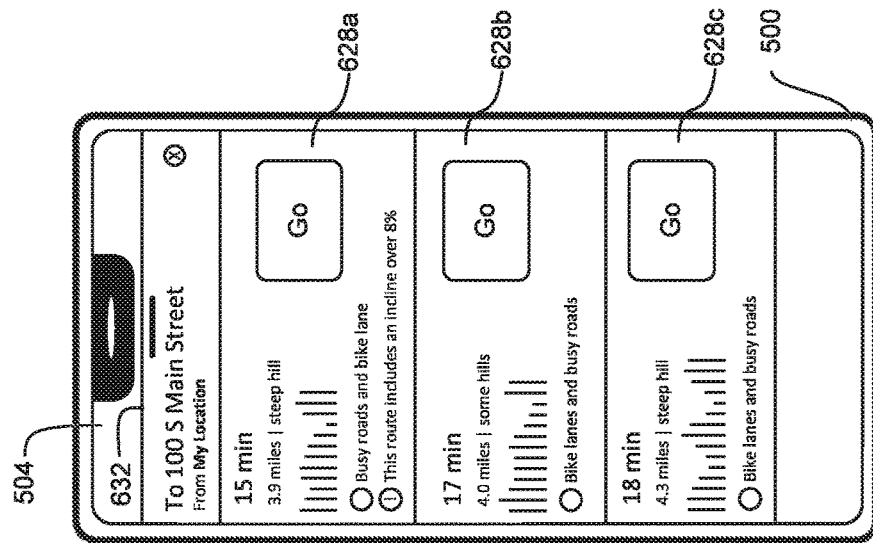
Figure 6M:
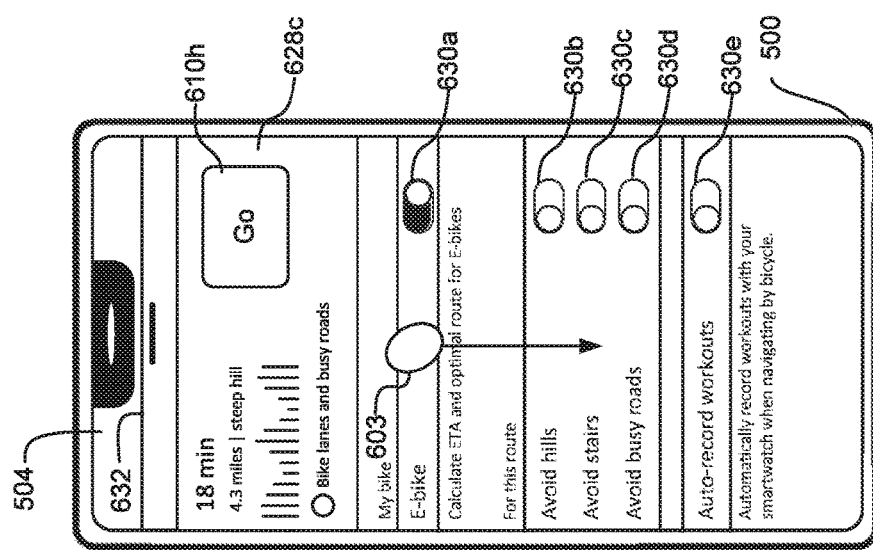

FIG. 6L illustrates the user selecting (e.g., with contact 603) the option 630*a* to optimize navigation directions for e-bicycles. In response to the user's selection in FIG. 6L, the electronic device activates the e-bicycle setting and displays the option 630*a* with a different appearance, e.g., toggled on, as shown in FIG. 6M, to indicate that the setting is activated. Also, in response to detecting selection of option 630*a* as active, the electronic device 500 updates the representations of available navigation routes. As shown in FIG. 6M, the user swipes (e.g., with contact 603) to scroll the user interface to the position illustrated in FIG. 6N.

Prior to activating the setting to present navigation directions for a particular route optimized for e-bicycles, the electronic device 500 presents representations 628*a-c* of a plurality of possible navigation routes to the requested destination, as described above with reference to FIGS. 6E and 6H. While the e-bicycle setting is activated, the electronic device 500 displays updated representations 628*a-c* of available navigation routes shown in FIG. 6N. As shown in FIG. 6N, the estimated durations of each route are shorter for bicycle navigational directions while the e-bicycle setting is activated or enabled than while the e-bicycle setting is not activated or enabled, as illustrated by the estimated durations of the navigation routes shown in FIGS. 6E and 6H. Moreover, as shown in FIG. 6N, while the e-bicycle setting is activated or enabled, the electronic device 500 presents a representation 628*a* of a route that includes a steep incline with the highest priority over the other representations 628*b-c*. When the e-bike setting was not enabled, e.g., as illustrated in FIGS. 6E and 6H, this route was not displayed as prioritized over other routes since a steep incline can be considered difficult to traverse on a bicycle. However, because a steep incline is easier to traverse using an e-bicycle than a regular bicycle, the electronic device may present this route with higher priority if it is determined to be better than other routes, e.g., shorter in distance or time, uses roads with more favorable safety characteristics (e.g., uses bike paths and bike lanes more than busy roads and shared roads), is better lit (e.g., at night), or satisfies other criteria. In some embodiments, the electronic device 500 displays one or more options for navigating to the destination using one or more additional or alternative routes that were not presented while the e-bicycle setting was disabled on the electronic device. For example, the electronic device may present one or more routes that would not be recommended for a regular bicycle (e.g., due to inclines, distances, or other criteria) when the e-bicycle option is active.

In some embodiments, the electronic device 500 detects that the user has requested navigation directions for a particular mode a predetermined number of times, e.g., 2 or 3 or 4 of 5 consecutive times. Once the electronic device 500 detects a particular mode, e.g., bicycling, a predetermined number of times, the device presents one or more selectable options related to navigation settings of that particular mode. In some embodiments, the electronic device 500 may present options for the user to select the particular mode as the default mode of transportation.

Figure 6P:
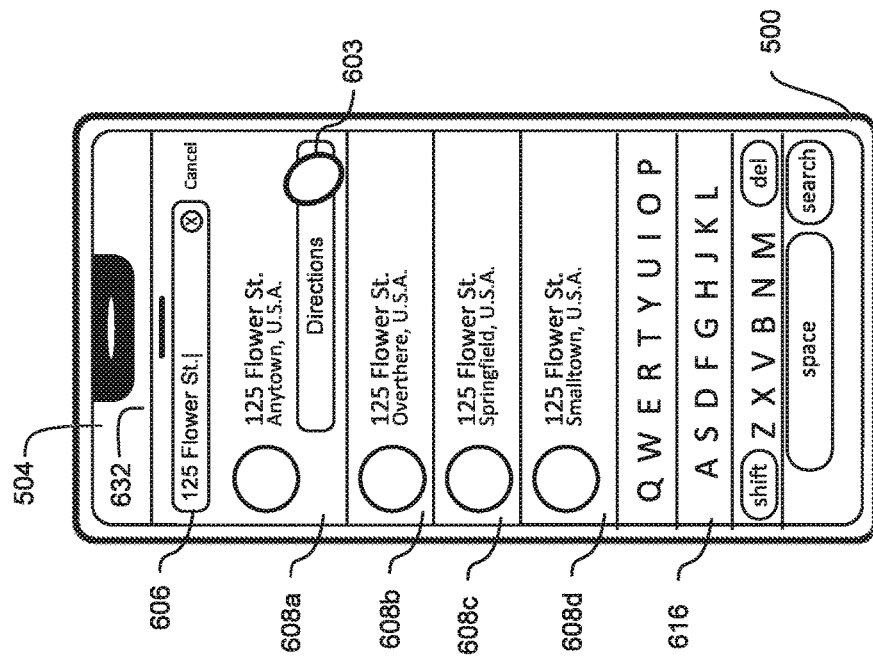
Figure 6O:
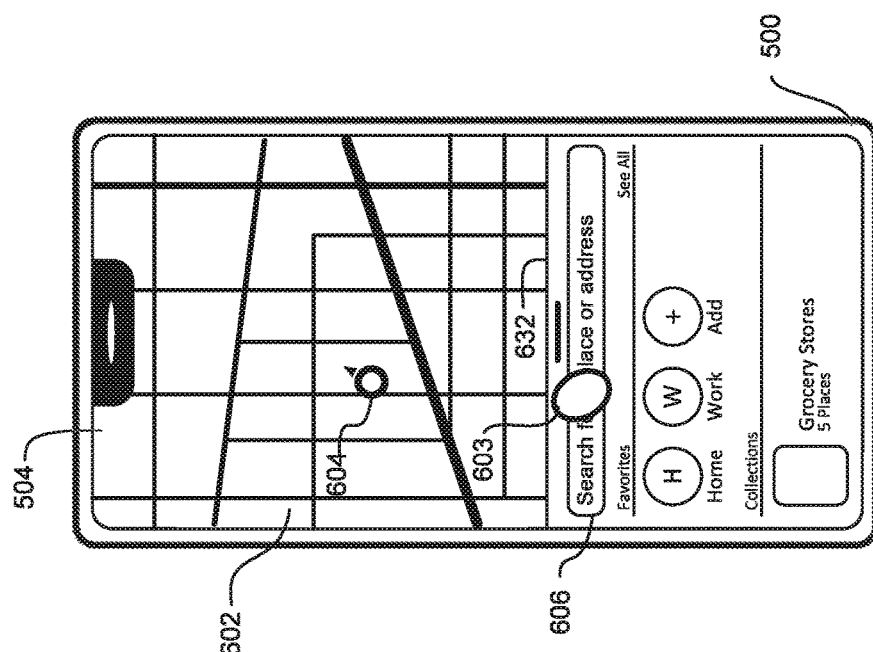
Figure 6R:
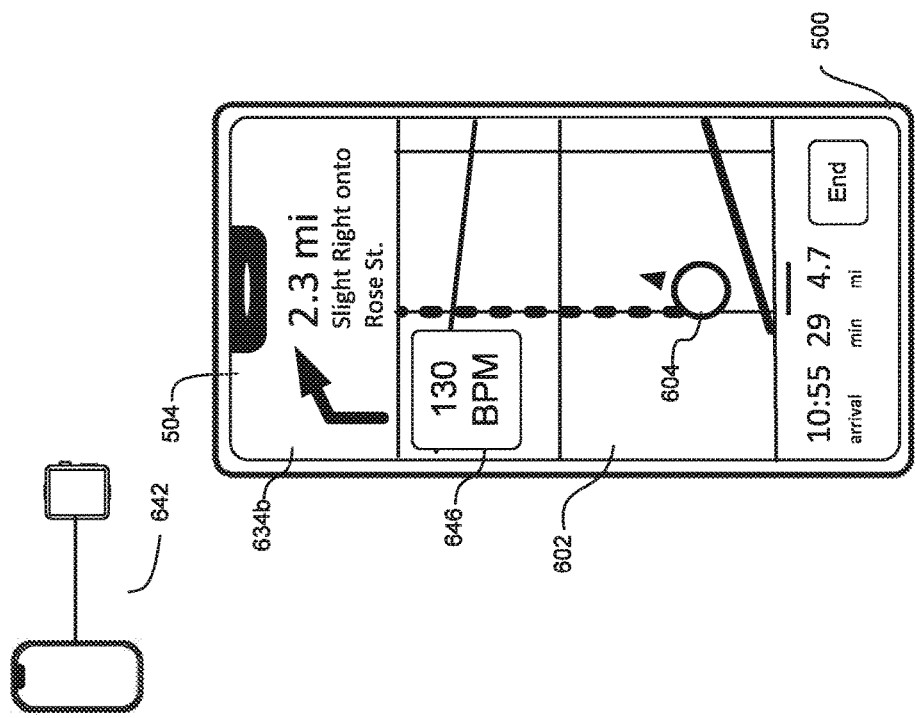

FIGS. 6O-6P illustrate the user entering inputs (e.g., with contact 603) to request navigation directions using a bicycle, e.g., a cycling mode, in a manner similar to the manner described above with reference to FIGS. 6A-6B after the user has previously requested directions using a bicycle a predetermined number of times, e.g., more than one time in a row or a threshold number of times. In response to a sequence of inputs including the inputs illustrated in FIGS. 6O-6P, the electronic device 500 displays the user interface illustrated in FIG. 6Q.

Figure 6Q:
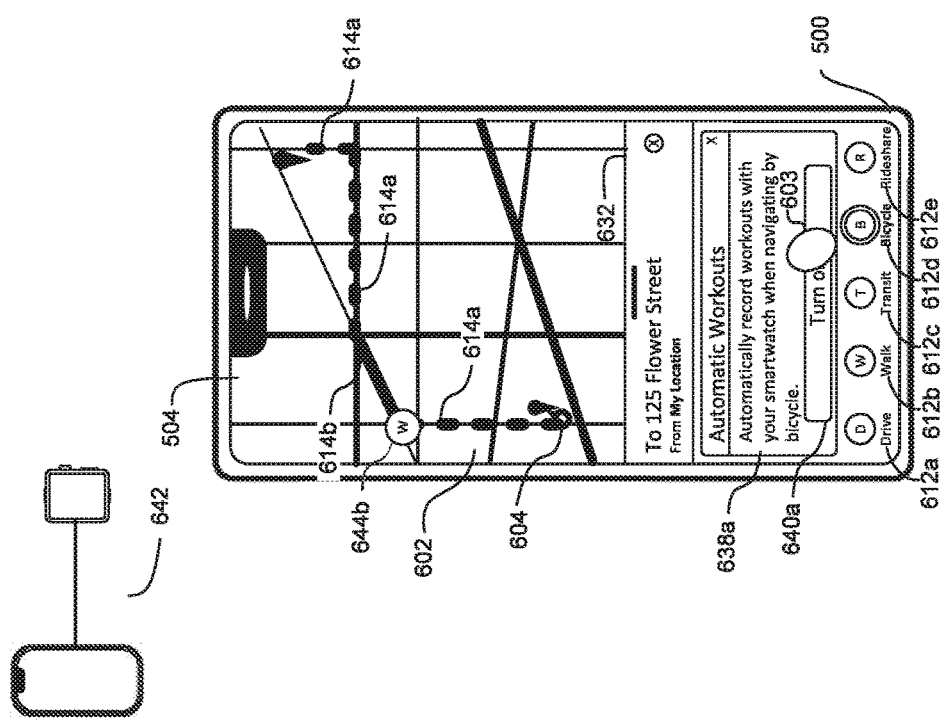
Figure 6T:
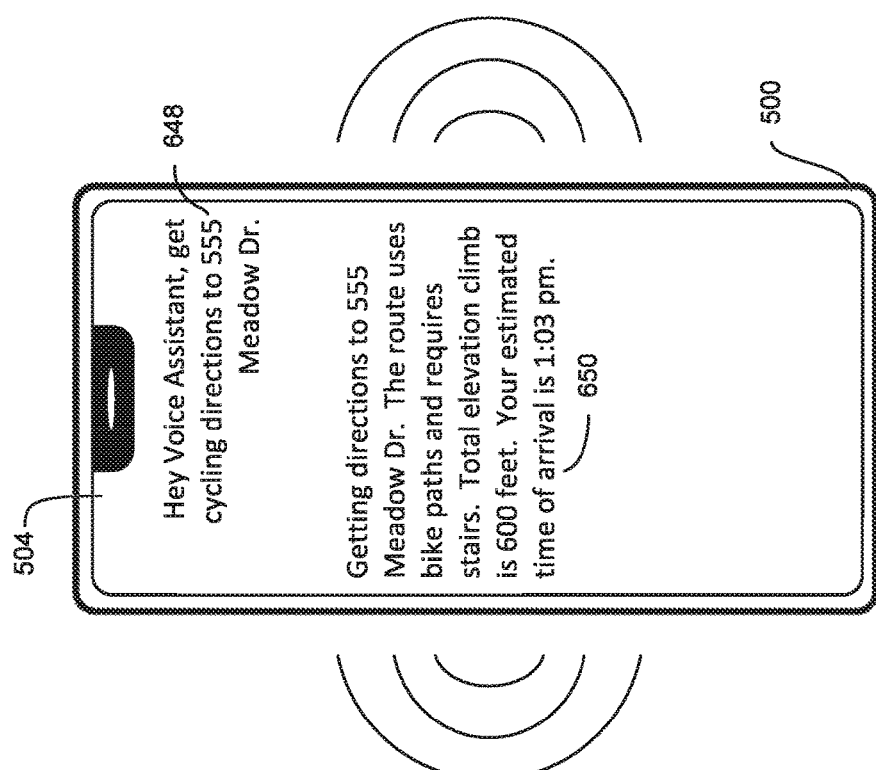

As shown in FIG. 6Q, the map 602 includes indications of 614*a* of navigation segments during which the user is able to bicycle, and navigation segments during which bicycling is not an option. In some implementations, navigation segments during which a user cannot bicycle may be displayed in a similar manner to obstacles. In FIG. 6Q, the map 602 includes an indication 644*b* of a location at which the user will have to dismount their bicycle and an indication 614*b* of a navigation segment during which the user will have to walk their bicycle. The indications 614*a* of the navigational segments for which the user is able to ride the bicycle can be displayed with a different visual characteristic (e.g., dashed lines) than the indication 614*b* of the navigational segment for which the user will have to walk (e.g., solid line). In some embodiments, rather than differentiating the segments 614*a* and 614*b* with dashed lines versus solid lines, the electronic device 500 displays navigational segments 614*a* for which the user is able to bicycle in a first color (e.g., blue) and displays navigational segments 614*b* for which the user will have to walk in a second color (e.g., red).

FIG. 6Q also illustrates an indication 638*a* of an automatic workout tracking mode, which will now be described. According to the legend 642 shown in FIG. 6Q, the electronic device 500 is in communication with another electronic device, such as a smartwatch. The smartwatch optionally includes one or more sensors, such as a heart rate sensor, an accelerometer, and/or a GPS. In some embodiments, the smartwatch is capable of tracking exercise data while in an exercise tracking mode. In some embodiments, the smartwatch is currently being worn by the user of device 500.

As shown in FIG. 6Q, in response to the user requesting navigation directions for a particular mode corresponding to exercise, e.g., bicycle or walking, a predetermined number of times (e.g., 2 or 3 or 4 or 5 etc. times) and in accordance with a determination that the electronic device 500 is in communication with the smartwatch (e.g., and/or that the smartwatch is currently being worn by the user of device 500), the electronic device 500 presents an indication 638*a* of an automatic workout tracking mode. In some embodiments, while the automatic workout tracking mode is activated, the electronic device 500 automatically tracks and/or records workout data while navigating by bicycle or walking and while the electronic device 500 is in communication with the smartwatch. The indication 638*a* includes a selectable option 640*a* that, when selected, causes the electronic device 500 to activate the automatic workout tracking mode. In some embodiments, if device 500 is not currently in communication with the smartwatch and/or the smartwatch is not currently being worn by the user, device 500 does not display indication 638*a* and/or does not track or record the workout data while navigating by the particular mode corresponding to exercise, e.g., bicycle or walking. In some embodiments, the electronic device does not display the indication 638*a* of the automatic workout tracking mode irrespective of whether or not the electronic device 500 is in communication with a wearable device (e.g., in embodiments that do not include an automatic workout tracking mode). It should be understood that an electronic device can implement one or more of the features described herein without implementing an automatic workout tracking mode without departing from the scope of the disclosure.

As shown in FIG. 6R, while the automatic workout tracking mode is activated, the electronic device 500 displays an indication 646 of workout data (e.g., heart rate, blood pressure, etc. detected by device 500 and/or the smartwatch) overlaid on a map 602 while the electronic device 500 presents the navigation directions. In some embodiments, if the automatic workout tracking mode is not activated, the electronic device 500 does not display the indication 646 of the heart rate while displaying the navigation directions. In some embodiments, if the automatic workout tracking mode is not activated and the user manually initiated workout tracking while navigating by a particular mode corresponding to exercise, e.g., bicycle, the electronic device 500 presents the indication 646 of the user's heart rate while presenting the navigation directions. In some embodiments, the electronic device 500 displays the indication 646 of the heart rate when the other electronic device (e.g., the smartwatch) is paired to the electronic device 500 regardless of whether or not the smartwatch and/or electronic device 500 are in a workout tracking mode. In some embodiments, the indication 646 of the workout data is not displayed even if the electronic device 500 is tracking workout data and/or even if the electronic device is in the automatic workout tracking mode.

Figure 6S:
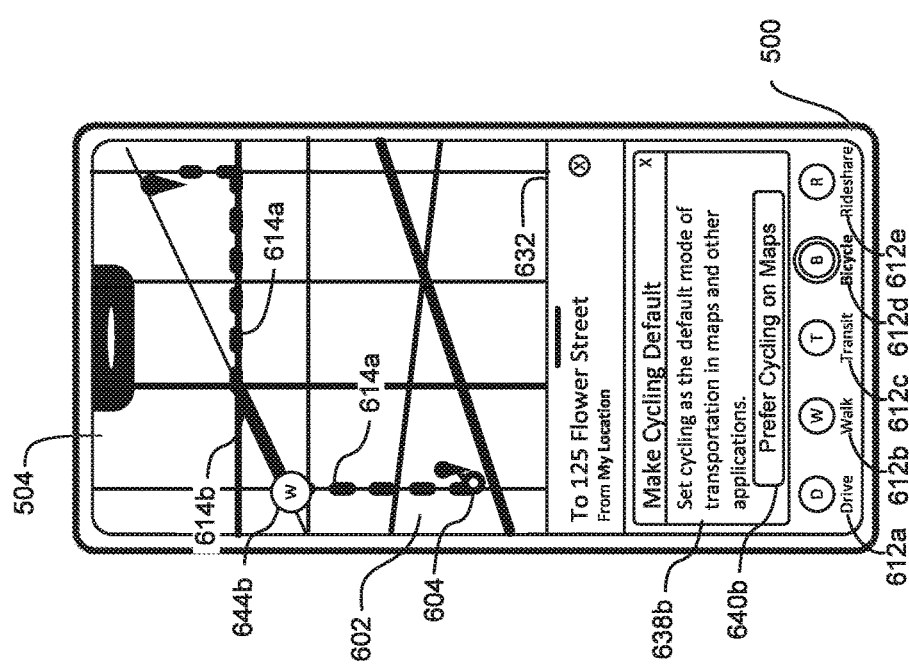
Figure 6V:
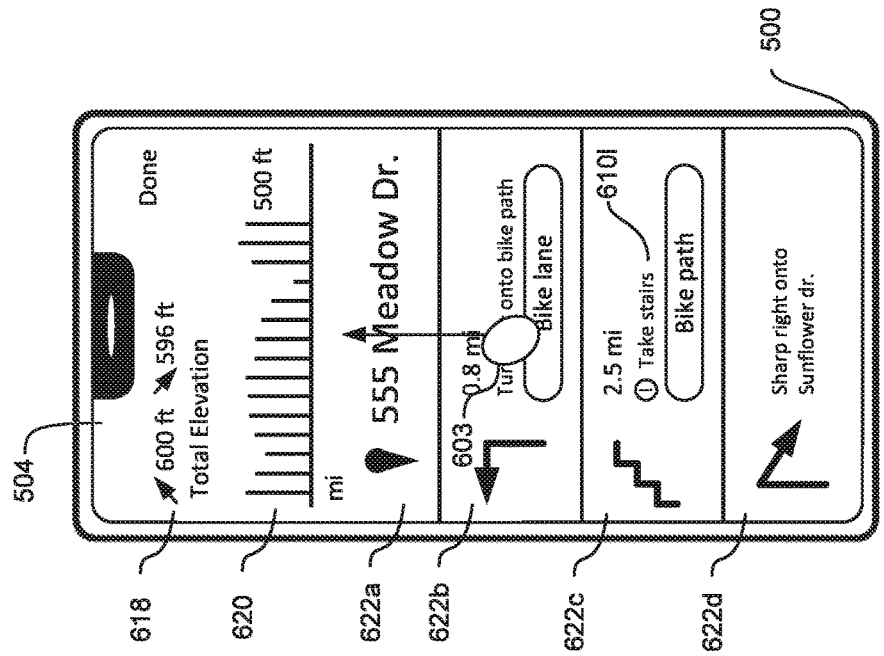

In some embodiments, in accordance with a determination that the user has requested navigation directions using a particular mode, e.g., via bicycle, a predetermined number of times, e.g., more than one time in a row or a threshold number of times, the electronic device 500 presents a selectable option, that, when selected, causes the electronic device 500 to make the particular mode, e.g., bicycle, the default mode of transportation. As shown in FIG. 6S, the electronic device 500 presents an indication 638b to make bicycle the default mode of transportation for the maps application of the electronic device 500. In some embodiments, the indication 638b is presented in response to detecting that the user has requested directions via bicycle a predetermined number times. In some embodiments, if bicycle is the default mode of transportation, the electronic device 500 presents navigation directions using bicycle by default and uses bicycle directions when calculating the estimated time between the location of the electronic device 500 and a location appearing in a user interface of an application other than the maps application, such as a location of an event stored in a calendar application of the electronic device.

In some embodiments, the electronic device 500 is able to accept an input to provide navigation directions using a voice assistant of the electronic device 500. FIG. 6T illustrates a voice assistant user interface of the electronic device 500 presented in response to a user's request for navigation directions. For example, the user interface illustrated in FIG. 6T is presented in response to the user activating the voice assistant and then speaking the request "get cycling directions to 555 Meadow Dr." In some implementations, the user can request directions using only the destination. In other implementations, the user can request directions using both the starting point and the destination. In some embodiments, the voice assistant is activated via a voice input or a different input (e.g., pressing a hardware button of the electronic device or selection of an option displayed via display 504).

As shown in FIG. 6T, in response to the user's request and before navigation has begun, the electronic device 500 may display several pieces of information about the route including: an indication 650 of safety characteristics of the route (e.g., bike paths or stairs), the elevation ascent (or descent) of the route, the total length of the route, and the estimated time of arrival. Alternatively or additionally, in some implementations, the electronic device 500 may provide information about several routes and allow the user to choose among the alternative routes to the destination. For example, the electronic device 500 may provide the user with information about two routes, one as described in FIG. 6T and a second that includes more elevation, but an earlier estimated time of arrival. The electronic device 500 may then allow the user to select between the routes. The electronic device 500 can also speak the text of indication 650 in response to the user's request. Next, in response to the user's request, the electronic device 500 presents a preview of the navigation route, e.g., the user's selected route if more than one option is available, shown in FIG. 6U (e.g., before navigation has begun).

Figure 6U:
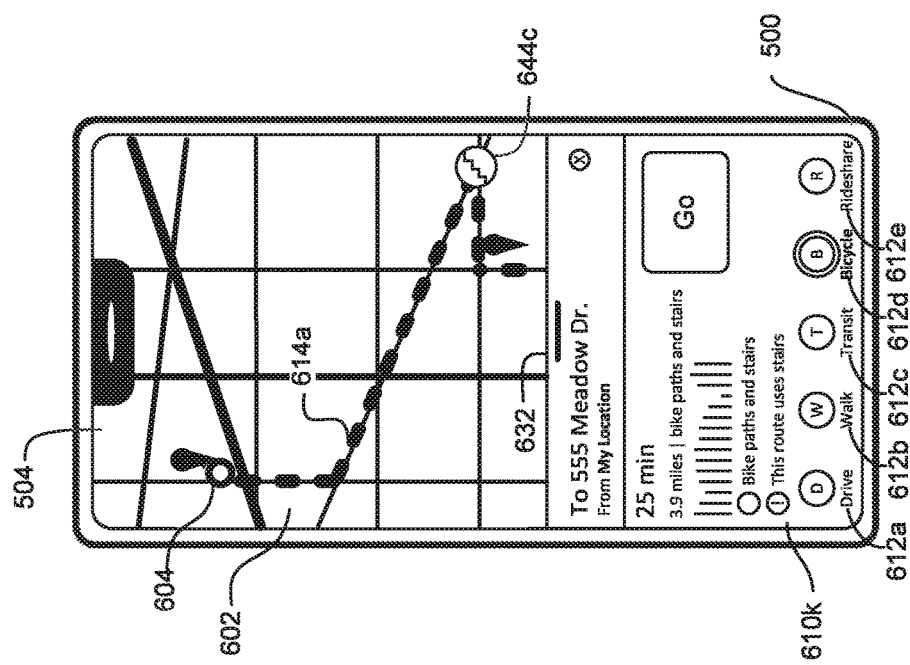
Figure 6W:
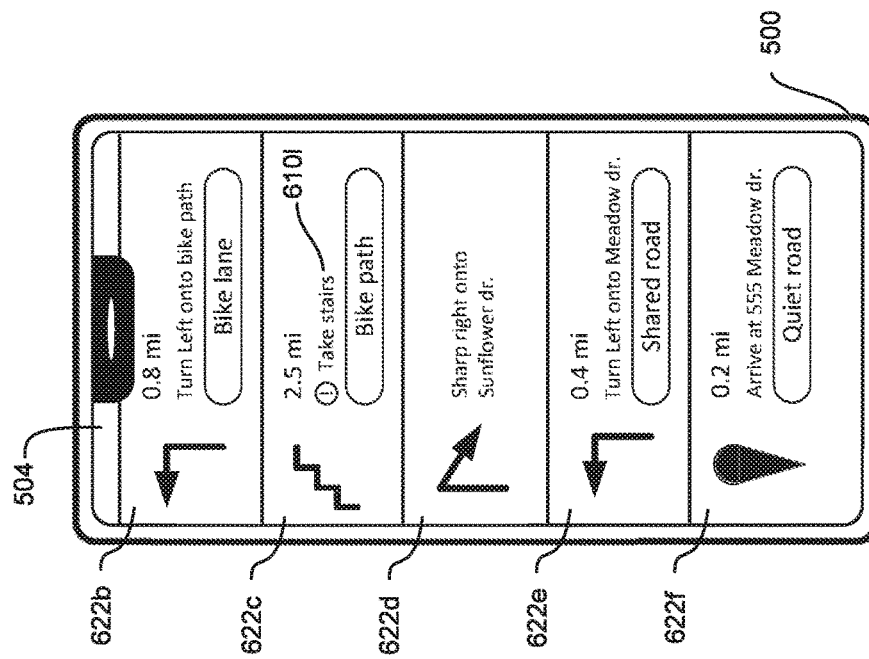

As shown in FIG. 6U, the preview of the navigation route includes a map 602 including a navigational segment 614a during which the user is able to ride the bicycle, an indication of stairs 644c overlaid on the map 602 at the location of the stairs along the route, and an additional indication 610k that the navigation route requires stairs shown in the user interface element 632.

FIGS. 6V and 6W illustrate the overview of the navigation route shown in FIG. 6U. The electronic device 500 presents the user interface illustrated in FIG. 6V in response to an input similar to the inputs illustrated in FIG. 6C or 6J. The overview of the navigation route illustrated in FIG. 6U may include the total length of the route, the total duration of the route, an indication 618 of the total elevation gain of the route (e.g., an indication of total elevation climb, and an indication of total elevation decrease), an indication 620 of the elevation profile of the route, and indications 622a-d of each navigational segment of the route. Indications 622a-d include features similar to the features 624a-d of indication 622a described above with reference to FIG. 6D. As shown in FIG. 6V, one of the indications 622c includes an indication 610l to take the stairs as part of the navigational segment (e.g., the navigational segment requires/includes stairs). The safety characteristics of the navigational segments along the route illustrated in FIG. 6V include indications of a bike lane and a bike path. In some embodiments, a bike lane is a lane reserved for bicycles that is on the same road as a road that includes one or more lanes reserved for automobiles, while a bike path is a path or road that does not allow for motor vehicles, e.g., a road reserved for bicycles or that excludes motor vehicles.

As shown in FIG. 6V, the user swipes (e.g., with contact 603) to scroll the user interface down to reveal additional indications of navigational segments of the route, as shown in FIG. 6W.

FIG. 6W illustrates additional indications 622e-f of navigational segments of the route. Like the indications 622a-d illustrated in FIG. 6V, the indications 622e-f illustrated in FIG. 6W include features similar to the features 624a-d of indication 622a described above with reference to FIG. 6D. As shown in FIG. 6W, additional safety characteristics of the navigational segments of the route include "shared road" and "quiet road." In some embodiments, a "shared road" is a road including one or more lanes accessible both to motor vehicles and bicycles and does not include bike lanes reserved for bicycles. In some embodiments, a "quiet road" is a road that is accessible to motor vehicles and bicycles that generally experiences a quantity (e.g., speed, volume, congestion) of motor vehicle traffic that meets one or more criteria or is at or below a predetermined threshold.

FIG. 7 is a flow diagram illustrating a method of displaying indications of safety characteristics along a navigation route in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

In some embodiments, method 700 is performed by an electronic device 500 in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, the electronic device 500 receives (702), via the one or more input devices, a sequence of one or more inputs (e.g., contact 603) corresponding to a request to display navigation directions using a respective mode of transportation from a first physical location to a second physical location, such as in FIG. 6B. In some embodiments, the electronic device has access to a maps application that enables the electronic device to display maps of physical locations and navigation directions between locations. The user optionally specifies a start and end location when requesting navigation directions. In some embodiments, the electronic device uses a location sensor (e.g., GPS or other positioning sensor) to identify a current location of the electronic device, thus enabling the user to request directions from the current location of the electronic device to a second location. In some embodiments, the user provides the sequence of inputs using a user interface of the maps application. In some embodiments, the user provides the sequence of inputs using a system user interface of the electronic device (e.g., voice assistant, system-wide search, etc.). In some embodiments, the sequence of the one or more inputs are received before beginning to navigate from the first physical location to the second physical location or during navigation.

In some embodiments, such as in FIG. 6D, in response to the sequence of one or more inputs corresponding to the request to display the navigation directions, the electronic device 500 displays (704), via the display generation component 504, the navigation directions including a visual representation 622b of a first navigational segment of the navigation directions and a visual representation 622c of a second navigational segment of the navigation directions. In some embodiments, the first and second navigational segments are segments of the navigation directions where the directions continue along a respective road or path. Navigational segments are optionally separated by maneuvers, such as turns, U-turns, continuation on a road or path that changes terrain or name (e.g., continuing past the end of a highway onto a surface road), or other directions where the user is instructed to take an action other than following a respective road or path or stop for a traffic signal (e.g., traffic light, stop sign, yield sign). For example, if the directions include starting on First street, turning right on Main street, and then making a U-turn, the directions include a navigational segment along First street, a first navigational segment along Main street before the U-turn, and a second navigational segment along Main street after the U-turn. In some embodiments, displaying the visual representation of each respective navigational segment includes displaying a distance of the segment and an indication of the maneuver to be performed at the end of the segment. For example, the visual representation of the first navigational segment along Main Street includes an indication of the distance along which the user will travel on Main Street before making the U-turn and an indication that, at the end of the segment, the user is instructed to make a U-turn.

In some embodiments, such as in FIG. 6D, the visual representation 622b of the first navigational segment is separate from the visual representation 622c of the second navigational segment (706).

In some embodiments, such as in FIG. 6D, the visual representation 622b of the first navigational segment includes a visual indication 624d of a safety characteristic of the first navigational segment, the safety characteristic associated with the respective mode of transportation (708). In some embodiments, the indication of the safety characteristic includes text describing the type of road or path of the segment. Optionally, if the navigation directions are for riding a bike from one location to another, the safety characteristic description includes information relevant to a person riding a bike, such as the surface of the road, the speed of the traffic, whether or not there is a bike lane with or without a physical barrier between lanes for cars, and whether or not the segment is on a bike path. For example, possible safety characteristics include "shared road," "busy road," "bike path," "quiet road," "bike lane," "steep hill," "stairs," etc. In some embodiments, the text describing the safety characteristic is displayed with a visual characteristic (e.g., color, highlighting, text size, text boldness, etc.) indicative of a level of hazard of the segment. For example, a "bike lane," "bike path," or "quiet road" is displayed in a green box; a "shared road" or "busy road" is displayed in an orange box; and a "steep hill" or "stairs" are displayed in a red box. In some embodiments, the safety characteristic provides the user with information about the relative safety of the respective navigational segment using the respective mode of transportation (e.g., a bike lane is safer than a shared road). The visual representation of the first navigational segment optionally includes the length of the segment, the maneuver to be performed at the end of the segment, and the visual indication of the safety characteristic of the first navigational segment.

In some embodiments, such as in FIG. 6D the visual representation 622c of the second navigational segment includes a visual indication of a safety characteristic of the second navigational segment (710). In some embodiments, the indication of the safety characteristic of the second navigational segment includes text describing the type of road or path of the segment. The visual representation of the second navigational segment optionally includes the length of the segment, the maneuver to be performed at the end of the segment, and the visual indication of the safety characteristic of the second navigational segment, similar to as described above with reference to the visual representation of the first navigational segment. In some embodiments, the safety characteristics of the first and second navigational segments are the same, and in some embodiments they are different, depending on the actual safety characteristics of the two navigational segments. In some embodiments, the safety characteristic of the respective navigational segment is a physical characteristic other than elevation of the respective navigational segment. The safety characteristic optionally relates to the surface of the road (e.g., "paved road"). In some embodiments, the indications of the safety characteristics shown for the respective mode of transportation are not shown for other modes of transportation. For example, when navigating by automobile, the electronic device does not display the indications shown when navigating by bicycle (e.g., does not show indications such as "shared road", "quiet road," etc., because such indications are optionally not relevant to the safety of those segments when traveling by automobile). In some embodiments, the subset of safety characteristics shown differ for different forms of transportation. For example, some of the safety characteristics shown when navigating by bicycle are the same as safety characteristics shown when navigating by walking and some of the safety characteristics shown for each mode of transportation are not used for the other mode of transportation.

The above-described manner of displaying visual indications of the safety characteristic of the navigational segments enables the electronic device to efficiently inform the user of the relative safety of the user while navigating along the route before navigation commences, which simplifies the interaction between the user and the electronic device and enhances the operability of the electronic device and makes the user-device interface more efficient (e.g., by reducing the time it takes the user to evaluate a proposed route), which additionally reduces power usage and improves battery life of the electronic device by enabling the user to use the electronic device more quickly and efficiently.

In some embodiments, such as in FIG. 6N, in accordance with a determination to use a first vehicle for the respective mode of transportation (e.g., an option to provide bicycling directions for an electronic bicycle (e.g., an "e-bike") is activated), the navigation directions are first navigation directions. In some embodiments, the user interface includes a selectable option defining a physical characteristic of the mode of transportation, such as a physical characteristic of the vehicle used by the user. The electronic device optionally includes or does not include navigational segments having respective predetermined characteristics based on whether or not the option is activated without the option being directly associated with the predetermined characteristics. For example, when an "E-bike" option is activated, the electronic device provides a route that uses steep hills and has a distance exceeding a predetermined threshold if such a route is more efficient than a shorter route or a route that does not include a steep hill. In some embodiments, the electronic device provides an estimated time of arrival at the destination that is based on whether or not the setting is activated. For example, an "E-bike" will have a shorter estimated time of arrival than a standard bicycle. In some embodiments, such as in FIG. 6H, in accordance with a determination to use a second vehicle, different from the first vehicle, for the respective mode of transportation (e.g., an option to provide bicycling directions for an electronic bicycle (e.g., an "e-bike") is not activated, therefore, a regular non-motorized bicycle will be used for the respective mode of transportation), the navigation directions are second navigation directions, different from the first navigation directions. For example, when an "E-bike" option is not activated, the electronic device provides a route that avoids steep hills and has a distance that is less than a predetermined threshold even if it would be more efficient to use a route that includes a steep hill or a distance exceeding the predetermined threshold. In some embodiments, even if the "E-bike" option is not activated, the electronic device provides a route including a steep hill or that is not the shortest route if the route satisfies other criteria not satisfied by other possible routes to the destination, such as time-based criteria, distance-based criteria, or criteria that are satisfied based on the physical characteristics of the route. In some embodiments, potential routes are evaluated against different criteria and/or the criteria are weighted differently depending on whether or not the "E-bike" option is activated.

The above-described manner of presenting a first route in accordance with the determination that the option indicating that the mode of transportation has a respective characteristic is activated and presenting a second route in accordance with the determination that the option indicating that the mode of transportation has a respective characteristic is not activated enables the electronic device to select a route based on criteria that are appropriate for the mode of transportation or vehicle being used by the user, which simplifies the interaction between the user and the electronic device and enhances the operability of the electronic device and makes the user-device interface more efficient (e.g., by reducing the number of inputs needed to receive directions for the mode of transportation or vehicle being used), which additionally reduces power usage and improves battery life of the electronic device by enabling the user to use the electronic device more quickly and efficiently.

In some embodiments, such as in FIG. 6R, in response to the sequence of one or more inputs corresponding to the request to display the navigation directions, in accordance with a determination to record user activity data while navigating using the navigation directions, the electronic device 500 collects user activity data, from a second electronic device in communication with the electronic device (as indicated in legend 642 of FIG. 6R), as the user navigates using the navigation directions. In some embodiments, a setting to record user activity data is associated with certain modes of transportation, such as cycling and walking, and not associated with other modes of transportation, such as driving or public transportation. The second electronic device optionally includes one or more sensors, such as a heart rate sensor and/or accelerometer that enable the second electronic device to estimate the user's exertion while they are exercising. In some embodiments, the second electronic device is a smartwatch. In some embodiments, the user activity data includes data from the second electronic device (e.g., heart rate data) and data measured by the first electronic device (e.g., location and/or time data). In some embodiments, when the setting to record user activity data is active, the electronic device automatically initiates tracking of activity data in response to the one or more inputs corresponding to the request to display the navigation directions at the electronic device, different from the second electronic device. In some embodiments, the activity tracking application of the electronic device awards users with "badges" or "achievements" for meeting activity goals, including special "badges" or "achievements" associated with tracking activity while navigating with the electronic device. In some embodiments, the activity tracking of the second electronic device is able to be manually initiated by the user from the second electronic device—however, when the setting, on the electronic device, to record the user activity data during the navigation directions is activate, the electronic device automatically initiates the activity tracking of the second electronic device when the navigation directions on the electronic device are initiated, as described above. In some embodiments, such as in FIG. 6I, in accordance with a determination to not record user activity data while navigating using the navigation directions, the electronic device 500 forgoes collecting the user activity data as the user navigates using the navigation directions. In some embodiments, when the setting is not active, the electronic device does not record activity data unless the electronic device detects a user input requesting that activity data be recorded. In response to detecting the user input corresponding to a request to record activity data, the electronic device optionally records activity data while the presenting the navigation directions.

The above-described manner of automatically collecting user activity data while navigating enables the electronic device to provide an efficient way of collecting workout data while the user is navigating using a mode of transportation that is also exercise for the user, which simplifies the interaction between the user and the electronic device and enhances the operability of the electronic device and makes the user-device interface more efficient (e.g., by reducing the user inputs needed to track user activity data while navigating in a way that is also exercise), which additionally reduces power usage and improves battery life of the electronic device by enabling the user to use the electronic device more quickly and efficiently.

In some embodiments, such as in FIG. 6S, in response to detecting that the user has requested navigation directions using a respective mode of transportation a predetermined number of times, the electronic device presents an option 640*b* that, when selected, causes the electronic device to activate the setting to record user activity data while navigating using the navigation directions. In some embodiments, the option is displayed within a navigation application of the electronic device. The electronic device is optionally also able to present the option in a settings user interface, different from the navigation application. In some embodiments, selection of the option displayed in the navigation application activates setting without displaying a user interface of the settings application of the electronic device or settings section of the user interface of the navigation application. For example, in response to detecting that the use has requested navigation directions via bicycle at least twice, the electronic device displays a prompt to activate the setting to record user activity data automatically whenever navigation directions by bicycle are requested.

In some embodiments, such as in FIG. 6S, in response to the sequence of one or more inputs corresponding to the request to display the navigation directions, in accordance with a determination that the request includes a request for the navigation directions using a first mode of transportation that has been requested at least a predetermined number of times, displaying, via the display generation component a selectable option 640*b* that, when selected, causes the electronic device to make the first mode of transportation a default mode of transportation for future navigation requests. For example, while the default mode of transportation is driving, the electronic device detects that the user has requested directions by bicycle a predetermined number of times and, in response, displays a prompt to change the default mode of transportation to bicycle. In some embodiments, in response to detecting selection of the option to change the default mode of transportation, the electronic device changes the default mode of transportation without displaying a settings user interface or a settings section of the navigation application. In some embodiments, the default mode of transportation is the mode of transportation for which the electronic device displays navigation directions in absence of a request to use a specific other mode of transportation. The electronic device optionally uses the default mode of transportation when calculating estimated time of arrival for display in applications other than the navigation application. For example, a calendar application optionally generates a notification when it is time to leave for an event stored in the calendar with an associated time and location based on estimating the estimated time of arrival via the default mode of transportation.

In some embodiments, such as in FIG. 6T, the sequence of one or more inputs includes an audio input directed to a virtual assistant of the electronic device (e.g., the one or more inputs include voice inputs, such as the user speaking a request for navigation directions from the first physical location to the second physical location). In some embodiments, in response to the request, the virtual assistant plays an audio response, such as a confirmation that the request was received, and displays an indication of the navigation directions. In some embodiments, such as in FIG. 6T, in response to the sequence of one or more inputs and before the user begins navigating using the navigation directions, the electronic device 500 provides an audio response indicating (1) road conditions associated with the navigational directions or (2) elevation information associated with the navigational directions. In some embodiments, the road conditions include an indication of a level of traffic along the navigation route and/or the type of roads used by the route, such as bike lanes, shared roads, bike paths, or stairs that will need to be traversed by dismounting a bicycle and walking up the stairs while carrying the bicycle. The elevation information optionally includes an elevation climb of the route. In some embodiments, the voice assistant also provides an estimated time at which the electronic device will arrive at the second physical location by following the navigational directions. In some embodiments, the audio response is a spoken audio response (e.g., the electronic device "says" the road conditions, estimated time of arrival, elevation, etc. of the route). The audio response is optionally provided before the first step of the navigation instructions have been provided and before the user has started navigating along the route. In some embodiments, the information about the road conditions along the route includes information about multiple segments of the route. The above-described manner of providing road conditions and elevation information for the duration of the route before the user begins navigating enables the electronic device to provide information about the navigation route without requiring an additional user input and without requiring the user to look at the display generation component, which simplifies the interaction between the user and the electronic device and enhances the operability of the electronic device and makes the user-device interface more efficient (e.g., by providing an efficient way for the user to access information relevant to the navigation route before starting to travel along the route), which additionally reduces power usage and improves battery life of the electronic device by enabling the user to use the electronic device more quickly and efficiently.

In some embodiments, the electronic device generates an indication with an estimated travel time from a current location of the electronic device to a location associated with an event on a calendar accessible to the electronic device. For example, the calendar application includes information associated with the event, including a time and location of the event. The electronic device optionally calculates an estimated time of arrival at the location of the event from the current location of the electronic device. In some embodiments, in accordance with a determination that the user must leave the current location of the electronic device within a threshold amount of time (e.g., 15, 20 minutes) in order to arrive at the location of the event by the time of the event, the electronic device generates an indication that it is time to leave. In some embodiments, in accordance with a determination that a first mode of transportation is a default mode of transportation for providing navigational directions with the electronic device, the estimated travel time is based on navigational directions using the first mode of transportation. For example, if driving is the default mode of transportation, the electronic device uses the estimated time of arrival via driving to generate the notification that it is time to leave. In some embodiments, in accordance with a determination that a second mode of transportation is the default mode of transportation for providing navigational directions with the electronic device, the estimated travel time is based on navigational directions using the second mode of transportation. For example, if bicycle is the default mode of transportation, the electronic device uses the estimated time of arrival via bicycle to generate the notification that it is time to leave.

In some embodiments, such as in FIG. 6S, the request to display navigation directions includes a request for the navigation directions using a first mode of transportation (e.g., bicycle). In some embodiments, such as in FIG. 6S, the electronic device 500 displays the navigation directions includes displaying a visual representation of the navigation directions on a map 602, including a first respective segment 614a accessible via the respective mode of transportation and a second respective segment 614b not accessible via the respective mode of transportation, and a visual indication 644b of a location at which the respective mode of transportation is not permitted. For example, navigation directions for bicycle includes a portion of the route for which bicycling is not permitted. In this example, the electronic device notifies the user to dismount the bicycle and walk for the portion of the route for which bicycling is not permitted. In some embodiments, such as in FIG. 6S, the first respective segment 614a is displayed on the map 602 with a visual characteristic having a first value (e.g., the first respective segment is displayed in a first color, such as blue). In some embodiments, such as in FIG. 6S, the second respective segment 614b is displayed on the map 602 with the visual characteristic having a second value, different from the first value. In some embodiments, the second respective segment is displayed in a second color, such as red. In some embodiments, other visual characteristics, such as line thickness or line style (e.g., dotted lines, dashed lines, solid lines, multi-line) are used to distinguish the two segments of the navigation directions. The above-described manner of displaying the first segment with the visual characteristic having the first value and displaying the second segment with the visual characteristic having a second value enables the electronic device to quickly and efficiently indicate on the map which segments of the route are not accessible via the first mode of transportation, which simplifies the interaction between the user and the electronic device and enhances the operability of the electronic device and makes the user-device interface more efficient (e.g., by reducing the inputs needed to view the route on the map and view the segments of the route not accessible by the first mode of transportation), which additionally reduces power usage and improves battery life of the electronic device by enabling the user to use the electronic device more quickly and efficiently.

In some embodiments, such as in FIG. 6C, in response to the sequence of one or more inputs corresponding to the request to display the navigation directions and before determining that the user has begun traveling along the navigation directions, the electronic device displays via the display generation component, an indication of an estimated time of arrival 610b at the second physical location, a distance 610c of the navigational directions, and a description of a safety characteristic 610f of the navigational directions. The electronic device optionally displays this information in accordance with a determination that the electronic device is a "small-screen" electronic device, such as a wearable device (e.g., a smart watch) and, in accordance with a determination that the electronic device is a different electronic device, such as a tablet or smartphone, the electronic device displays different information prior to starting the navigation route. In some embodiments, the description of the road condition includes a description of the type of roads used by the route, such as bike lanes, shared roads, paved or unpaved roads, bike paths, or stairs which will need to be traversed by dismounting the bicycle and walking up the stairs while carrying the bicycle. In some embodiments, the road conditions also include a subjective text description of the elevation profile of the route (e.g., "mostly flat," "some hills," "steep climb").

In some embodiments, while displaying the indication of the estimated time of arrival at the second physical location, the distance of the navigational directions, and the description of the road condition of the navigational directions, the electronic device receives, via the one or more input devices, an input corresponding to a request to display an elevation profile of the navigation directions. For example, the electronic device detects a request to scroll the user interface down. In some embodiments, in response to the one or more inputs corresponding to the request to display the elevation profile of the navigation directions, the electronic device displays, via the display generation component, an indication of the elevation profile of the navigation directions. For example, the electronic device scrolls the user interface down to reveal a portion of the user interface that includes the elevation profile. The elevation information optionally includes a number indicating the total elevation climb along the route and a visual representation of the elevation along the route. In some embodiments, the electronic device displays the elevation information in response to the input in accordance with a determination that the electronic device is a "small screen" electronic device, such as a wearable device (e.g., a smartwatch). In accordance with a determination that the electronic device is a different type of electronic device, such as a smartphone or tablet, the electronic device optionally displays the elevation information in response to the request for navigation directions rather than in response to an additional input requesting that the elevation information be displayed.

In some embodiments, such as in FIG. 6G, in accordance with a determination that a respective navigational segment 614c of the navigation directions includes an elevation offset that satisfies one or more criteria, the electronic device 500 displays the navigation directions includes displaying a visual indication 644a of the elevation offset in association with the respective navigational segment. In some embodiments, in accordance with a determination that the navigation directions do not include a navigational segment including an elevation offset satisfying the one or more criteria, the electronic device forgoes displaying a visual indication of the elevation offset. In some embodiments, the visual indication of the elevation offset includes an image overlaid on the map of the route that indicates a steep climb up a hill and/or text at a location in the user interface different from the map indicating a steep climb up a hill. The above-described manner of presenting the visual indication of the elevation offset in association with the respective navigational segment enables the electronic device to efficiently indicate that the route includes an elevation offset that satisfies the one or more criteria, which simplifies the interaction between the user and the electronic device and enhances the operability of the electronic device and makes the user-device interface more efficient (e.g., by reducing the number of inputs needed to view the route on the map and the location of the elevation offset that satisfies the one or more criteria), which additionally reduces power usage and improves battery life of the electronic device by enabling the user to use the electronic device more quickly and efficiently.

In some embodiments, such as in FIG. 6U, in accordance with a determination that a respective navigational segment of the navigation directions includes stairs, displaying the navigation directions includes displaying a visual indication 644c and 610k of an existence of stairs with the respective navigational segment. In some embodiments, in accordance with a determination that the navigation directions do not include stairs, the electronic device forgoes displaying a visual indication of the stairs. In some embodiments, such as in FIG. 6U, the visual indication 644c of the stairs includes an image overlaid on the map of the route that indicates stairs and/or text 610k at a location in the user interface different from the map indicating stairs. The above-described manner of presenting the visual indication of the stairs in association with the respective navigational segment enables the electronic device to efficiently indicate that the route includes an stairs, which simplifies the interaction between the user and the electronic device and enhances the operability of the electronic device and makes the user-device interface more efficient (e.g., by reducing the number of inputs needed to view the route on the map and the location of the stairs), which additionally reduces power usage and improves battery life of the electronic device by enabling the user to use the electronic device more quickly and efficiently.

In some embodiments, such as in FIG. 6D, the safety characteristic 624d of a respective navigational segment comprises a visual indication that the respective navigational segment includes (1) a road having one or more lanes accessible both to automobiles and bicycles, (2) a road accessible to automobiles at one or more of a speed or volume greater than a predetermined threshold, (3) a bike path, (4) a road accessible to automobiles at one or more of a speed or volume less than a predetermined threshold, (5) a bike lane, (6) a hill at an incline that exceeds a predetermined threshold, (7) stairs, or (8) information about the modes of transportation permitted to access the respective navigational segment. In some embodiments, the electronic device presents an indication that the navigational segment includes a "shared road" having one or more lanes accessible to both bicycles and automobiles. The electronic device optionally presents the indication of a "shared road" when presenting navigation directions by bicycle. In some embodiments, in accordance with a determination that the respective navigational segment does not include a road having one or more lanes accessible both to automobiles and bicycles, the visual indication does not include an indication of a road having one or more lanes accessible both to automobiles and bicycles. The above-described manner of displaying the visual indication of the road having one or more lanes accessible to both automobiles and bicycles enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

In some embodiments, such as in FIG. 6C, the electronic device presents an indication 610e that the navigational segment includes a "busy road" having one or more lanes accessible to both bicycles and automobiles, where the automobile traffic typically or currently exceeds a speed or volume (e.g., number of automobiles) threshold. The electronic device optionally presents the indication of a "busy road" when presenting navigation directions by bicycle. In some embodiments, in accordance with a determination that the respective navigational segment does not include a road accessible to automobiles at one or more of a speed or volume greater than a predetermined threshold the visual indication does not include an indication of a road accessible to automobiles at one or more of a speed or volume greater than a predetermined threshold. The above-described manner of displaying the visual indication of the road accessible to automobiles at a speed or volume greater than a threshold enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

Figure 10B:
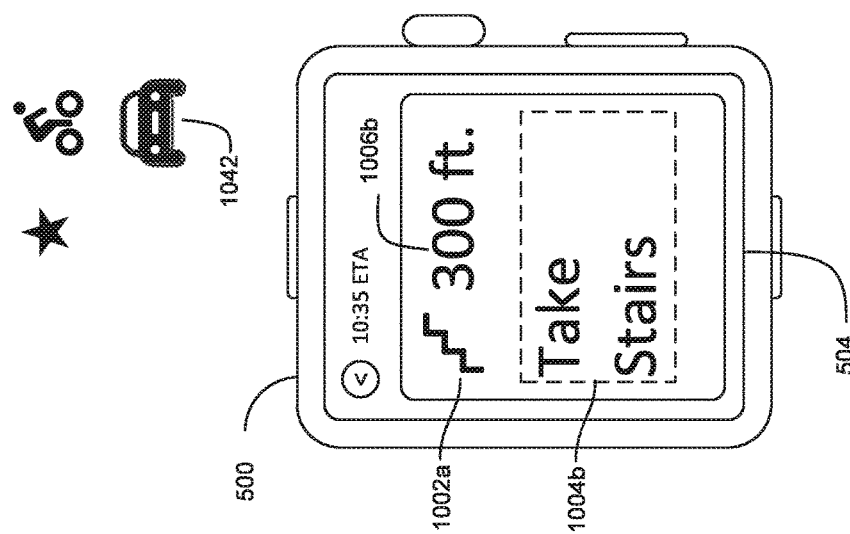
FIGS. 10A-10Q illustrate various ways the electronic device presents indications of navigation directions while navigating along a route according to some embodiments.
Figure 10A:
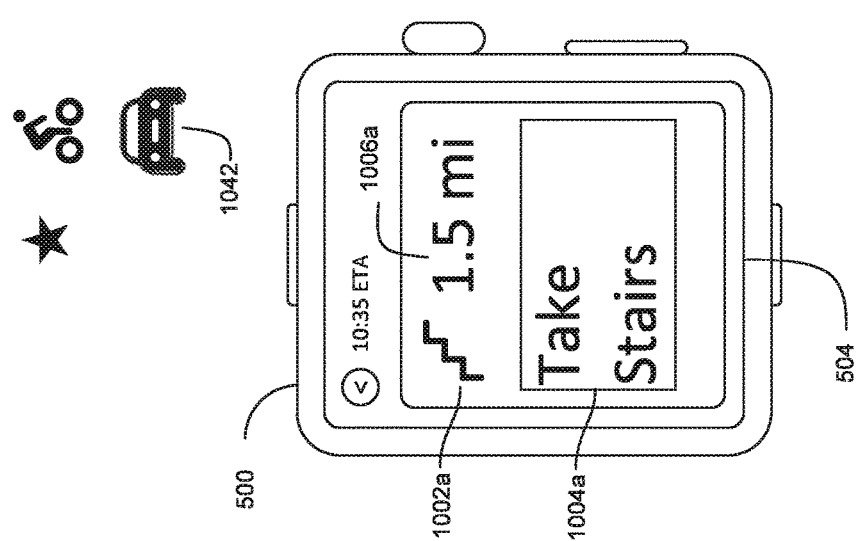
Figure 10D:
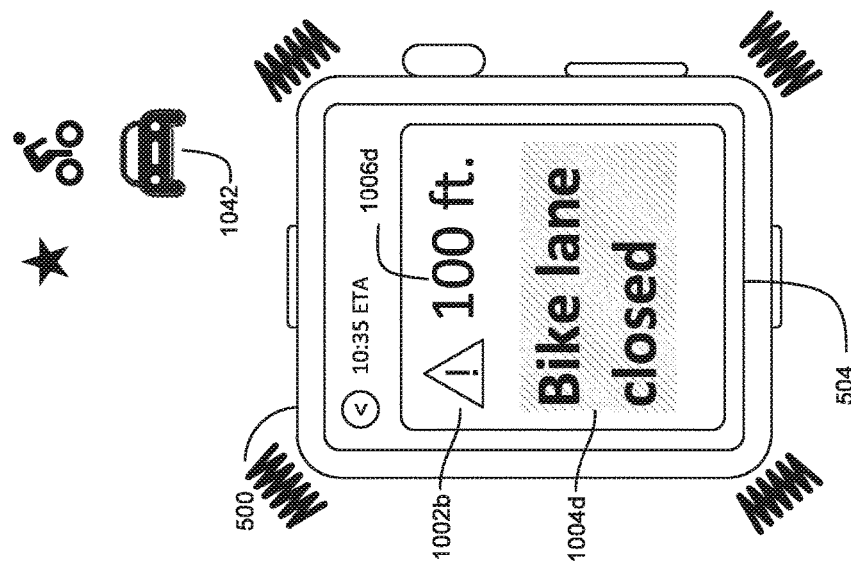
Figure 10C:
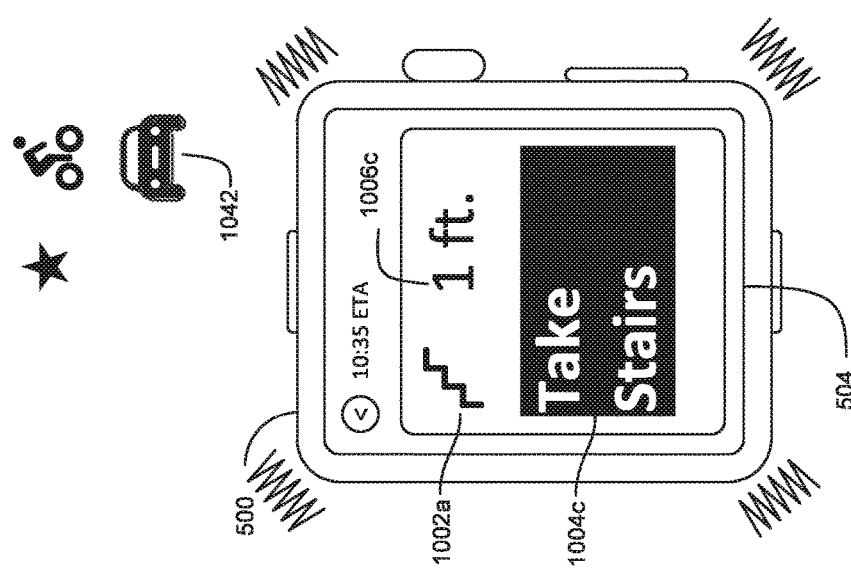
Figure 10F:
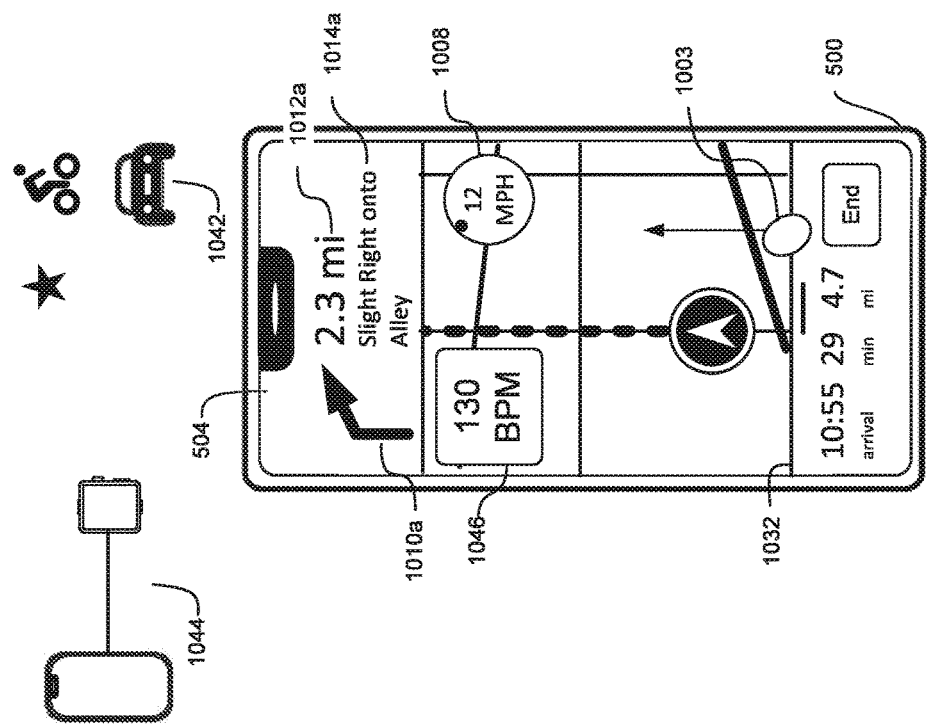
Figure 10E:
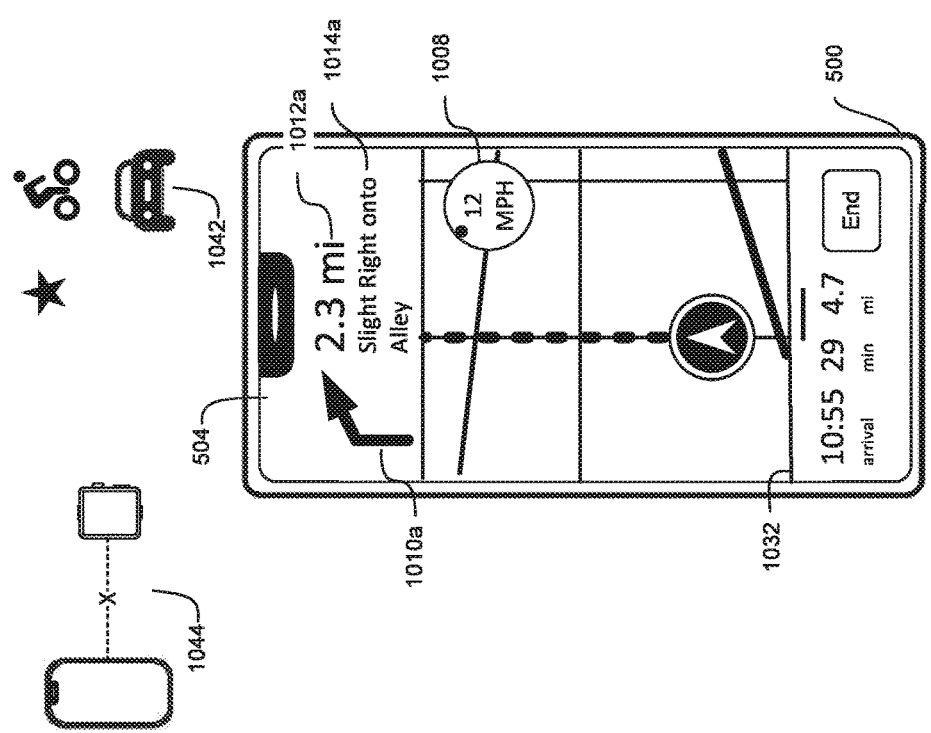

In some embodiments, such as in FIG. 10E, the electronic device presents an indication that the navigational segment is a "bike path" that is not accessible to automobiles (e.g., as opposed to a roadway that includes a bike lane, such that the segment would be accessible to both bicycles and vehicles). The bike path is optionally accessible only to bicycles or is optionally accessible to bicycles and pedestrians. The electronic device optionally presents the indication of a "bike path" when presenting navigation directions by bicycle. In some embodiments, in accordance with a determination that the respective navigational segment does not include a bike path, the visual indication does not include an indication of a bike path. The above-described manner of displaying the visual indication of the bike path enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

In some embodiments, such as in FIG. 6W, the electronic device presents an indication that the navigational segment includes a "quiet road" having one or more lanes accessible to both bicycles and automobiles, where the automobile traffic typically or currently has a speed or volume (e.g., number of automobiles) less than a predetermined threshold. The electronic device optionally presents the indication of a "quiet road" when presenting navigation directions by bicycle. In some embodiments, in accordance with a determination that the respective navigational segment does not include a road accessible to automobiles at one or more of a speed or volume less than a predetermined threshold the visual indication does not include an indication of a road accessible to automobiles at one or more of a speed or volume less than a predetermined threshold. The above-described manner of displaying the visual indication of the road accessible to automobiles at a speed or volume less than a threshold enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

In some embodiments, such as in FIG. 6W, the electronic device presents an indication that the navigational segment includes a "bike lane" accessible to bicycles that is situated next to a lane accessible to automobiles. In some embodiments, the electronic device presents an indication of a "protected bike lane" if the segment includes a bike lane with a physical barrier between the bike lane and automobile traffic. In some embodiments, the electronic device presents an indication if the bike lane does not have a barrier between the bike lane and automobile traffic. The electronic device optionally presents the indication of a "bike lane" when presenting navigation directions by bicycle. In some embodiments, in accordance with a determination that the respective navigational segment does not include a bike lane, the visual indication does not include an indication of a bike lane. The above-described manner of displaying the visual indication of the bike lane enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

In some embodiments, such as in FIG. 6E, the electronic device presents an indication 610*i* that the navigational segment includes a "steep hill" having an incline that exceeds a predetermined threshold (e.g., 6%, 7%, 8%, 9%, 10% grade). The electronic device optionally presents the indication of a "steep hill" when presenting navigation directions by bicycle. In some embodiments, in accordance with a determination that the respective navigational segment does not include a hill at an incline that exceeds a predetermined threshold the visual indication does not include an indication of a hill at an incline that exceeds a predetermined threshold. The above-described manner of displaying the visual indication of the hill at the incline exceeding a predetermined threshold enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

In some embodiments, such as in FIG. 6U, the electronic device presents an indication 644*c* or 610*k* that the navigational segment includes stairs. The electronic device optionally presents the indication of stairs when presenting navigation directions by bicycle. In some embodiments, in accordance with a determination that the respective navigational segment does not include stairs, the visual indication does not include an indication of stairs. The above-described manner of displaying the visual indication of the stairs enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

In some embodiments, such as in FIG. 6W, the safety characteristic includes information about the types of vehicles permitted to use the lane of the respective navigational segment that is used by the respective mode of transportation. For example, a shared road is accessible to bicycles and cars, while a bike lane is accessible to bicycles and is next to a lane that is accessible to cars, and a bike path is accessible to bicycles but not accessible to cars. The above-described manner of providing information about the modes of transportation permitted to access the respective navigational segment enables the electronic device to efficiently communicate to the user the type of road of the navigational segment, which simplifies the interaction between the user and the electronic device and enhances the operability of the electronic device and makes the user-device interface more efficient (e.g., by reducing the number of inputs needed to determine the type of road of the navigational segment), which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 700 described above with respect to FIG. 7. For example, the ways of presenting safety characteristics of one or more navigational segments described above with reference to method 700 optionally have one or more of the characteristics of the ways of presenting navigation options, presenting indications of navigation directions, etc., described herein with reference to other methods described herein (e.g., methods 900 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, displaying operation 704 and receiving operation 702 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Presenting Navigation Options

Users interact with electronic devices in many different manners, including using the electronic device to obtain navigation routes from a first physical location to a second physical location. The embodiments described below provide ways in which an electronic device presents one or more navigation direction options for the navigation directions. Presenting one or more navigation direction options enhances interactions with a device, thus reducing the amount of time needed by a user to perform navigational operations, and thus reducing the power usage of the device, which increases battery life for battery-powered devices. It is understood that people use devices. When a person uses a device, that person is optionally referred to as a user of the device.

Figure 8D:
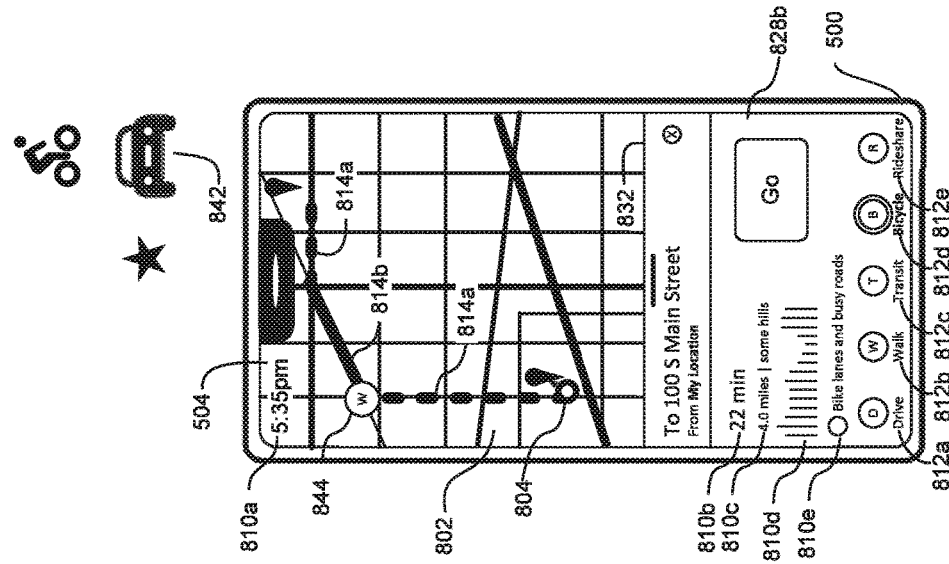
FIGS. 8A-8P illustrate exemplary ways in which the electronic device presents various navigation options according to some embodiments.
Figure 8C:
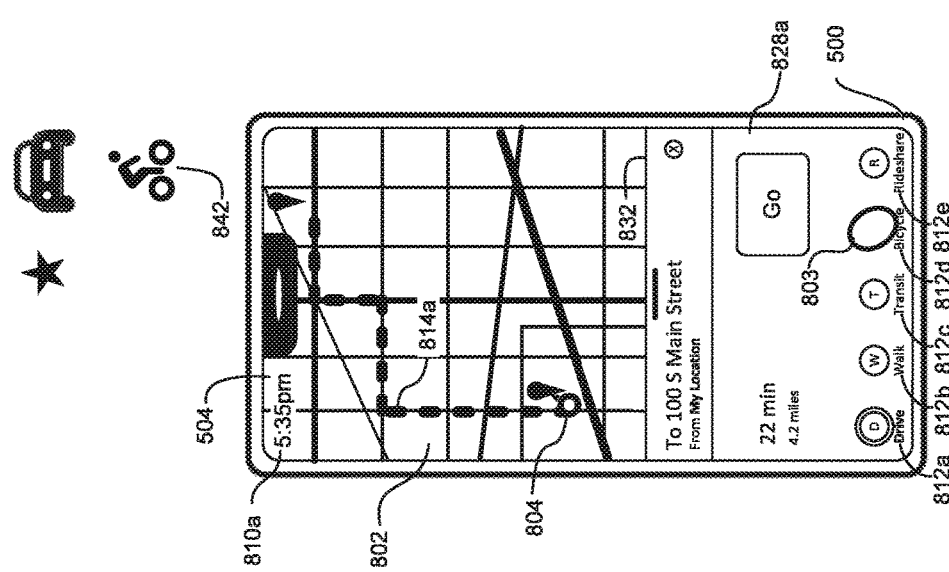
Figure 8F:
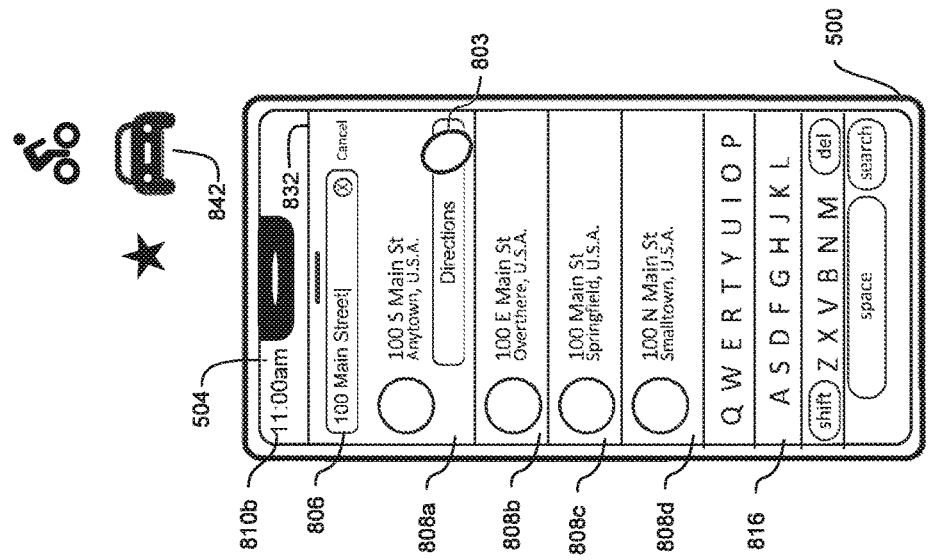
Figure 8E:
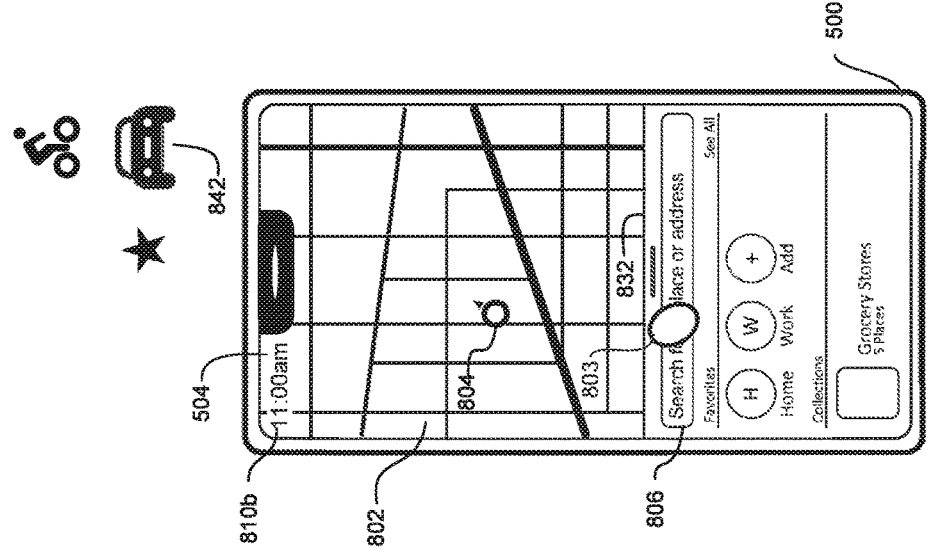
Figure 8H:
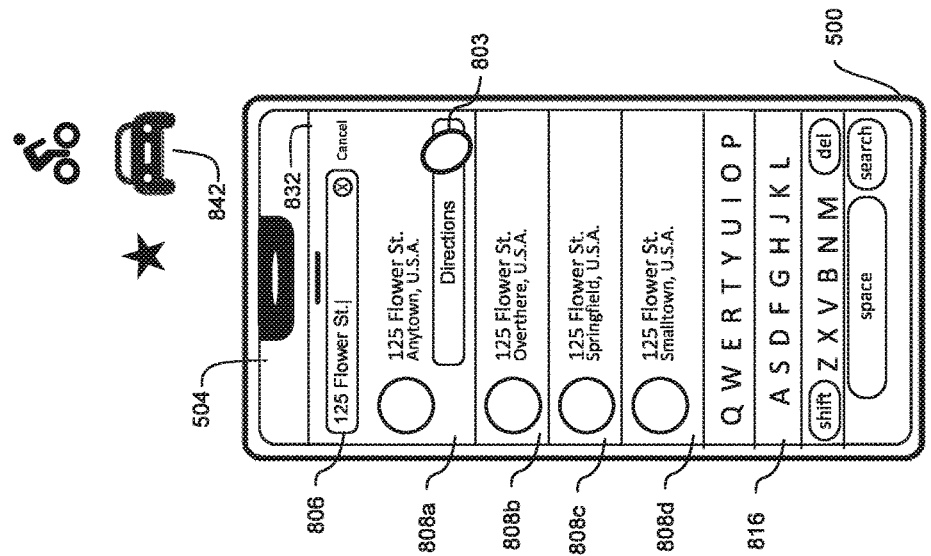
Figure 8G:
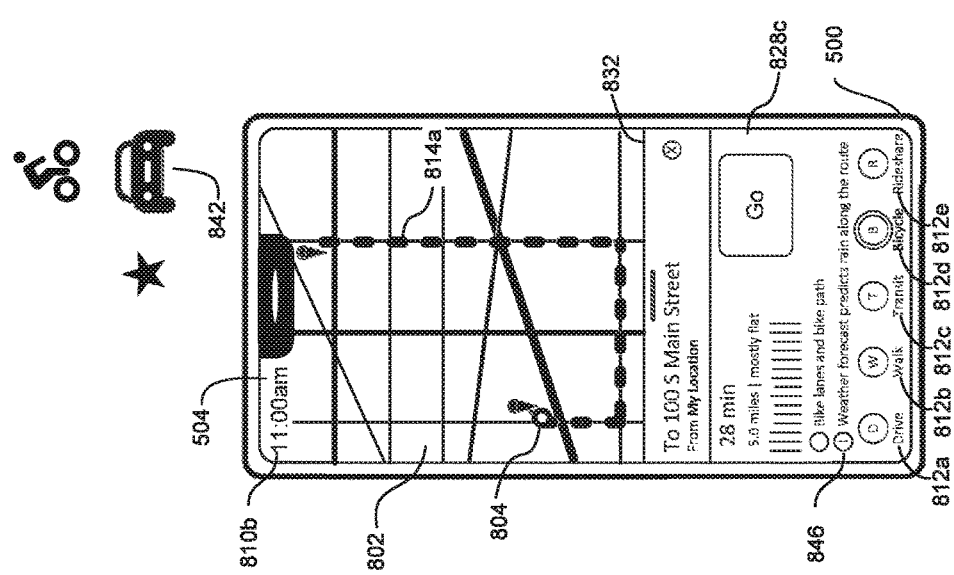
Figure 8J:
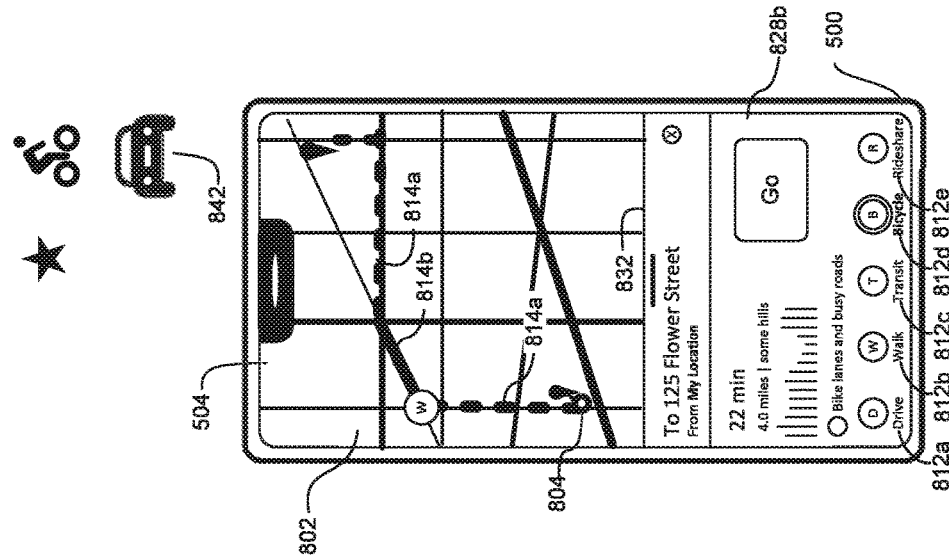
Figure 8I:
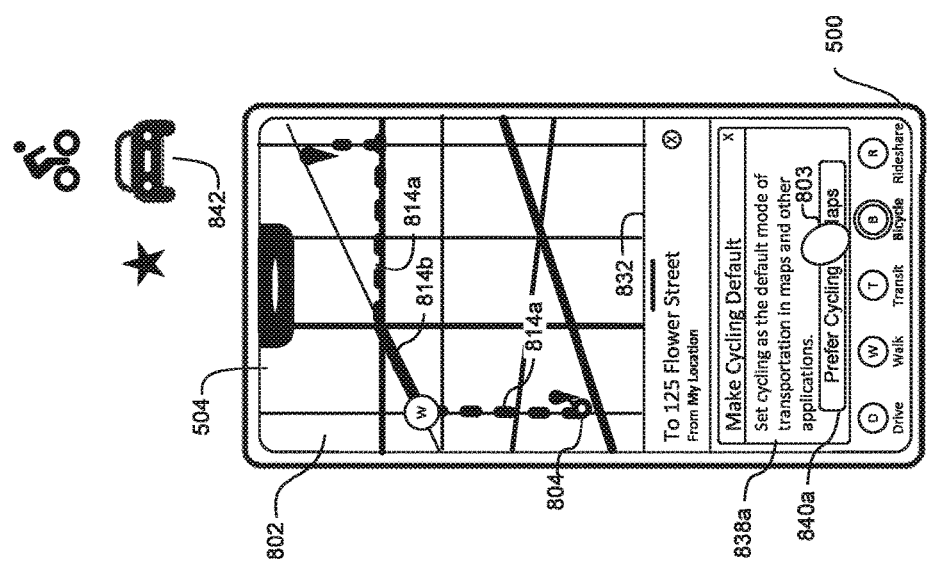
Figure 8L:
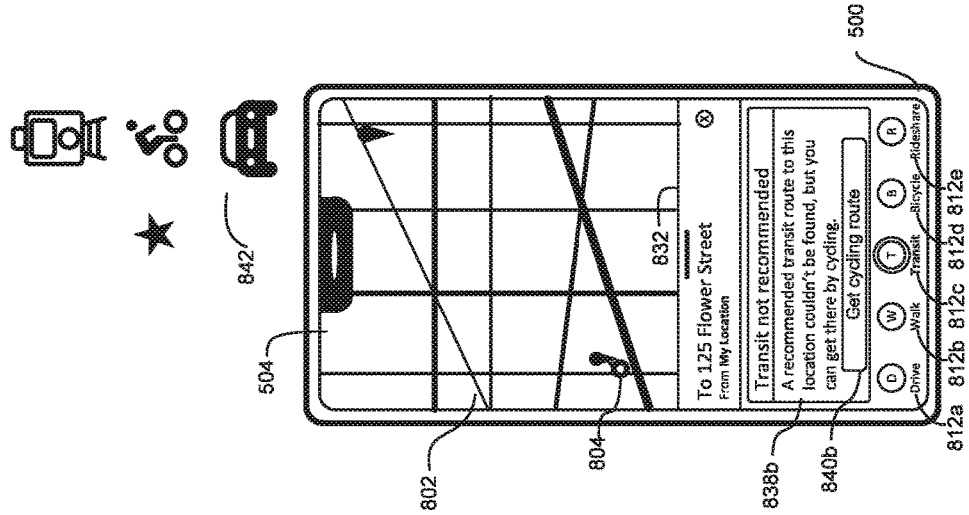
Figure 8K:
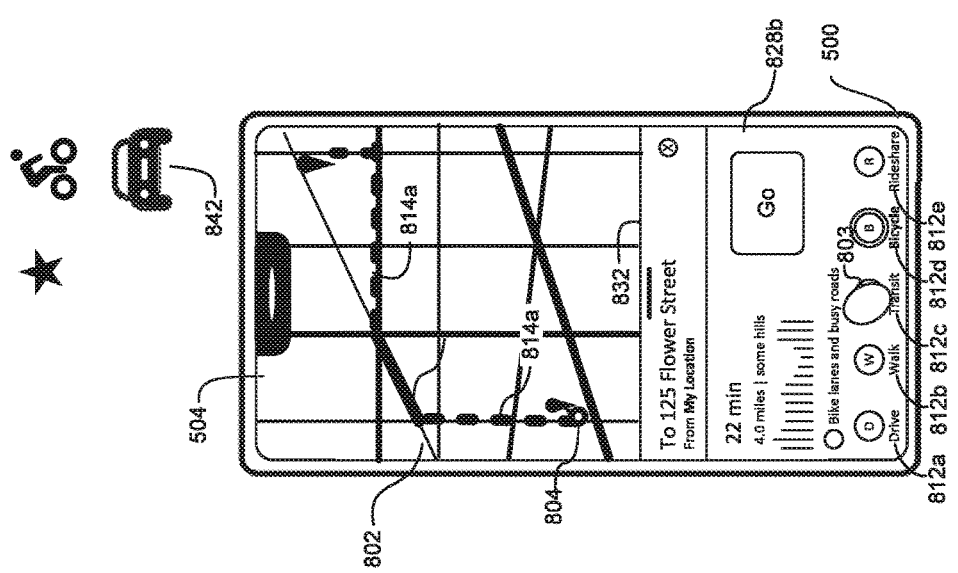
Figure 8N:
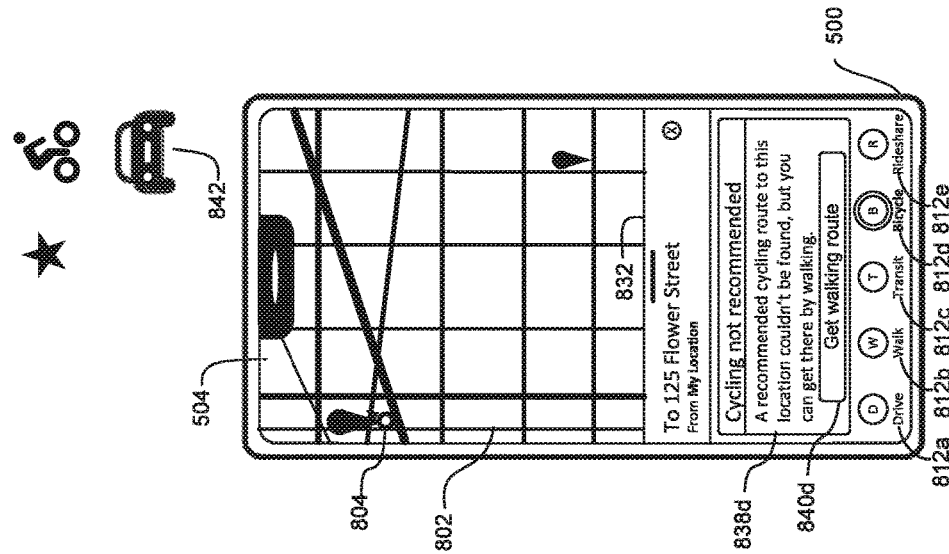
Figure 8M:
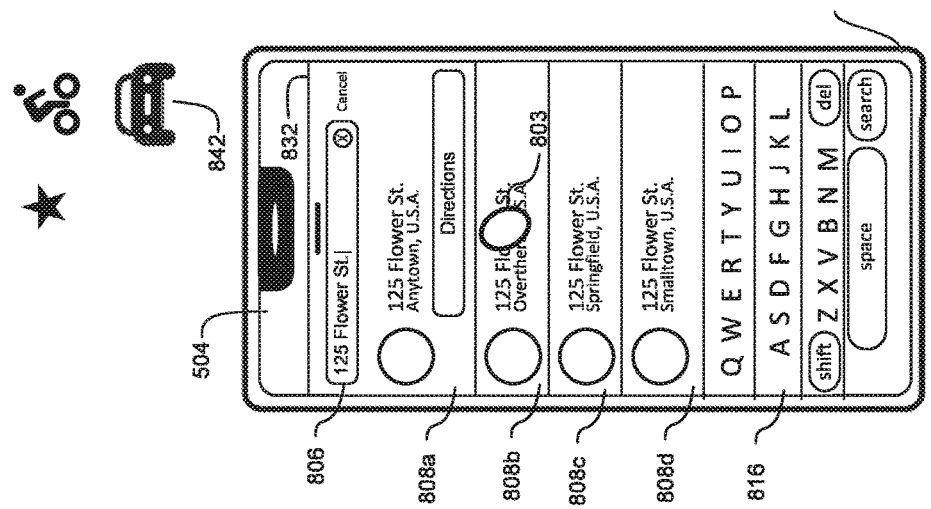
Figure 8P:
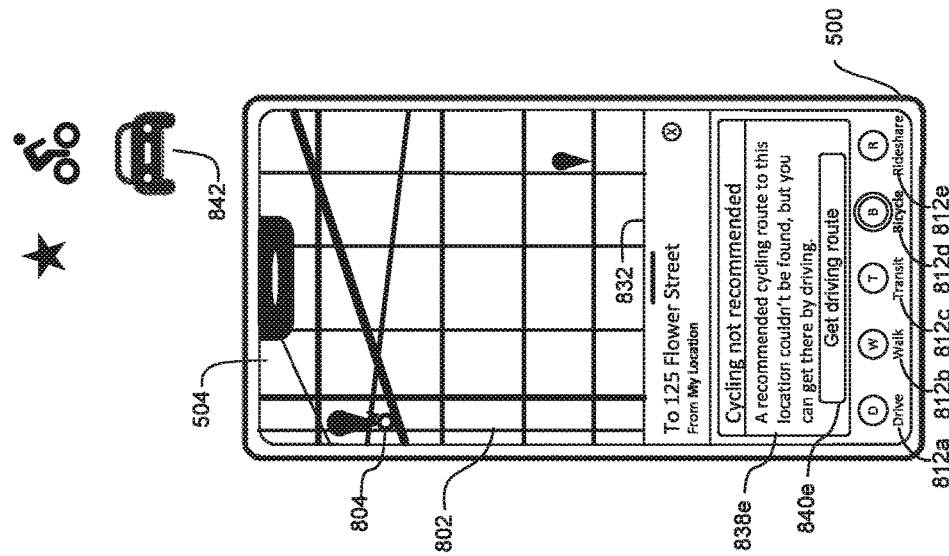

FIGS. 8A-8P illustrate exemplary ways in which the electronic device 500 presents various navigation options according to some embodiments. In some embodiments, the navigation options include options to make a respective mode of transportation the default mode of transportation and options to obtain navigation directions using an alternate mode of transportation when the route using a requested mode of transportation fails to satisfy one or more criteria, as will be described in more detail below. The embodiments in these figures are used to illustrate the processes described below, including the processes described with reference to FIG. 9. Although FIGS. 8A-8P illustrate various examples of ways an electronic device is able to perform the processes described below with FIG. 9, it should be understood that these examples are not meant to be limiting, and the electronic device is able to perform one or more processes described below with reference to FIG. 9 in ways not expressly described with reference to FIGS. 8A-8P.

In some embodiments, the electronic device 500 determines a navigation route based, at least in part, on the speed of traffic of a form of transportation other than the form of transportation requested by the user. For example, the electronic device 500 determines a navigation route for a first form of transportation, such as bicycle, based at least in part on the speed of traffic of another form of transportation, such as motor vehicle.

In FIGS. 8A-8C, the user provides a sequence of inputs corresponding to a request to present navigation directions to a respective destination by bicycle. FIG. 8A illustrates a navigation user interface similar to the navigation user interfaces described above with reference to FIGS. 6A and 6O. As indicated by legend 842 of FIG. 8A, the default mode of transportation (indicated by the star) is automobile and the mode of transportation currently used by the electronic device 500 (indicated by the relative position by the icons in the legend 842) is automobile in this example. The electronic device 500 is optionally able to provide navigation directions using additional modes of transportation (e.g., public transportation, walking, rideshare) not shown in legend 842.

Still referring to FIG. 8A, the user interface optionally includes an indication 810a of the current time, a map 802 with an indication 804 of the current location of the electronic device 500 and a user interface element 832 overlaid on the map 802. The user interface element 832 includes a text entry field 806 towards which input specifying a navigation destination is directed. In some embodiments, additional or alternative mechanisms for specifying a navigation destination may be provided. In the example illustrated in FIG. 8A, the indication 810a of the current time shows that the current time is 5:35 pm, a time at which automobile traffic often moves more slowly than usual (e.g., due to higher automobile congestion), for example. In this example, the electronic device 500 (or a server in communication with device 500) is able to determine, based on traffic data, that automobile traffic is moving slowly. As shown in FIG. 8A, the user selects (e.g., with contact 803) the text entry field 806.

In response to the user's selection in FIG. 8A followed by entry of the requested destination, the electronic device 500 displays the user interface illustrated in FIG. 8B. FIG. 8B illustrates the indication 810a of the current time, a soft keyboard 816, and the expanded user interface element 832. The user interface element 832 includes the text entry field 806, which includes the text entered by the user (e.g., using soft keyboard 816 or another input device) specifying the navigation destination, and a plurality of representations 808a-d of locations corresponding to the text entered by the user.

As shown in FIG. 8B, the user selects (e.g., with contact 803) a "directions" option included in a representation 808a of one of the possible navigation destinations. In response to the user's selection, the electronic device 500 presents navigation directions to the destination corresponding to representation 808a, as shown in FIG. 8C. In some embodiments, additional or alternative mechanisms of selecting a destination are provided. If the user had selected a different representation, 808b-d, the electronic device 500 would instead present navigation directions to a different destination represented by the selected representation 808b-d.

As shown in FIG. 8C, the electronic device 500 is able to present a user interface that includes an indication 810a of the current time, a map 802 including an indication 804 of the current location of the electronic device 500, and an indication 814a of the navigation route and the user interface element 832 overlaid on the map 802. The user interface element 832 includes details related to the navigation route, such as the destination, starting point, estimated duration, route distance, a selectable option to commence navigation, and a plurality of options 812a associated with other modes of transportation for which the electronic device 500 is able to provide navigation directions. In some embodiments, additional or alternative options corresponding to modes of transportation other than the modes of transportation illustrated in FIG. 8C are possible. The option 812a corresponding to driving is presented with an additional visual indication (or with a particular visual characteristic) indicating that the directions are currently provided for driving. Legend 842 also indicates (based on the position of the images corresponding to driving and cycling) that the electronic device 500 is providing navigation directions for driving. Although FIG. 8C illustrates presenting a circle around an image of the option 812a to indicate that the electronic device 500 is currently providing driving directions, in some embodiments, other indications are possible. Because the electronic device 500 is configured to provide navigation directions for driving (e.g., because driving is the default mode of transportation and the user hasn't requested a different mode of transportation), the electronic device 500 displays the indication 828a of the driving route without displaying an indication of navigation routes using an alternate mode of transportation. As shown in FIG. 8C, the user selects (e.g., with contact 803) the option 812d to instead provide navigation directions to the destination using cycling. In response to the user's selection in FIG. 8C, the electronic device 500 presents navigation directions via cycling. In some embodiments, if the user were to select a different option 812, the electronic device 500 would optionally present navigation directions via the selected other mode of transportation.

As shown in FIG. 8D, in response to the user's selection in FIG. 8C, the electronic device 500 is able to present navigation directions for bicycle, as indicated by the position of the cycling and driving icons in legend 842. Driving is still the default mode of transportation, so legend 842 includes a star next to the indication of driving. The electronic device 500 updates the map 802 to include indications of navigational segments 814a during which the user will be able to ride their bicycle, an indication 844 of a location at which the user will have to dismount their bicycle and walk, and an indication 814b of a navigational segment during which the user will have to walk. In some embodiments, if the route does not include navigational segments during with the user will have to dismount the bicycle and walk, then the map 802 does not include indications of locations at which the user will have to dismount the bicycle and walk. In some embodiments, the electronic device 500 is able to display indications of other obstacles on the map 802, such as indications of inclines over 8% grade and indications of stairs. The user interface element 832 overlaid on the map 802 includes an indication 810b of the estimated duration of the route, an indication 810c of the distance of the route, an indication 810d of the elevation profile of the route, an indication 810e of the safety characteristics of the route, and an option to begin navigation in a manner similar to the manner in which this information is presented according to one or more steps of method 700. Because the electronic device 500 is configured to provide navigation directions for cycling (in response to the user's selection in FIG. 8C), the electronic device 500 displays the indication 828b of the cycling route without displaying an indication of navigation routes using an alternate mode of transportation. Likewise, in some embodiments, if the electronic device were to present a navigation route using a different mode of transportation, if there is an available route using that mode of transportation that satisfies one or more criteria, the electronic device would display corresponding information about the route using that mode of transportation without displaying an indication of a navigation route using a different mode of transportation.

As shown in FIG. 8D, the electronic device 500 is able to present the indication 810a of the current time. At 5:35 pm, automobile traffic is moving relatively slowly. Therefore, the route initially recommended by the electronic device 500 uses busy roads (as indicated by safety characteristics 810e), as the automobile traffic on the busy roads may be slower than usual, for example. Therefore, when traveling by bicycle on those roads, the likelihood of automobiles traveling on the same roads with much higher speeds than the bicycle is low (e.g., the speed differential between automobiles and bicycles on the route is low or non-existent). As a result, device 500 optionally recommends or provides the route shown in FIG. 8D for bicycles.

In some embodiments, at a different time of day, the electronic device 500 presents a different route for bicycles because the speed of motor vehicles is different. In some embodiments, the electronic device 500 is able to recommend a route based on traffic information that is not related to the time of day (e.g., by collecting real-time traffic data additionally or alternatively to relying on traffic models that predict the speed of traffic based on the time of day and traffic data collected previously over time). For example, FIGS. 8E-8G illustrate the electronic device 500 presenting navigation directions to the same destination via bicycle at a different time of day than the time of day illustrated in FIGS. 8A-8D. In FIG. 8E, the electronic device 500 presents a user interface similar to the user interface illustrated in FIG. 8A. However, the indication 810b of the current time is different in FIG. 8E (11:00 am) than the current time indicated in FIG. 8A (5:35 pm). Automobile traffic is optionally lighter (e.g., and therefore faster) at 11 am than at 5:35 pm. As shown in FIG. 8E, the user selects (e.g., with contact 803) the text entry field 806. In response to a sequence of inputs including the user's selection in FIG. 8E, the electronic device 500 presents the user interface illustrated in FIG. 8F. In some embodiments, additional or alternative ways of providing an indication of the navigation destination are possible. In some embodiments, the electronic device 500 is able to choose a starting point in a similar manner to choosing the destination. In some embodiments, the electronic device 500 is able to recommend a route for a future time based on traffic models, traffic data collected previously over time, or other route information. For example, on a Sunday afternoon, a user may want to obtain suggested routes for getting from school to work using a bicycle at 4 pm following Monday. An example device 500 will allow the user to type in the starting point, destination point, and choose bicycling as the mode of transportation. The device 500 will then provide suggested routes based on predicted traffic and other road-related information for the route at 4 pm on a typical Monday, e.g., based on models, historical information, and other data.

FIG. 8F illustrates a user interface similar to the user interface illustrated in FIG. 8B. The indication 810b of the current time in FIG. 8F is different from the current time indicated in FIG. 8B and legend 842 in FIG. 8F indicates that the electronic device 500 is currently configured to provide navigation directions using bicycle. As shown in FIG. 8F, the user selects (e.g., with contact 803) a "directions" option included in one of the representations 808a of a possible navigation destination. In response to the user's selection in FIG. 8F, the electronic device 500 presents the user interface illustrated in FIG. 8G.

As shown in FIG. 8G, the user interface includes the indication 810b of the current time, a map 802 including an indication 814a of the navigation route, and the user interface element 832 overlaid on the map. The user interface element 832 includes an indication 846 of a predicted weather condition because the user requested navigation directions by bicycle (e.g., because weather along the provided route is relevant to travel by bicycle). In some embodiments, the electronic device 500 forgoes presenting the indication 846 of the weather when the user requests navigation directions using a different mode of transportation, such as driving, rideshare, or public transportation. In some embodiments, the electronic device 500 presents a weather indication when temperatures are outside of a predetermined range, the forecast calls for precipitation, threatening weather (e.g., chance of tornado, hurricane, or lightening) is detected or imminent, or air quality is below a threshold are predicted. In some embodiments, if no weather conditions that could affect transportation modes are predicted, the electronic device 500 forgoes presenting the indication of the weather.

The route illustrated in FIG. 8G is optionally different from the route illustrated in FIG. 8D because the route illustrated in FIG. 8G is displayed while motor vehicle traffic is moving at a different speed than the speed of a motor vehicle traffic while the route illustrated in FIG. 8D is displayed (e.g., as indicated by the different times at which the route was requested). As shown in the representation 828c of the route displayed within user interface element 832, the safety characteristics of the route includes bike lanes and bike paths. In some embodiments, additional or alternate safety characteristics may be displayed as described above with reference to FIGS. 6A-7. Because the route illustrated in FIG. 8G is displayed while automobile traffic is moving relatively quickly (e.g., there is less traffic at 11:00 am than there is at 5:35 pm), the electronic device 500 suggests a route that uses bike lanes and bike paths instead of the route that uses a busy road, because motor vehicle traffic is moving faster along the busy road (and therefore the speed differential between bicycles and motor vehicles along that route will be greater). In some embodiments, device 500 displays the route suggested in FIG. 8G even though the route suggested in FIG. 8D is shorter in distance due to the speed differential that would be experienced in the route suggested in FIG. 8D at 11 am. In some embodiments, the electronic device 500 does not consider the speed of traffic when generating navigation directions using one or more other modes of transportation (e.g., driving). For example, when displaying navigation directions for driving, the electronic device 500 displays the route with the quickest duration as the recommended route regardless of the speed of traffic of other types of vehicles (e.g., bicycles) along the route because the speed of other types of vehicles is not as much of a personal safety concern for a driver as it is for a cyclist.

In some embodiments, in response to detecting that the user has requested navigation directions by bicycle a predetermined number (e.g., 2 or 3 or 4 or 5) times, the electronic device 500 presents a selectable option that, when selected, causes the electronic device 500 to change the default mode of transportation to bicycle. In some embodiments, in response to detecting the user requesting directions using a respective other mode of transportation the predetermined number of times, the electronic device 500 displays a selectable option, that, when selected, causes the electronic device 500 to make the respective mode of transportation default. In some embodiments, the electronic device 500 only displays a selectable option to make a respective mode of transportation default in response to detecting the user requesting directions using the respective mode of transportation the predetermined number of times when cycling is the respective mode of transportation. In some embodiments, the electronic device uses the default mode of transportation to provide navigation directions when the user does not specify a different mode of transportation to be used for navigation directions. In some embodiments, the electronic device 500 uses the default mode of transportation when displaying navigation information, such as a route summary, duration, or estimated elapsed time, outside of the maps or navigation user interface. For example, the electronic device 500 is able to provide a notification when it is time to leave for an event stored in a calendar application by estimating the elapsed time it will take to travel to the location of the event using the default mode of transportation.

As shown in FIG. 8H, the electronic device 500 presents a user interface similar to the user interface illustrated in FIGS. 8B and 8F. The user interface illustrated in FIG. 8H is optionally presented in response to the user entering an input corresponding to a request to present navigation directions to a specified location. As indicated by the legend 842 of FIG. 8H, the electronic device 500 is currently configured to provide navigation directions using bicycle although the default mode of transportation is driving. As shown in FIG. 8H, the user selects (e.g., with contact 803) a "directions" option of one of the representations 808a of a location corresponding to the user's input. In some embodiments, if the user were to select a representation 808b-d of a different destination, the electronic device would present navigation directions to the selected destination. In some embodiments, additional or alternate means of selecting the destination are possible.

In response to the user's selection in FIG. 8H, the electronic device 500 presents the user interface illustrated in FIG. 8I, for example. As shown in FIG. 8I, the electronic device 500 is able to present a map 802 including indications 814a and 814b of the navigational segments of the route and a user interface element 832 overlaid on the map 802. The user interface element 832 includes an indication 838a to make cycling the default mode of transportation on the electronic device 500. The indication 838a includes a selectable option 840a that, when selected, causes the electronic device 500 to change the default mode of transportation to cycling.

As shown in FIG. 8I, the user selects (e.g., with contact 803) the option 840a to make cycling the default mode of transportation. In response to the user's selection, the electronic device 500 makes cycling the default mode of transportation and optionally updates the user interface as shown in FIG. 8J.

As shown in FIG. 8J, the electronic device 500 optionally updates the user interface element 832 to include a representation 828b of the suggested navigation route to the destination. As indicated by legend 842, the electronic device 500 updates the default mode of transportation from driving to cycling. While cycling is the default mode of transportation, the electronic device 500 optionally uses cycling to determine the estimated travel time to locations presented in user interfaces other than the maps application, such as locations of events stored in a calendar application. Moreover, in some embodiments, the electronic device 500 provides cycling directions in the maps application by default and/or suggests cycling when recommended navigation routes using a different requested form of transportation are not available.

In some embodiments, an electronic device 500 suggests an alternate mode of transportation in response to a user request for navigation directions using a requested mode of transportation in accordance with a determination that the available route(s) using the requested mode of transportation fail to satisfy one or more criteria. For example, the one or more criteria include criteria related to estimated duration or distance of the route and optionally include criteria specific to a respective mode of transportation. For example, an electronic device is able to present an indication of an alternate mode of transportation in response to a request for navigation directions via bicycle or by walking in accordance with a determination that the weather forecast includes temperatures outside of a predetermined range, precipitation, or low air quality. In some embodiments, the electronic device 500 does not apply weather-based criteria when evaluating a navigation route via motor vehicle.

In FIG. 8K, the user selects (e.g., with contact 803) the option 812c to display navigation directions to the destination using public transportation. In response to the user's selection in FIG. 8K, the electronic device 500 is configured to provide navigation directions using public transportation, as indicated by legend 842 in FIG. 8L.

As shown in FIG. 8L, the electronic device 500 optionally displays an indication 838b that no recommended transit route is available to the requested destination. In some embodiments, the indication 838b is displayed when no possible routes exist, or when the only possible routes available fail to satisfy one or more criteria, such as criteria related to the duration or distance of the route, the number of transfers required, the amount of walking required, or other criteria. As shown in FIG. 8L, the indication 838b that a recommended public transportation route to the requested destination is not available includes a selectable option 840b that, when selected, causes the electronic device 500 to instead present navigation directions via cycling. In some embodiments, cycling is recommended in FIG. 8L because cycling is the default mode of transportation. In some embodiments, if a different mode of transportation (e.g., driving) is the default mode of transportation, the electronic device 500 would instead display an option to get driving directions.

In some embodiments, the electronic device 500 recommends an alternate mode of transportation when there are no recommended cycling routes to a selected destination available. The recommended mode of transportation is selected based on a number of criteria, which will be described with reference to FIGS. 8M-8P. The electronic device 500 optionally recommends an alternate mode of transportation when there are no available cycling routes or when the available cycling routes fail to satisfy one or more criteria related to distance or duration, strenuousness (e.g., steepness of hills, roughness of terrain), inclement weather (e.g., precipitation, heat, cold), government restrictions of cycling, and/or lack of lighting along possible routes.

FIG. 8M illustrates a user interface that includes a plurality of representations 808a of destinations corresponding to a requested destination provided by the user and displayed in text entry field 806. As shown in FIG. 8M, the electronic device 500 is optionally currently configured to provide navigation directions via bicycle, and bicycle is optionally the default mode of transportation. The user selects (e.g., with contact 803) one of the representations 808b of a possible destination. In response to the user's selection, the electronic device 500 displays one of the user interfaces shown in FIG. 8N, 8O, or 8P according to the criteria described below. In some embodiments, even if cycling is not the default mode of transportation, the electronic device 500 is able to display an indication of an alternate mode of transportation if the cycling routes do not satisfy the one or more criteria.

In some embodiments, when no recommended cycling routes are available, the electronic device 500 suggests an alternate mode of transportation, as will be described in more detail below with reference to FIGS. 8N-8P. In some embodiments, the electronic device 500 evaluates alternate modes of transportation against criteria in a prioritized order, such as walking, then public transportation, then driving. For example, if the walking route satisfies one or more criteria, the electronic device recommends walking as the alternative to cycling, as described below with reference to FIG. 8N. As another example, if the walking route does not satisfy the one or more criteria, the electronic device recommends public transportation as the alternative to cycling if the public transportation route satisfies one or more criteria, as described below with reference to FIG. 8O. As another example, if the walking route and the public transportation route both fail to satisfy the respective one or more criteria, the electronic device recommends driving as the alternative to cycling if a driving route is available, as described below with reference to FIG. 8P. In some embodiments, other orders of prioritization and/or other modes of transportation are possible. In some embodiments, the electronic device has prioritized lists of alternate modes of transportation associated with each requested mode of transportation. For example, if the user requests a walking route but a recommended walking route is not available, the electronic device evaluates one or more other modes of transportation against one or more criteria in a prioritized order in a manner similar to the manner described above for suggesting modes of transportation as alternatives to cycling. In this example, the modes of transportation included in the list, the prioritization of the modes of transportation, and the criteria with which each mode of transportation is evaluated are the same as they are for cycling or they are different.

FIG. 8N illustrates the electronic device 500 displaying the indication 838d that a recommended cycling route is not available as an example. The indication 838d optionally includes an option that, when selected, causes the electronic device 500 to present navigation directions via walking. The indication 838d optionally states that a walking route is available, but may not include specific information about the walking route (e.g., such as distance, ETA, one or more roads used, etc.). In some embodiments, the electronic device 500 optionally recommends walking instead of cycling (the default mode of transportation) when a walking route is available to the destination and the walking route satisfies time or distance-based criteria, such as the estimated duration being less than a threshold (e.g., 15 mins) or that the walking duration is less than the duration using another mode of transportation (e.g., public transportation or cycling) and that the walking route is a shorter distance than a predetermined threshold (e.g., 3.5 km). In some embodiments, the electronic device 500 uses additional or alternate criteria when evaluating the walking route(s).

Figure 8O:
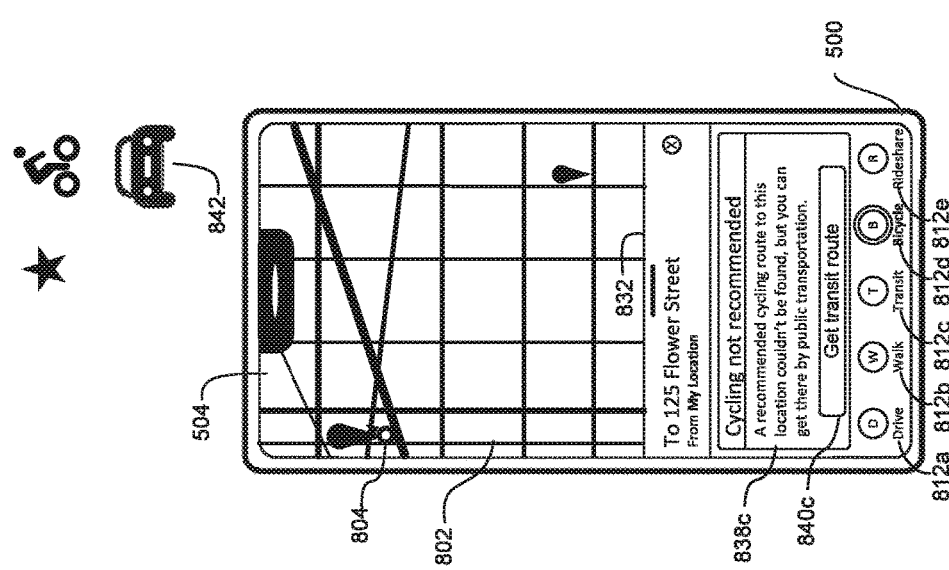

FIG. 8O illustrates the electronic device 500 displaying the indication 838c that a recommended cycling route is not available as an example. The indication 838c optionally includes an option that, when selected, causes the electronic device 500 to present navigation directions via public transportation. The indication 838c states that a walking route is available, but may not include specific information about the public transportation route (e.g., such as distance, ETA, one or more roads or services used, etc.). In some embodiments, the electronic device 500 recommends public transportation instead of cycling (the default mode of transportation) when a public transportation route is available to the destination, a walking route fails to satisfy one or more criteria, such as the criteria described above with reference to FIG. 8N, and the public transportation route satisfies one or more criteria. In some embodiments, the one or more criteria include time-based criteria, such as the estimated duration being less than a threshold (e.g., 1 hour) or that the estimated duration is less than the estimated duration of a route using a different mode of transportation (e.g., driving). In some embodiments, the electronic device 500 uses additional or alternate criteria when evaluating the public transportation route(s).

FIG. 8P illustrates the electronic device 500 displaying the indication 838e that a recommended cycling route is not available, as an example. The indication 838e optionally includes an option 840e that, when selected, causes the electronic device 500 to present navigation directions via automobile. The indication 838e states that a walking route is available, but may not include specific information about the driving route (e.g., such as distance, ETA, one or more roads used, etc.). In some embodiments, the electronic device 500 recommends driving instead of cycling (the default mode of transportation) when driving is available to the destination, a walking route fails to satisfy one or more criteria, such as the criteria described above with reference to FIG. 8N, and the public transportation route fails to satisfy one or more criteria, such as the criteria described above with reference to FIG. 8O. In some embodiments, the electronic device 500 uses additional or alternate criteria when evaluating the driving route(s).

While the electronic device 500 displays any of the user interfaces illustrated in FIGS. 8N-8P, the user interfaces optionally include the selectable options 812a-e that, when selected, causes the electronic device 500 to display navigation directions using a mode of transportation selected by the user. For example, while displaying the user interface illustrated in FIG. 8N, the user is able to use one of the selectable options 812a-e to select a mode of transportation other than walking or cycling, if the user wishes.

FIG. 9 is a flow diagram illustrating a method 900 of presenting various navigation options in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

In some embodiments, method 900 is performed at an electronic device 500 in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, such as in FIG. 6K, the electronic device 500 receives (902), via the one or more input devices, a sequence of one or more inputs (e.g., including contact 603) corresponding to a request to display navigation directions from a first physical location to a second physical location using a first mode of transportation 812c. In some embodiments, the electronic device has access to a maps application that enables the electronic device to display maps of physical locations and navigation directions between locations. The user optionally specifies a start, an end location, and a mode of transportation (e.g., walking, driving, transit, or cycling) when requesting navigation directions. In some embodiments, the electronic device uses a location sensor (e.g., GPS or other positioning sensor) to identify a current location of the electronic device, thus enabling the user to request directions from the current location of the electronic device to a second location. In some embodiments, the user provides the sequence of inputs using a user interface of the maps application. In some embodiments, the user provides the sequence of inputs using a system user interface of the electronic device (e.g., voice assistant, system-wide search, etc.). In some embodiments, the directions provided will depend on the mode of transportation selected. For example, driving directions will make use of freeways but will not use bike paths and cycling directions will use bike paths but will not use freeways.

In some embodiments, such as in FIG. 8C, in response to the sequence of one or more inputs corresponding to the request to display the navigation directions (904), in accordance with a determination that one or more criteria are satisfied, the electronic device 500 displays (906), via the display generation component, the navigation directions using the first mode of transportation without displaying a visual indication of navigation directions from the first physical location to the second physical location using a respective mode of transportation different from the first mode of transportation. In some embodiments, the one or more criteria optionally include criteria that are satisfied when the navigation route from the first physical location to the second physical location using the selected mode of transportation has a duration that is less than a threshold, a duration that is less than a threshold while using roads and paths accessible to the selected mode of transportation, etc. For example, if the user requests directions via cycling, the electronic device evaluates whether there exists a route from the first physical location to the second physical location using roads accessible to bikes with a distance and a duration that are less than predetermined distance and duration thresholds. In some embodiments, the one or more criteria are satisfied when there is a route that exists at all between the two physical locations, and are not satisfied when there is not a route that exists between the two physical location. In some embodiments, the one or more criteria are satisfied when the best (e.g., shortest duration and/or shortest distance) route using the first mode of transportation has a duration and/or distance that is within a threshold percentage (e.g., 10%, 20%, 30%) of the duration and/or distance of a hypothetical best (e.g., shortest duration and/or shortest distance) route using a second mode of transportation rather than the first mode of transportation.

In some embodiments, such as in FIG. 8L, in accordance with a determination that the one or more criteria are not satisfied, the electronic device 500 displays (908), via the display generation component, the visual indication 838b of navigation directions from the first physical location to the second physical location using the respective mode of transportation. In some embodiments, if there are no navigation routes using the selected mode of transportation from the first location to the second location that satisfy the one or more criteria, the electronic device concurrently displays an indication that there are no routes available using the selected mode of transportation and a selectable option that, when selected, causes the electronic device to display directions from the first location to the second location using an alternate mode of transportation. In some embodiments, an indication of navigation directions using the first mode of transportation is concurrently displayed with the indication of the navigation directions using the respective mode of transportation. In some embodiments, the indication of navigation directions using the first mode of transportation is not displayed while the electronic device displays the indication of the navigation directions using the respective mode of transportation. For example, the electronic device receives an input corresponding to a request to display directions from the first location to the second location by bike. In this example, in accordance with a determination that there is no cycling route that satisfies one or more criteria based on road conditions, time, and/or duration, the electronic device displays a message indicating that there are no safe cycling routes found, but transit directions are available. In this example, the electronic device concurrently displays the message with a selectable option that, when selected, causes the electronic device to display the transit—rather than the bike—directions from the first location to the second location. In some embodiments, the one or more criteria include criteria related to weather (e.g., suggest public transportation or automobile over cycling or walking if it's raining, snowing, hailing, or excessively hot or cold); one or more criteria related to the incline along the route (e.g., suggest public transportation, walking, or driving over cycling); one or more criteria related to distance or duration (e.g., suggest automobile or public transportation over walking or cycling if the route exceeds a time or distance threshold); one or more criteria related to terrain (e.g., suggest walking, public transportation, or driving over cycling if road conditions are not suitable for cycling); one or more criteria related to a government restriction (e.g., suggest driving or public transportation over cycling if cycling is not permitted along the route at the time of the request for navigation directions); and/or one or more criteria related to lighting conditions along the route (e.g., suggest public transportation or automobile over cycling or walking if one or more portions of the route are not well-lit and the navigation directions are requested while it is dark outside). In some embodiments, one or more of these criteria are used to determine whether or not to present an indication of a route using the first mode of transportation while displaying the indication of the route using the respective mode of transportation. In some embodiments, one or more of these criteria apply to some modes of transportation (e.g., cycling, walking) and do not apply to other modes of transportation (e.g., public transportation, automobile). In some embodiments, the indication of the route using the respective mode of transportation excludes specific information about the route, such as distance, duration, estimated time of arrival, major roads used, etc. For example, the indication of the route using the respective mode of transportation states that a route using the respective mode of transportation is not available and the details of the route are not displayed until an input corresponding to a request to view the route using the respective mode of transportation is received.

The above-described manner of displaying the visual indication of navigation directions using a second mode of transportation in accordance with a determination that that one or more criteria are not satisfied when attempting to navigate using the first mode of transportation enables the electronic device to efficiently present an alternative to using the first mode of transportation from the first location to the second location, which simplifies the interaction between the user and the electronic device and enhances the operability of the electronic device and makes the user-device interface more efficient (e.g., by reducing the time it takes the user to find a suitable way of traveling from one location to another), which additionally reduces power usage and improves battery life of the electronic device by enabling the user to use the electronic device more quickly and efficiently.

In some embodiments, such as in FIGS. 8A-8G, the navigation directions using the first mode of transportation are based on a velocity differential between the first mode of transportation along the navigation directions and another mode of transportation that exists along the navigation directions. In some embodiments, the electronic device compares the speed of traffic for the first mode of transportation to the speed of traffic for the other mode of transportation along the route when determining the best route(s) using the first mode of transportation. In some embodiments, when generating navigation directions for bicycle, the electronic device compares the speed of bicycle traffic to the speed of automobile traffic along the navigation route to prioritize routes where bicycle speed and automobile speeds are within a threshold of each other. In some embodiments, the threshold differences are different depending on the type of road/lane available to bicycles. For example, the threshold velocity difference is higher for a protected bike lane in which there is a physical barrier between automobiles and bicycles than the threshold velocity difference for a shared road in which bicycles and automobiles use one or more of the same lanes of the road. The above-described manner of basing the navigation directions on the velocity differential between the first and second modes of transportation enables the electronic device to automatically provide navigation directions along a route that is safe for the user, which simplifies the interaction between the user and the electronic device and enhances the operability of the electronic device and makes the user-device interface more efficient (e.g., by reducing the number of inputs needed to obtain an acceptable navigation route), which additionally reduces power usage and improves battery life of the electronic device by enabling the user to use the electronic device more quickly and efficiently.

In some embodiments, such as in FIG. 8I, in accordance with a determination that, prior to receiving the request to display the navigation directions from the first physical location to the second physical location using the first mode of transportation, the electronic device 500 has received a predetermined number (e.g., 2, 3, 4, 5, etc.) of requests to present navigation directions using the first mode of transportation, the electronic device 500 displays, via the display generation component, a selectable option 840*a* that, when selected, causes the electronic device 500 to make the first mode of transportation a default mode of transportation for displaying navigation directions. In some embodiments, at the time the request to display the navigation directions via the first mode of transportation was received, the default mode of transportation is optionally a second mode of transportation different from the first mode of transportation (or there was no default mode of transportation set). In response to detecting selection of the option, the electronic device optionally changes the default mode of transportation from the second mode of transportation to the first mode of transportation. In some embodiments, in response to receiving a request for navigation directions that does not specify a respective mode of transportation, the electronic device presents navigation directions using the default mode of transportation, unless a route using the default mode of transportation is not available. In some embodiments, the electronic device uses the default mode of transportation when presenting estimated travel times in other applications of the electronic device, such as a calendar application or restaurant reservation application. The above-described manner of displaying the selectable option to make the first mode of transportation the default mode of transportation in response to determining that the user has requested navigation directions using the first mode of transportation a predetermined number of times enables the electronic device to provide an efficient way of changing the default mode of transportation to a mode of transportation frequently requested by the user, which simplifies the interaction between the user and the electronic device and enhances the operability of the electronic device and makes the user-device interface more efficient (e.g., by reducing the number of inputs needed to change the default mode of transportation and reducing the number of inputs needed to request navigation directions using the first mode of transportation by making it the default mode of transportation), which additionally reduces power usage and improves battery life of the electronic device by enabling the user to use the electronic device more quickly and efficiently.

In some embodiments, the electronic device 500 receives, via the one or more input devices, a second sequence of one or more inputs corresponding to a request to display second navigation directions from a third respective physical location to a fourth respective physical location, such as in FIG. 8A, wherein the second sequence of one or more inputs does not specify a mode of transportation. In some embodiments, such as in FIG. 8C, in response to the second sequence of one or more inputs, in accordance with a determination that the first mode of transportation is the default mode of transportation, the electronic device 500 displays, via the display generation component, the second navigation directions using the first mode of transportation. For example, if automobile is the default mode of transportation, the electronic device presents navigation directions via automobile. In some embodiments, such as in FIG. 8K, in accordance with a determination that that the respective mode of transportation is the default mode of transportation, the electronic device 500 displays, via the display generation component, the second navigation directions using the respective mode of transportation. For example, if bicycle is the default mode of transportation, the electronic device presents the navigation directions via bicycle. In some embodiments, if the second sequence of one or more inputs specifies a mode of transportation other than the default mode of transportation, the electronic device presents navigation directions using the specified mode of transportation unless directions using the specified mode of transportation are not available. The above-described manner of presenting the navigation directions using the default mode of transportation when the user requests directions without specifying the mode of transportation enables the electronic device to efficiently provide navigation directions using the default mode of transportation, which simplifies the interaction between the user and the electronic device and enhances the operability of the electronic device and makes the user-device interface more efficient (e.g., by reducing the number of inputs needed to use obtain navigation directions using the default mode of transportation), which additionally reduces power usage and improves battery life of the electronic device by enabling the user to use the electronic device more quickly and efficiently.

In some embodiments, such as in FIG. 8L, in response to the sequence of one or more inputs corresponding to the request to display the navigation directions, in accordance with the determination that the one or more criteria are not satisfied, in accordance with a determination that a second mode of transportation is a default mode of transportation for providing navigation directions (as shown in legend 842 of FIG. 8L), the respective mode of transportation is the second mode of transportation. For example, the user requests navigation directions using public transportation while bicycle is the default mode of transportation. In this example, in accordance with a determination that no public transportation route satisfying the one or more criteria is available, the electronic device presents a visual indication that navigation directions using bicycle are available. In some embodiments, in accordance with a determination that a third mode of transportation, different from the second mode of transportation, is the default mode of transportation for providing navigation directions, the respective mode of transportation is the third mode of transportation, such as by suggesting a different mode of transportation in FIG. 8L if a different mode of transportation was the default mode of transportation. For example, the user requests navigation directions using public transportation while automobile is the default mode of transportation. In this example, in accordance with a determination that no public transportation route satisfying the one or more criteria is available, the electronic device presents a visual indication that navigation directions using automobile are available. The above-described manner of presenting an indication of navigation directions using the default mode of transportation when the navigation directions using the first mode of transportation do not satisfy the one or more criteria enables the electronic device to efficiently select the respective mode of transportation as a mode of transportation the user uses frequently, which simplifies the interaction between the user and the electronic device and enhances the operability of the electronic device and makes the user-device interface more efficient (e.g., by reducing the number of inputs needed to obtain navigation directions using a mode of transportation that is suitable for the user), which additionally reduces power usage and improves battery life of the electronic device by enabling the user to use the electronic device more quickly and efficiently.

In some embodiments, such as in FIG. 8N, the first mode of transportation is a default mode of transportation for providing navigation directions (as shown in legend 842 of FIG. 8N), and the one or more criteria are not satisfied, wherein the one or more criteria include a criterion that is satisfied when the navigation directions are less than a predetermined distance associated with the first mode of transportation, and is not satisfied when the navigation directions are greater than the predetermined distance associated with the first mode of transportation. In some embodiments, the electronic device does not provide navigation directions using the default mode of transportation if there is no available route using the default mode of transportation that satisfies the one or more criteria. For example, the default mode of transportation is bicycle and the user requests navigation directions using bicycle, but there is no route by bicycle that satisfies the one or more criteria. In this example, the electronic device presents an indication of a route using a different mode of transportation, such as public transportation or automobile. In some embodiments, the one or more criteria are not satisfied when the route using the default mode of transportation exceeds a distance and/or time threshold. In some embodiments, the one or more criteria are not satisfied for the first mode of transportation if the distance of the route exceeds a predetermined threshold. In some embodiments, the one or more criteria do not include a distance-based criterion when the user requests navigation directions using another mode of transportation (e.g., automobile). For example, walking or cycling directions do not satisfy the one or more criteria if the distance exceeds a threshold, but automobile directions are not evaluated against a distance-based criterion. The above-described manner of presenting an indication of navigation directions using the respective mode of transportation when the navigation directions using the default mode of transportation fail to satisfy the one or more criteria enables the electronic device to provide an efficient way to obtain suitable navigation directions, which simplifies the interaction between the user and the electronic device and enhances the operability of the electronic device and makes the user-device interface more efficient (e.g., by reducing the number of inputs needed to obtain directions using an alternate mode of transportation), which additionally reduces power usage and improves battery life of the electronic device by enabling the user to use the electronic device more quickly and efficiently. The above-described manner of evaluating the route using the first mode of transportation using a criterion that is satisfied when the distance of the route is less than a predetermined distance enables the electronic device to efficiently present navigation directions using a different mode of transportation when it is unlikely the user will use the navigation directions using the first mode of transportation due to the length of the navigation route, which simplifies the interaction between the user and the electronic device and enhances the operability of the electronic device and makes the user-device interface more efficient (e.g., by reducing the number of inputs needed to obtain suitable navigation directions), which additionally reduces power usage and improves battery life of the electronic device by enabling the user to use the electronic device more quickly and efficiently.

In some embodiments, such as in FIG. 8G, in response to receiving the sequence of the one or more inputs corresponding to the request to display the navigation directions, in accordance with a determination that weather information associated with the navigation directions (e.g., one or more of the first physical location or the second physical location or the route along the way) satisfies one or more weather criteria, the electronic device 500 displays a visual indication 846 of the weather information. In some embodiments, the weather information includes information about current weather conditions (e.g., temperature, precipitation, humidity, air pollution) and/or forecasted weather conditions. For example, if there is no rain currently at the second physical location but the forecast indicates that there will be rain at the second physical location by the time the user arrives by following the navigation directions, the electronic device presents an indication of the rain at the time the directions are requested. As another example, the electronic device presents an indication of excessive heat (e.g., temperatures above 90, 95, or 100 degrees Fahrenheit) at the time the directions are requested if the current conditions or weather forecast include excessive heat along the route. In some embodiments, weather-related warnings are presented when the user requests navigation directions by some modes of transportation (e.g., walking or bicycling) but not when the user requests navigation directions by other modes of transportation (e.g., automobile). In some embodiments, in accordance with a determination that the weather information associated with the navigation directions do not satisfy the one or more weather criteria, the electronic device forgoes displaying the visual indication of the weather information. The above-described manner of presenting an indication of the weather information enables the electronic device to efficiently present weather information when the weather information is relevant to the user based on the user's request for navigation directions using the first mode of transportation, which simplifies the interaction between the user and the electronic device and enhances the operability of the electronic device and makes the user-device interface more efficient (e.g., by reducing the number of inputs needed to check for suitable weather before beginning to navigate along the route), which additionally reduces power usage and improves battery life of the electronic device by enabling the user to use the electronic device more quickly and efficiently.

In some embodiments, such as in FIG. 8N, in accordance with a determination that a route from the first physical location to the second physical location using a second mode of transportation satisfies one or more second criteria, the respective mode of transportation is a second mode of transportation. In some embodiments, the one or more second criteria include time-based criteria and/or distance-based criteria. For example, the user requests navigation directions via bicycle and the navigation route by bicycle does not satisfy the one or more criteria. In this example, in accordance with a determination that a walking route is available and is less than a threshold amount of time (e.g., 15 minutes) (e.g., the one or more second criteria), the respective mode of transportation is walking. As another example, if the walking directions have an earlier estimated time of arrival than directions using a different mode of transportation (e.g., public transportation) and the distance of the walking route is less than a predetermined threshold (e.g., 3.5 km) (e.g., the one or more second criteria), the respective mode of transportation is walking.

In some embodiments, such as in FIG. 8O, in accordance with a determination that the route from the first physical location to the second physical location fails to satisfy the one or more second criteria, in accordance with a determination that a route from the first physical location to the second physical location using a third mode of transportation satisfies one or more third criteria, the respective mode of transportation is a third mode of transportation. In some embodiments, the route using the second mode of transportation does not satisfy the one or more distance- and/or time-based criteria. For example, the route via walking exceeds a predetermined time threshold (e.g., 15 minutes). As another example, the estimated time of arrival of the route via walking is later than the estimated time of arrival using public transportation or the walking route exceeds a predetermined distance threshold (e.g., 3.5 km). In some embodiments, the one or more third criteria are time-based. For example, if the duration of a route using public transportation is less than a predetermined time threshold (e.g., 1 hour), the respective mode of transportation is walking. As another example, if the estimated time of arrival by public transportation is earlier than the estimated time of arrival by walking, the respective mode of transportation is public transportation. In some embodiments, in accordance with a determination that the route using the third mode of transportation fails to satisfy the one or more third criteria, the respective mode of transportation is a fourth mode of transportation. For example, if the route using public transportation does not satisfy the one or more third criteria, the respective mode of transportation is automobile if a route by automobile is available. In some embodiments, if no routes are available using the modes of transportation for which the electronic device is able to obtain navigation directions, the electronic device presents an indication that navigation directions are not available. The above-described manner of selecting the respective mode of transportation based on one or more criteria and an order of prioritization enables the electronic device to efficiently present an indication of navigation directions using a mode of transportation that is likely to be suitable for the user, which simplifies the interaction between the user and the electronic device and enhances the operability of the electronic device and makes the user-device interface more efficient (e.g., by reducing the number of inputs needed to obtain suitable navigation directions), which additionally reduces power usage and improves battery life of the electronic device by enabling the user to use the electronic device more quickly and efficiently.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1100) are also applicable in an analogous manner to method 900 described above with respect to FIG. 9. For example, the ways of presenting navigation options described above with reference to method 900 optionally have one or more of the characteristics of the ways of presenting safety characteristics of navigational segments, presenting indications of navigation directions, etc., described herein with reference to other methods described herein (e.g., methods 700 to 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 9 are, optionally, implemented by components depicted in FIGS. 1A-1B. For example, displaying operations 906 and 908 and receiving operation 902 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Providing Indications of Navigation Directions

Users interact with electronic devices in many different manners, including using an electronic device to display navigation routes from one physical location to another. The embodiments described below provide ways in which an electronic device presents indications of upcoming maneuvers of a route while presenting navigation directions. Presenting the indications of upcoming maneuvers of a route in the ways described herein enhances interactions with a device, thus reducing the amount of time needed by a user to perform operations, thus reducing the power usage of the device, which increases battery life for battery-powered devices. It is understood that people use devices. When a person uses a device, that person is optionally referred to as a user of the device.

While navigating to a predetermined physical location, the electronic device 500 is able to provide indications of upcoming navigation maneuvers the user is to perform to follow the route.

Figure 10H:
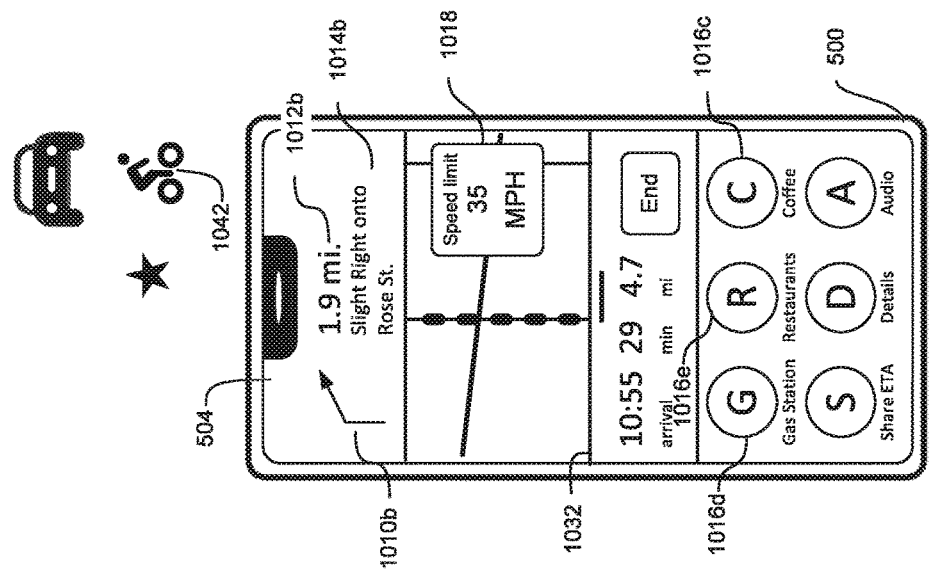
Figure 10G:
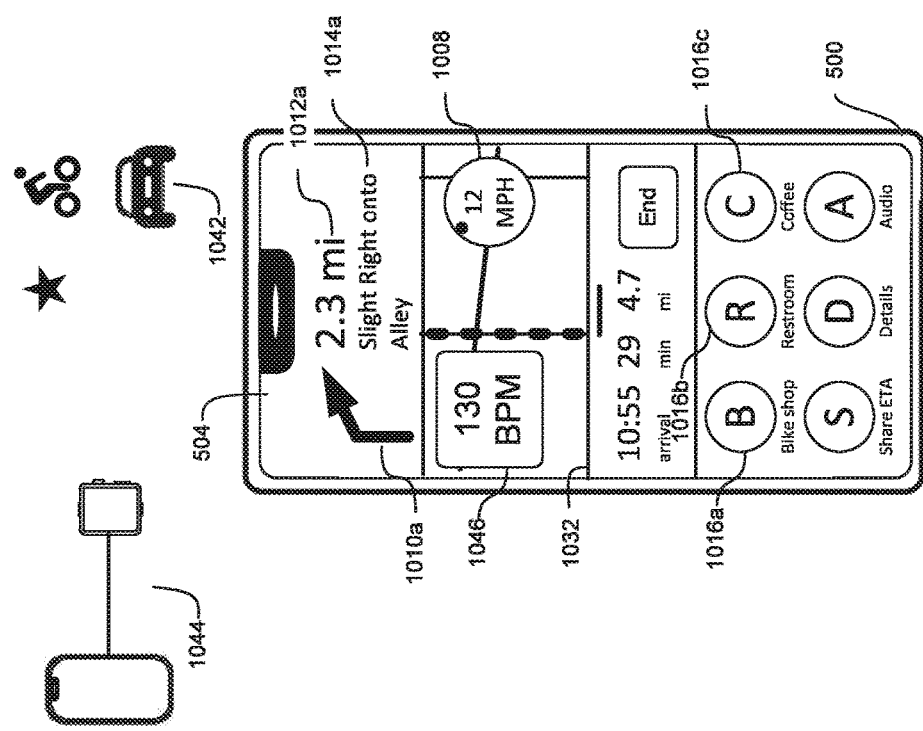
Figure 10J:
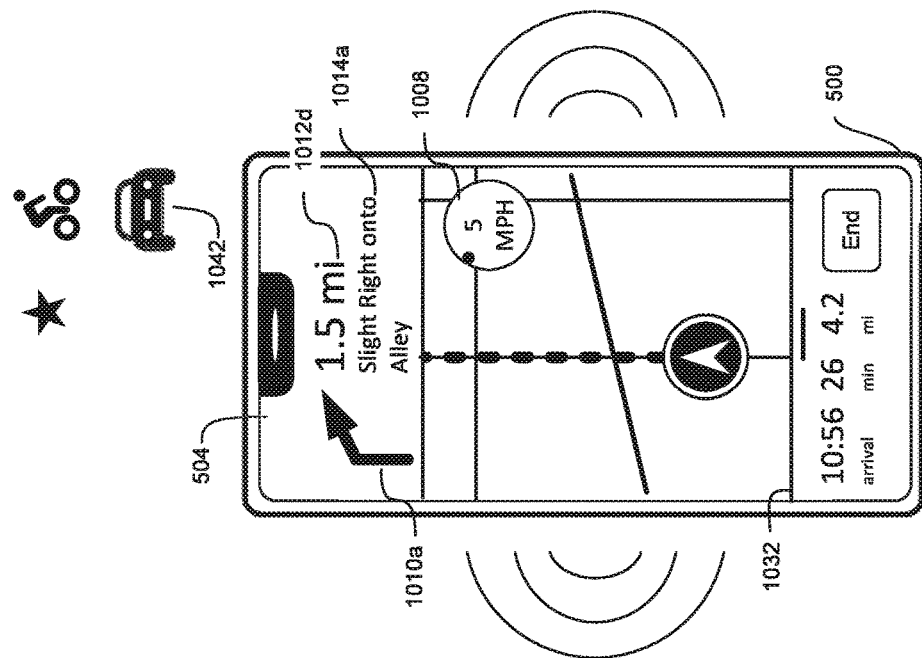
Figure 10I:
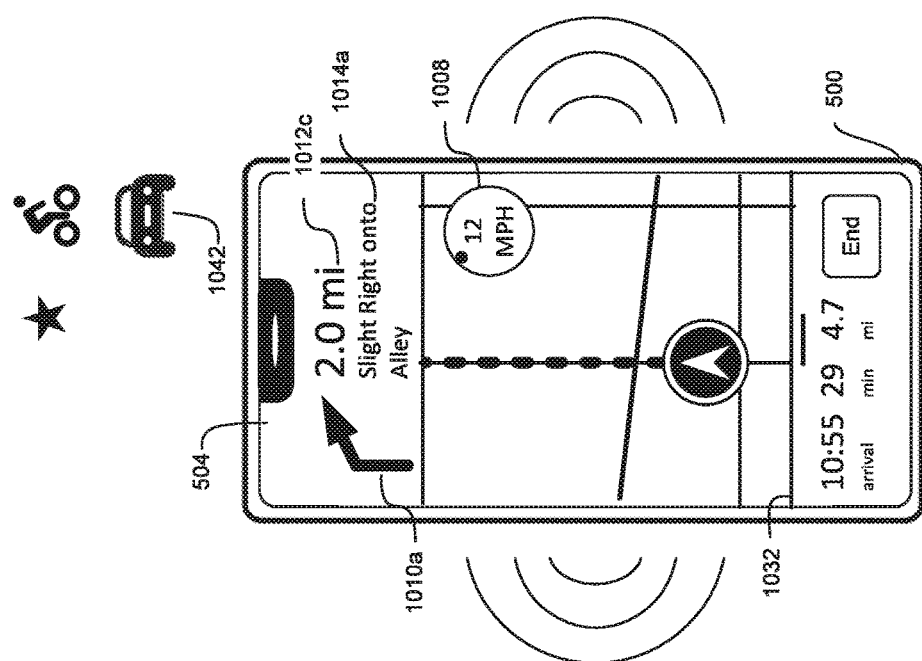
Figure 10L:
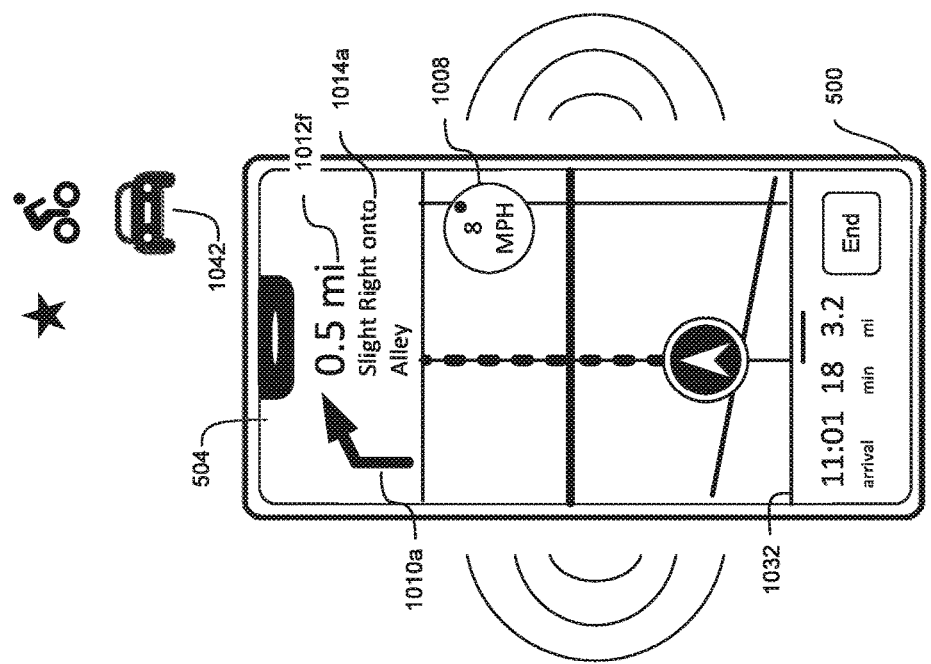
Figure 10K:
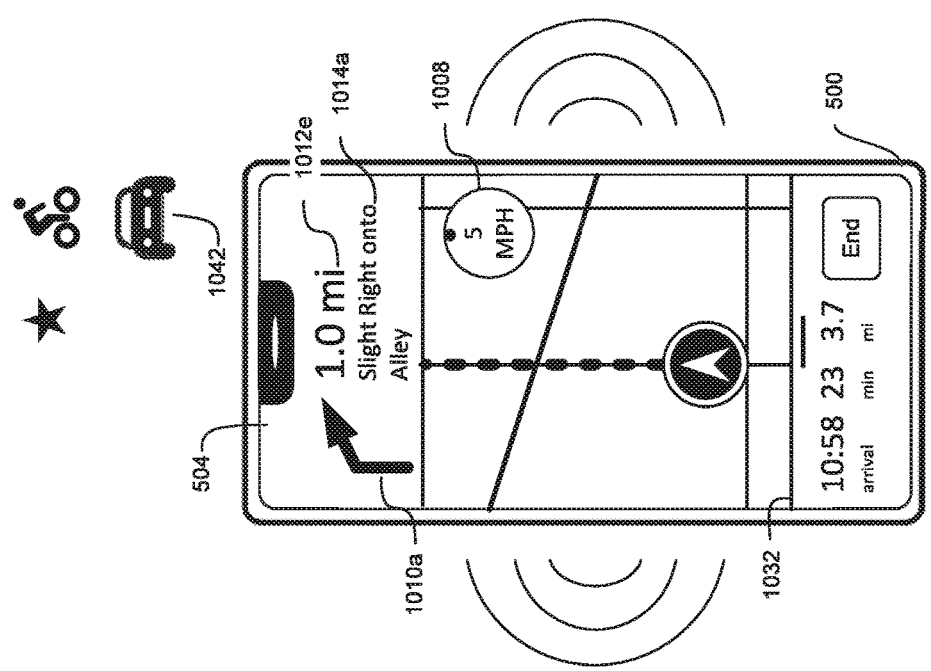
Figure 10N:
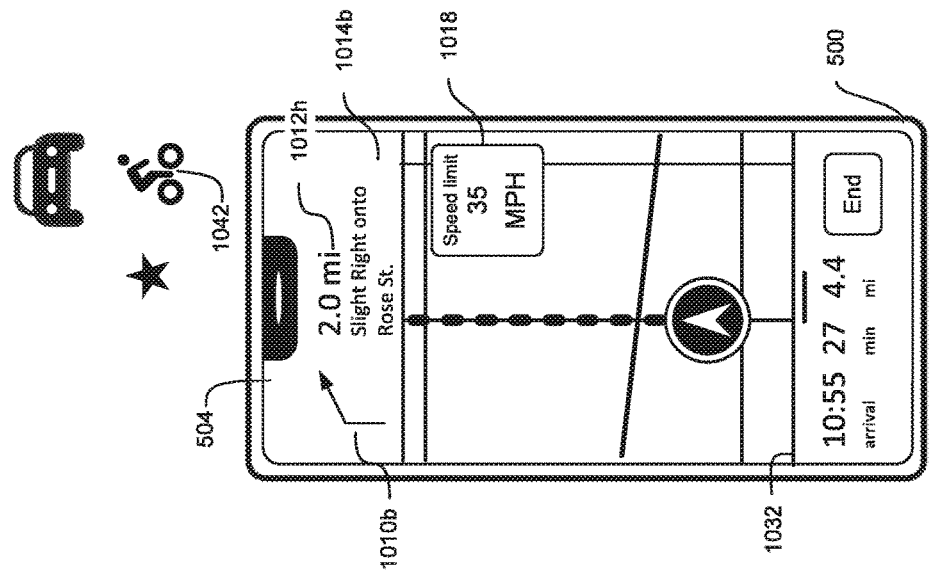
Figure 10M:
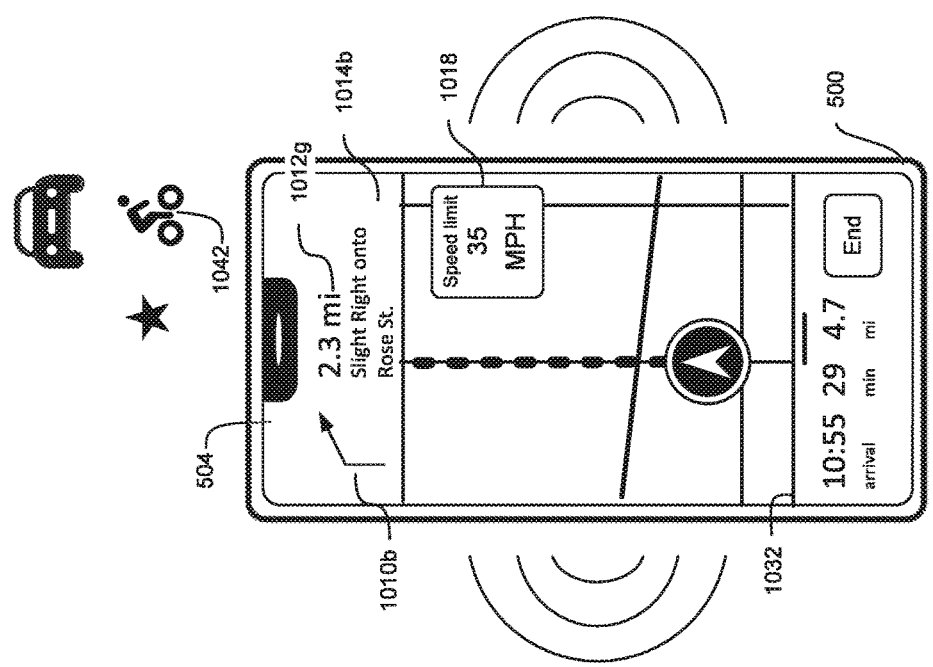
Figure 10P:
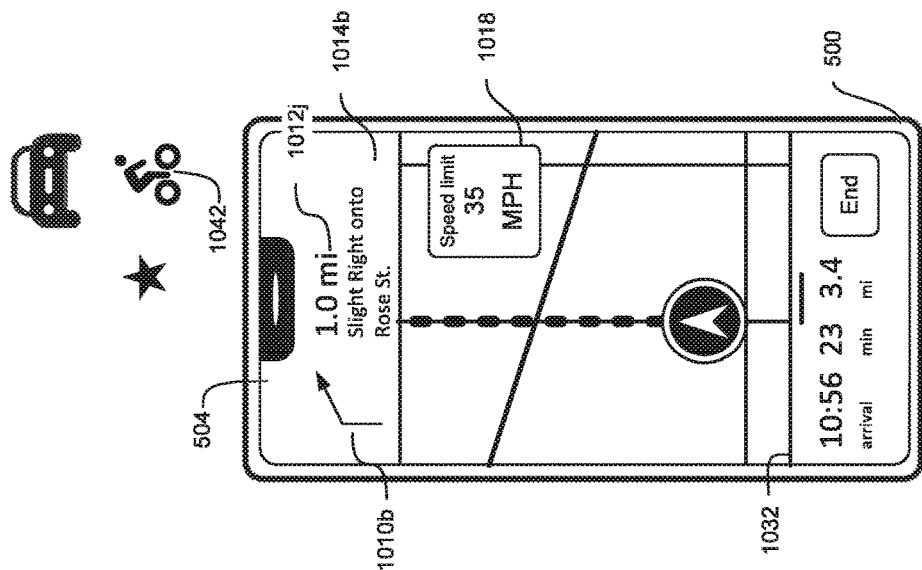
Figure 10O:
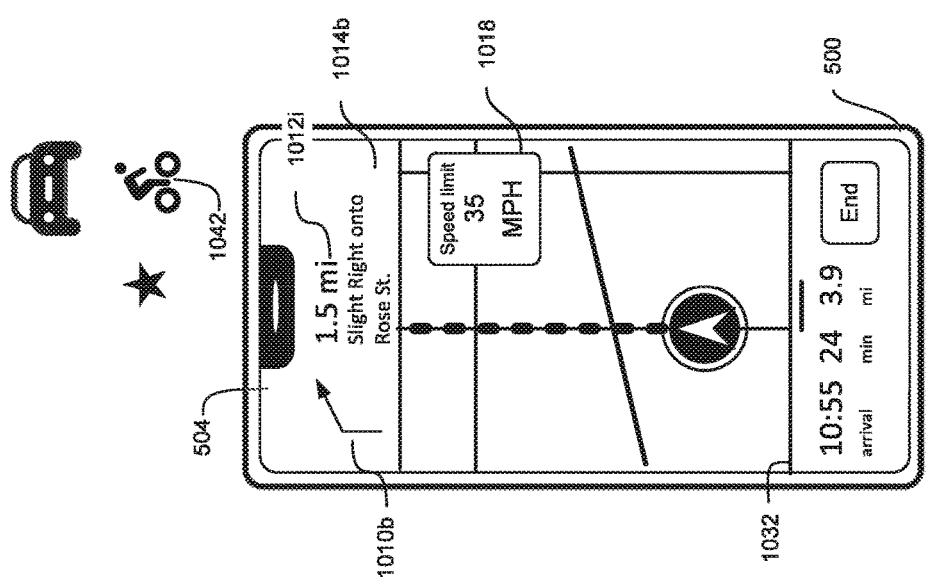
Figure 10Q:
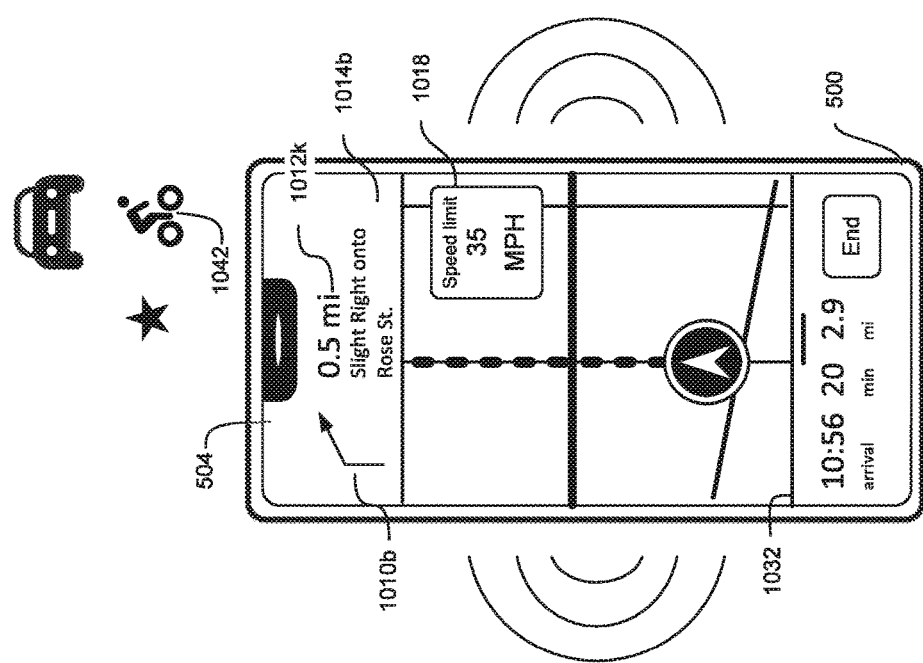

FIGS. 10A-10Q illustrate various ways the electronic device 500 presents indications of navigation directions while navigating along a route according to some embodiments. The embodiments in these figures are used to illustrate the processes described below, including the processes described with reference to FIG. 11. It should be understood that FIGS. 10A-10Q are provided as examples and the electronic device 500 is able to perform the processes described below with reference to FIG. 11 in ways other than the examples described below with reference to FIGS. 10A-10Q.

FIG. 10A illustrates an electronic device 500 presenting an exemplary indication of an upcoming maneuver included in navigation directions. Device 500 is optionally a wearable device such as a smartwatch. As indicated by legend 1042 of FIG. 10A, the electronic device 500 is currently configured to provide directions via bicycle and bicycle is the default mode of transportation, for example. The indication of the upcoming maneuver optionally includes an image 1002a corresponding to the maneuver to be performed (e.g., climbing or descending stairs), an indication 1006a of the distance between the current location of the electronic device 500 and the location of the maneuver, and text 1004a describing the maneuver to be performed. As shown in FIG. 10A, the text 1004a is displayed in a box with a first color. In some embodiments, the text 1004a is not displayed in a box and the text itself is displayed with a first color (e.g., white text on a black background or black text on a white background). The electronic device 500 optionally updates the color of the text 1004a as the location of the electronic device 500 gets closer to the location at which the maneuver is to be performed, as described below with reference to FIGS. 10B and 10C, to efficiently communicate the proximity of the electronic device 500 to the location at which the maneuver is to be performed, for example. In some embodiments, the electronic device 500 uses different visual indications to indicate changing proximity from the location of the upcoming maneuver.

FIG. 10B illustrates the electronic device 500 presenting the indication of the upcoming maneuver included in the navigation directions after the electronic device 500 has moved closer from the location of the electronic device 500 while the electronic device 500 displayed the user interface illustrated in FIG. 10A. As shown in FIG. 10B, the electronic device 500 optionally continues to present the image 1002a corresponding to the upcoming maneuver and has updated the indication 1006b of the distance between the location of the electronic device 500 and the location of the maneuver, for example. In response to determining that the electronic device 500 is within a threshold distance (e.g., 300 or 400 or 500 feet) from the location of the maneuver, the electronic device 500 optionally updates the text 1004b describing the maneuver to be displayed in a different color (e.g., blue text).

Although FIGS. 10A and 10B illustrate updating the text 1004b by updating the style of the box surrounding the text, in some embodiments, the electronic device 500 changes the color of the text itself rather than the color of the box.

FIG. 10C illustrates the electronic device 500 presenting the indication of the upcoming maneuver included in the navigation directions after the electronic device 500 has again moved closer to the location of the maneuver (e.g., closer than another threshold distance to the maneuver, such as 10 ft., 5 ft., 1 ft., etc.). As indicated by indication 1006c, the electronic device 500 is now 1 foot away from the location at which the maneuver is to be performed, for example. In addition to updating the indication 1006c of the distance from the location of the maneuver, the electronic device 500 optionally updates the text 1004c describing the maneuver to display the text in a different color (e.g., black or white text) than the color of the text in 10B because the electronic device 500 is now within a closer threshold (e.g., 0 or 1 or 5 or 10 feet) distance away from the location of the maneuver. In some embodiments, the text 1004c is the same color as the text 1004a in FIG. 10A and in some embodiments, the text 1004c is a different color as the text 1004a in FIG. 10A. The electronic device 500 also generates a haptic response indicating the proximity of the electronic device 500 to the location of the maneuver.

In some embodiments, the electronic device 500 is able to present indications of hazards along the navigation route. Hazards can include road closures, obstacles in the road (e.g., stairs, segments of road that are not accessible to bicycles, steep hills), traffic incidents, and other hazards not expressly listed here. As shown in FIG. 10D, in response to an indication of an upcoming hazard (e.g., in response to coming within a threshold distance of the hazard, such as 200 ft., 100 ft., 50 ft.), the electronic device 500 optionally displays a hazard icon 1002b that indicates the hazard (e.g., the type of hazard), an indication 1006d of the distance between the location of the electronic device 500 and the hazard and text 1004d providing more detail about the hazard. In some embodiments, the electronic device 500 is able to present different indications of upcoming hazards. The text 1004d is optionally displayed in a different color than the colors used to display text describing a navigation route maneuver described above with reference to FIGS. 10A-10C. The electronic device 500 may also generate a tactile output that is different from the tactile output illustrated in FIG. 10C that is generated in response to the location of the electronic device 500 being within the closer threshold of the location of the maneuver of the navigation directions. Thus, in some embodiments, device 500 generates different haptics and/or text colors for hazards as compared to maneuvers, which further improves the ability of device 500 to efficiently communicate information about the route to the user of the device.

FIG. 10E-10F illustrate ways in which the electronic device 500 displays indications of information related to navigation (e.g., a physiological measurement (e.g., heart rate) of the user if the electronic device 500 is paired to another electronic device with a physiological sensor, a current speed of the electronic device) while the electronic device 500 presents navigation directions. FIG. 10E illustrates the electronic device 500 presenting a navigation user interface while providing navigation directions along a route. As indicated by legend 1044 of FIG. 10E, the electronic device 500 is not currently in communication with a wearable device including sensors for tracking exercise data. As indicated by legend 1042 of FIG. 10E, the electronic device 500 is currently providing navigation directions for bicycle and bicycle is the default mode of transportation. The user interface optionally includes a map including a representation of the current location of the electronic device and an indication of the route.

As shown in FIG. 10E, the user interface includes an image 1010a representing the next maneuver of the navigation directions to be performed, an indication 1012a of the distance between the current location of the electronic device 500 and the location of the maneuver, and text 1014a describing the maneuver to be performed. The user interface further includes an indication 1008 of the current velocity of the electronic device 500 (e.g., corresponding to the velocity of the bicycle being used by the user). The indication 1008 optionally includes a dynamic scale that changes based on the velocity history of the electronic device 500. For example, an electronic device that has previously been moving at a relatively high velocity will display the indication 1008 with a higher velocity corresponding to a maximum velocity position on the indication than an electronic device that has previously been moving at a relatively low velocity. In some embodiments, the electronic device 500 forgoes displaying a dynamic velocity scale for other modes of transportation, such as driving and public transportation because either the mode of transportation includes a speedometer (e.g., as is the case for driving) or the speed is not the responsibility of the user (e.g., as is the case for public transportation).

The user interface illustrated in FIG. 10E optionally further includes a user interface element 1032 overlaid on the map. The user interface element 1032 includes an indication of the estimated time of arrival, an indication of the estimated remaining duration along the navigation route, the distance remaining on the navigation route, and a selectable option ("End") that, when selected, causes the electronic device 500 to cease presenting the navigation directions.

FIG. 10F illustrates the electronic device 500 presenting a navigation user interface while providing directions along a route while in communication with another electronic device (e.g., a wearable device such as a smartwatch). The user interface illustrated in FIG. 10F is optionally the same as the user interface illustrated in FIG. 10E, except in FIG. 10F, the electronic device 500 optionally presents an indication 1046 of a current heart rate (or other physiological quantity) of the user because the electronic device 500 is paired to/communicating with the other electronic device according to legend 1044. The current heart rate (or other physiological quantity) is optionally measured by the other device and transmitted to device 500 for display. The other electronic device is optionally a fitness tracking device, such as a smartwatch, that is configured to track exercise data, such as motion data, location data, and/or heart rate data. In some embodiments, electronic device 500 does not display the indication 1046 if the smartwatch is not being worn by the user, the smartwatch is not in a mode in which activity data is collected, or one or more sensors of the smartwatch are obstructed (e.g., there is a barrier, such as clothing or a band, between the heart rate sensor and the wrist of the user) even if the smartwatch is in communication with electronic device 500. In some embodiments, as long as the smartwatch is in communication with electronic device 500 and the physiological sensors of the smartwatch are not obstructed, the electronic device 500 displays the indication 1046 of the heart rate (or other physiological quantity) of the user while navigating along the route even if the smart watch and/or electronic device 500 are not operating in a mode in which exercise data is collected.

As shown in FIG. 10F, the user swipes (e.g., with contact 1003) the edge of the user interface element 1032 up to expand the user interface element 1032, as shown in FIG. 10G. FIG. 10G illustrates the presentation of various selectable options 1016a-c while providing navigation directions on the electronic device 500. In some embodiments, the electronic device 500 presents the options 1016a-c in response to a different user input and/or in a different region of the user interface. The selectable options 1016a-c optionally each correspond to suggested navigation destinations along the navigation route. In response to detecting selection of a respective one of the selectable options 1016a-c, the electronic device 500 optionally presents selectable representations of possible navigation destinations in the category corresponding to the selected option. For example, in response to detecting selection of the option 1016a associated with bike shops, the electronic device 500 presents indications of bike shops along the navigation route that, when selected, causes the electronic device 500 to update the navigation directions to provide directions to the selected bike shop. As shown in FIG. 10G, while the electronic device 500 is presenting navigation directions via bicycle (according to the relative position of the bicycle and car in legend 1042), the electronic device 500 presents an option 1016a to view bike shops, an option 1016b to view restrooms, and an option 1016c to view coffee shops near the navigation route. The electronic device 500 presents options to view bike shop and restroom destinations along the route because the electronic device 500 is providing navigation directions via bicycle. In some embodiments, additional or alternative types of suggested destinations are possible.

FIG. 10H illustrates the options 1016c-e presented by the electronic device 500 while presenting navigation directions for automobile, as indicated by legend 1042 of FIG. 10H, for example. The electronic device 500 optionally displays an image 1010b indicating the next maneuver to be performed for the navigation directions. The image 1010b is smaller than the image 1010a displayed by the electronic device 500 in FIGS. 10F-10G while the electronic device 500 presents navigation directions via bicycle optionally because it is possible for a driver to have a passenger that is able to look at electronic device 500 longer than it is possible for a cyclist to do so or optionally because it may be easier for the driver to mount device 500 in a stable and easy-to-see location than for a cyclist to do the same. Returning to FIG. 10H, the electronic device 500 also optionally displays an indication 1012b of the distance between the location of the electronic device 500 and the location of the maneuver and text 1014b describing the maneuver to be performed. The user interface also optionally includes an indication 1018 of the speed limit on the current road instead of the dynamic indication 1018 of the current velocity of the electronic device 500 illustrated in FIGS. 10F-10G. As shown in FIG. 10H, instead of presenting indications of bike shops and restrooms along the route as shown in FIGS. 10F-10G, the electronic device 500 optionally presents a selectable option 1016d to view gas stations near the navigation route and a selectable option 1016e to view restaurants along the route. The electronic device 500 still presents the option 1016c to view coffee shops along the route. In some embodiments, the electronic device 500 presents different options while navigating via bicycle and/or automobile (e.g., as shown in FIGS. 10G-H), because different businesses and destinations are relevant to drivers versus cyclists (e.g., drivers need gas stations more than they need bike shops and cyclists need bike shops more than they need gas stations). In some embodiments, the electronic device 500 presents additional or alternative options corresponding to suggested destinations while navigating by motor vehicle. In some embodiments, the electronic device 500 presents other selectable options corresponding to suggested navigation destinations while navigating using other modes of transportation not specifically discussed here.

In some embodiments, the electronic device 500 presents audio indications of the next maneuver of the navigation directions while navigating along the route. The electronic device 500 optionally presents audio indications more frequently while presenting bicycling directions than the frequency at which the electronic device 500 presents the audio indications while navigating via automobile optionally because a cyclist may not be able to position electronic device 500 at a visible location to check that the navigation directions are still being provided, so additional audio queues may be helpful to the cyclist to reassure the cyclist that the navigation directions are still being provided. In contrast, in some embodiments, a driver may be able to mount electronic device 500 in a secure and easy-to-see location or may have a passenger that is able to look at device 500 to verify directions are still being provided. In some embodiments, the electronic device 500 is able to present audio indications of navigation maneuvers at other intervals for other modes of transportation not expressly discussed here.

FIGS. 10I-10L illustrate exemplary ways the electronic device 500 presents indications while navigating via bicycle. As shown in FIG. 10I, while providing navigation directions for bicycle, the electronic device 500 optionally displays an image 1010a corresponding to the next navigation maneuver, an indication 1012c of the distance between the current location of the electronic device 500 and the location of the navigation maneuver, an indication 1008 of the velocity of the electronic device 500, and the user interface object 1032 overlaid on the map. The text 1014a describing the maneuver optionally refers to the road onto which the user must turn as "alley" instead of referring to the road by its official name. In some situations, bicycles access roads and bike paths that have formal names that are not commonly used and may not be visibly displayed on those roads or bike paths, so the electronic device 500 optionally uses a generic name such as "bike path" or "alley" to refer to these roads. As shown in FIG. 10I, while the electronic device 500 is 2.0 miles away from the next maneuver of the navigation directions, the electronic device 500 presents an audio and/or tactile indication of the next maneuver. In some embodiments, the audio indication includes speaking the distance from the next maneuver and the description of the next maneuver.

FIG. 10J illustrates the electronic device 500 continuing to display the navigation directions for the route, for example. As indicated by the indication 1012d of the distance between the current location of the electronic device 500 and the location of the next maneuver of the navigation directions, the electronic device 500 is now 1.5 miles away from the location of the next navigation maneuver. At this location, the electronic device 500 optionally presents another audio and/or tactile indication of the next navigation maneuver. In some embodiments, the electronic device 500 does not present an audio and/or tactile indication between the audio indication illustrated in FIG. 10I and the audio indication in FIG. 10J. FIG. 10J also illustrates the dynamic indication 1008 of the current velocity of the electronic device 500 for illustrative purposes. Although the velocity of the electronic device 500 in FIG. 10J is less than the velocity of the electronic device 500 in FIG. 10I, the marker indicating the current velocity relative to the scale of the indication 1008 has optionally moved only slightly because the dynamic scale has optionally changed. For example, the velocity corresponding to a maximum position of the marker in FIG. 10J is less than the velocity corresponding to the maximum position of the marker in FIG. 10I because the time-averaged velocity of the electronic device 500 is lower in FIG. 10J than it was in FIG. 10I because the electronic device 500 has slowed down.

FIGS. 10K and 10L illustrate the electronic device 500 providing audio indications of the next maneuver while the electronic device 500 is 1.0 miles away from the location of the maneuver and 0.5 miles away from the location of the maneuver, respectively. Although the current velocity of the electronic device 500 is the same in FIG. 10K as it is in FIG. 10J, the marker has moved to indicate a higher velocity relative to the scale of the indicator 1008 optionally because the time-averaged velocity of the electronic device 500 has decreased. As shown in FIG. 10L, in response to detecting an increase in the velocity of the electronic device 500, the electronic device 500 moves the marker of the velocity indication 1008 clockwise to indicate a higher speed. If the electronic device 500 were to continue to move at the speed of 8 miles per hour, the electronic device 500 would optionally move the marker counterclockwise in response to the increase in the time-averaged velocity of the electronic device.

FIGS. 10M-10Q illustrate examples of the electronic device 500 presenting indications of navigation directions while providing navigation directions via driving. As shown in FIG. 10M, the electronic device 500 optionally presents the image 1010b indicating the next maneuver to be performed, an indication 1012g of the distance between the electronic device 500 and the location of the next maneuver to be performed, a text description 1014b of the upcoming maneuver, an indication 1018 of the speed limit on the current road, and a user interface object 1032 overlaid on the map including the estimated time of arrival, estimated remaining duration along the route, remaining distance along the route, and an option to cease presenting the navigation directions. As described above, the image 1010b indicating the next maneuver to be performed may be smaller than the image 1010a displayed by the electronic device 500 while providing cycling directions. Second, as shown in FIG. 10M, the electronic device 500 may refer to the road in the navigation directions by its name ("Rose Street") instead of a generic name, such as "alley" as was done in FIGS. 10I-10L. Third, the dynamic indication 1008 of the current velocity of the electronic device 500 may be replaced with an indication 1018 of the speed limit on the current road. As shown in FIG. 10M, the electronic device 500 presents an audio and/or tactile indication of the next maneuver of the navigation directions, such as speaking the maneuver to be performed (e.g., "take a slight right"), the street onto which to turn (e.g., "Rose street"), and the distance between the electronic device 500 and the location of the maneuver (e.g., "in 2.3 miles"). In some embodiments, the electronic device 500 presents the audio indication of the next maneuver right after detecting the user completing the prior maneuver.

FIGS. 10N-10P illustrate the electronic device 500 continuing to display the navigation directions as the electronic device 500 continues along the navigation route for illustrative purposes. As shown in FIGS. 10N-10P, the electronic device 500 optionally forgoes presenting audio and/or tactile indications in response to detecting the electronic device 500 is 2.0 miles, 1.5 miles, and 1.0 miles away from the location of the maneuver while presenting driving directions. In some embodiments, the electronic device 500 optionally presents the audio and/or tactile indications less frequently when navigating by automobile than when navigating by bicycle.

In FIG. 10Q, when the electronic device 500 is 0.5 miles away from the location of the next maneuver, the electronic device 500 presents an audio and/or tactile indication of the next maneuver. Thus, in some embodiments, the electronic device 500 presents multiple audio and/or tactile indications of the next maneuver while providing navigation directions for an automobile at distance-based intervals that are longer than the distance-based intervals with which the electronic device 500 presents audio and/or tactile indications of navigation directions when providing bicycling directions.

FIG. 11 is a flow diagram illustrating a method 1100 of presenting indications of navigation directions while navigating along a route according to some embodiments. The method 1100 is optionally performed at an electronic device such as device 100, device 300, device 500 as described above with reference to FIGS. 1A-1B, 2-3, 4A-4B and 5A-5H. Some operations in method 1100 are, optionally combined and/or order of some operations is, optionally, changed.

In some embodiments, method 1100 is performed at an electronic device 500 in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device)). In some embodiments, the display generation component is a display integrated with the electronic device (optionally a touch screen display) and/or an external display such as a monitor, projector, television, etc.

In some embodiments, such as in FIG. 10A, while navigating along a route from a first physical location to a second physical location, the electronic device 500 displays (1102), via the display generation component 504, a visual indication 1004a of a maneuver to be performed next to follow the route. In some embodiments, the maneuver is one of turning left, turning right, continuing straight from a road with one name to a road with another name, exiting a freeway or highway, making a U-turn, dismounting a bicycle and walking, dismounting a bicycle and taking stairs, crossing the street before turning (e.g., while cycling), or arriving at the destination. In some embodiments, the visual indication of the maneuver includes text and an image. For example, if the maneuver is a right turn, the visual indication of the right turn includes text indicating the right turn, the road onto which the user should turn right, and an image of an arrow turning right.

In some embodiments, such as in FIG. 10A, the visual indication 1004a of the maneuver is displayed with a visual characteristic having a first value (1104). Optionally, the visual characteristic is the color of the text and/or image of the visual indication, a size of the visual indication, a pattern of the visual indication, or another change in the way the visual indication is presented.

In some embodiments, such as in FIG. 10B, while displaying the visual indication of the maneuver with the visual characteristic having the first value and before determining that a user has begun to perform the maneuver, the electronic device 500 updates (1106) the visual indication 1004b of the maneuver to be displayed with the visual characteristic having a second value, different from the first value, wherein updating the visual indication of the maneuver is done without changing a size of the visual indication. In some embodiments, the electronic device changes the color, pattern, or other characteristic of the visual indication, other than size, in response to detecting that the location of the electronic device changes from being more than the threshold distance from the location of the maneuver to being less than the threshold distance away from the location of the maneuver. In some embodiments, the electronic device additionally or alternatively changes the size of the visual indication. For example, while the electronic device is more than 400 feet away from a location at which the navigation directions instruct the user to make a U-turn, the electronic device displays an indication of the U-turn that includes an image of an arrow in a U-turn shape and white text indicating that a U-turn should be made and the name of the road on which the U-turn will be made. In this example, in response to determining that the location of the electronic device has changed to be less than 400 feet from the location of the U-turn, the electronic device updates the indication of the U-turn to display the text in blue. In some embodiments, when the location of the electronic device changes from being greater than the threshold distance from the maneuver to being less than the threshold distance from the maneuver, the electronic device optionally generates a tactile output (e.g., a vibration or haptic).

The above-described manner of updating the visual indication of the maneuver in accordance with a determination that the location of the electronic device is within the threshold of the location of the maneuver enables the electronic device to efficiently indicate to the user that the maneuver location is soon approaching, which simplifies the interaction between the user and the electronic device and enhances the operability of the electronic device and makes the user-device interface more efficient (e.g., by reducing the number of inputs needed to determine the relative distance to the next maneuver), which additionally reduces power usage and improves battery life of the electronic device by enabling the user to use the electronic device more quickly and efficiently.

In some embodiments, such as in FIG. 10C, while displaying the visual indication of the maneuver with the visual characteristic having the second value and in accordance with a determination that a location of the electronic device is within a threshold distance (e.g., 5 feet, 10 feet, 20 feet, 30 feet, 40 feet, 50 feet, etc.) of a location at which the maneuver is to be performed, the electronic device 500 updates the visual indication 1004*c* of the maneuver to be displayed with the visual characteristic having a third value, different from the second value, without changing the size of the visual characteristic. In some embodiments, the electronic device changes the color of the indication of the maneuver in response to detecting that the electronic device is approximately at the location of the maneuver. For example, while presenting the navigation instructions, the electronic device presents text indicating the maneuver to be performed and the color of the text changes when the location of the electronic device is within the threshold distance of the location of the maneuver. For example, if the navigation directions are to turn right onto a respective street, the location of the maneuver is the intersection of the road on which the user is currently traveling and the respective street. In some embodiments, the electronic device presents a tactile output in response to detecting the location of the electronic device is within the threshold of the location of the maneuver.

The above-described manner of updating the visual indication in accordance with the determination that the location of the electronic device is within a threshold distance of a location at which a maneuver is to be performed enables the electronic device to efficiently communicate to the user that the maneuver needs to be performed soon, which simplifies the interaction between the user and the electronic device and enhances the operability of the electronic device and makes the user-device interface more efficient (e.g., by reducing user navigation error, thus reducing navigation time and time during which the navigation directions must be presented), which additionally reduces power usage and improves battery life of the electronic device by enabling the user to use the electronic device more quickly and efficiently.

In some embodiments, such as in FIG. 10C, while navigating along the route, in accordance with a determination that a location of the electronic device is within a threshold distance (e.g., 5 feet, 10 feet, 20 feet, 30 feet, 40 feet, 50 feet, etc.) of a location at which the maneuver is to be performed, the electronic device 500 generates a first tactile output having a first value for a respective characteristic (e.g., frequency, amplitude, and pattern of the tactile output). In some embodiments, such as in FIG. 10D, in accordance with a determination that there is a hazard along the route between the location of the electronic device and the second physical location, the electronic device 500 generates a second tactile output having a second value, different from the first value, for the respective characteristic. In some embodiments, a hazard includes slow traffic, road closures, debris in the road, lane closures, etc. The second tactile output optionally has a frequency, amplitude, and/or pattern that is different from the first tactile output. The above-described manner of generating different tactile outputs for navigation maneuvers and hazards enables the electronic device to efficiently communicate upcoming maneuvers and hazards to the user without the use of other output devices in communication with the electronic device (e.g., audio device(s), display generation component(s)), which simplifies the interaction between the user and the electronic device and enhances the operability of the electronic device and makes the user-device interface more efficient (e.g., by reducing the time the user interacts with the display generation component in communication with the electronic device), which additionally reduces power usage and improves battery life of the electronic device by enabling the user to use the electronic device more quickly and efficiently.

In some embodiments, such as in FIG. 10F, while navigating along the route from the first physical location to the second physical location, the electronic device 500 displays, via the display generation component, an indication 1046 of a physiological measurement of the user (e.g., heart rate). In some embodiments, the electronic device displays the indication of the physiological measurement in accordance with a determination that the electronic device is in communication with a physiological sensor (e.g., heart rate monitor, in some embodiments, included in a second electronic device, such as a watch, in communication with the electronic device) and the navigation application of the electronic device is operating in a mode in which physical activity data of the user is collected while navigating. In some embodiments, the electronic device automatically collects activity data when the user begins navigating when operating in an "Auto-Record Workouts" navigation mode associated with one or more respective modes of transportation (e.g., cycling, walking), according to one or more steps of methods 700 and/or 900. The above-described manner of displaying the indication of the physiological measurement while navigating along the route enables the electronic device to concurrently display information related to the navigation directions and the physiological information without the user having to switch between a navigation application user interface and an activity tracking user interface, which simplifies the interaction between the user and the electronic device and enhances the operability of the electronic device and makes the user-device interface more efficient (e.g., by reducing the number of user inputs required to view the physiological measurement), which additionally reduces power usage and improves battery life of the electronic device by enabling the user to use the electronic device more quickly and efficiently.

In some embodiments, such as in FIG. 10F, while navigating along the route from the first physical location to the second physical location, the electronic device 500 receives, via the one or more input devices, an input (e.g., contact 1003) corresponding to a request to display a plurality of suggested destinations along the route. In some embodiments, the suggested destinations are categories of destinations, such as gas stations, grocery stores, restaurants, coffee shops, bike shops, public restrooms, etc. In some embodiments, in response to detecting selection of one of the categories of destinations, the electronic device presents representations of a plurality of destinations in the category that are located within a threshold time or distance from the navigation route. In some embodiments, such as in FIG. 10H, in accordance with a determination that the route uses a first mode of transportation (e.g., automobile), the plurality of suggested destinations is a first plurality of suggested destinations 1016c-e (e.g., gas stations, restaurants, coffee shops, etc., and not including bike shops). In some embodiments, such as in FIG. 10G, in accordance with a determination that the route uses a second mode of transportation (e.g., bicycle), the plurality of suggested destinations is a second plurality of suggested destinations 1016a-c, different from the first plurality of suggested destinations (e.g., bike shops, public restrooms, restaurants, etc., and not including gas stations). In some embodiments, the categories of suggested destinations are different for one mode of transportation than they are for another mode of transportation because some types of destinations are more relevant for one mode of transportation compared to the other mode of transportation. For example, gas stations are relevant when driving an automobile while bike shops are relevant when riding a bicycle. In some embodiments, each respective representation of a suggested destination is selectable to, in response to detecting selection of the respective representation, present navigation directions to the suggested destination. In some embodiments, some categories of suggested destinations are the same for the two modes of transportation, but the suggested destinations within the categories are different due to differences in ease of maneuvering different modes of transportation. In some embodiments, suggested destinations are evaluated against different criteria depending on the mode of transportation currently being used, including whether or not the side of the street of the destination is considered, whether or not locations that require the user to backtrack along the route to the second physical location are recommended, and other possible criteria. For example, when navigating by bicycle, the electronic device does not suggest destinations that require turning left across a busy street and when navigating by automobile, the electronic device is less likely to suggest destinations that require performing a U-turn. The above-described manner of presenting different suggested destinations depending on the mode of transportation being used to navigate enables the electronic device to present suggested destinations that are relevant to the user, which simplifies the interaction between the user and the electronic device and enhances the operability of the electronic device and makes the user-device interface more efficient (e.g., by reducing the number of inputs needed to request directions to a relevant destination), which additionally reduces power usage and improves battery life of the electronic device by enabling the user to use the electronic device more quickly and efficiently.

In some embodiments, while navigating along the route from the first physical location to the second physical location, in accordance with a determination that the route uses a first mode of transportation, such as in FIG. 10G, the size of the visual indication 1010a of the maneuver is a first size, and in accordance with a determination that the route uses a second mode of transportation, such as in FIG. 10H, different from the first mode of transportation, the size of the visual indication 1010b of the maneuver is a second size, different from the first size. In some embodiments, the size of the visual indication of the maneuver is larger when the navigation directions are provided for bicycle compared to the size of the visual indication of the maneuver when navigation directions are provided for automobile. The electronic device optionally displays additional indications other than the indication of the next maneuver overlaid on a map of the navigation route, such as an indication of the current velocity of the electronic device, a compass, etc. In some embodiments, the size of these other indications is also larger when navigating by bicycle compared to when navigating by automobile. In some embodiments, it is advantageous to display larger indications when navigating by bicycle because it may be more difficult for a user to mount their electronic device in an easily visible location on a bicycle compared to the ability of the user to mount their electronic device in an easily visible location on an automobile or because a cyclist has less time to look at the electronic device than a motorist (or the motorist has a passenger who can look at the electronic device whereas a cyclist does not). The above-described manner of displaying the visual indication of the maneuver at different sizes for different modes of transportation enables the electronic device to efficiently allocate display area between a map of the navigation route and the visual indication of the maneuver based on which mode of transportation is being used, which simplifies the interaction between the user and the electronic device and enhances the operability of the electronic device and makes the user-device interface more efficient (e.g., by reducing the duration of time the user interacts with the electronic device to obtain relevant information), which additionally reduces power usage and improves battery life of the electronic device by enabling the user to use the electronic device more quickly and efficiently.

In some embodiments, such as in FIG. 10I, while navigating along the route from the first physical location to the second physical location, the electronic device 500 displays a visual indication 1008 of a velocity of the electronic device. In some embodiments, such as in FIG. 10I, in accordance with a determination that the velocity of the electronic device is a first velocity, the visual indication 1008 of the velocity of the electronic device uses a first scale. In some embodiments, such as in FIG. 10J, in accordance with a determination that the velocity of the electronic device 500 is a second velocity, different from the first velocity, the visual indication 1008 of the velocity of the electronic device uses a second scale, different from the first scale. In some embodiments, the velocity scale has a relatively high top speed when the electronic device's velocity is relatively high and the velocity scale has a relatively low top speed when the electronic device's velocity is relatively low. The electronic device optionally updates the top velocity of the scale as the velocity of the electronic device changes. In some embodiments, the indication of the velocity is displayed when navigating by a first mode of transportation (e.g., bicycle), but not for other modes of transportation (e.g., walking, public transportation, automobile). For example, the indication of the velocity is displayed for bicycles because bicycles, unlike automobiles, generally do not include speedometers. In some embodiments, when navigating by automobile, the electronic device displays an indication of a speed limit instead of the indication of the current velocity because automobiles, unlike bicycles, are generally subject to speed limits and already include a speedometer. The above-described manner of displaying the velocity indication with a different scale depending on the current velocity of the electronic device enables the electronic device to display the velocity on a scale with a range of possible velocities relevant to the current velocity of the electronic device, which simplifies the interaction between the user and the electronic device and enhances the operability of the electronic device and makes the user-device interface more efficient (e.g., by making the velocity scale easier to read, thus enabling the user to more quickly read the velocity scale), which additionally reduces power usage and improves battery life of the electronic device by enabling the user to use the electronic device more quickly and efficiently.

In some embodiments, navigating along the route includes using a first mode of transportation (e.g., bicycle). Optionally, the maneuver is one of a first plurality of maneuvers associated with the first mode of transportation (e.g., In some embodiments, the electronic device is able to provide navigation directions including maneuvers that are specific to the mode of transportation currently being used to navigate from the first physical location to the second physical location. For example, directions for bicycle include maneuvers such as dismount and walk, walk up/down stairs, cross the road before turning, turn around in the middle of a road segment/block (and not waiting for a traffic light/intersection) that are not included for other modes of transportation, such as public transportation and/or automobile). In some embodiments, a second mode of transportation is associated with a second plurality of maneuvers associated with the second mode of transportation. In some embodiments, the second mode of transportation is not associated with the first plurality of maneuvers. Optionally, the first and second modes of transportation are both associated with a plurality of maneuvers that are performed by both modes of transportation. For example, both bicycle and automobile navigation directions include directions to turn right or left. In some embodiments, the plurality of maneuvers associated with navigating by bicycle includes one or more of "dismount and walk," "cross street before turning," "take stairs," and/or "turn around." In some embodiments, the plurality of maneuvers associated with navigating by automobile include one or more of "take exit," "merge onto freeway," and/or instructions to drive in a respective lane. The above-described manner of providing navigation instructions that includes maneuvers associated with the first mode of transportation enables the electronic device to customize the navigation directions depending on which mode of transportation is used, which simplifies the interaction between the user and the electronic device and enhances the operability of the electronic device and makes the user-device interface more efficient (e.g., by providing efficient navigation directions, which reduces the time the electronic device must present the navigation directions), which additionally reduces power usage and improves battery life of the electronic device by enabling the user to use the electronic device more quickly and efficiently.

In some embodiments, such as in FIG. 10J the route includes navigation along a respective segment (e.g., path, road, etc.). In some embodiments, such as in FIG. 10J, while navigating along the route, in accordance with a determination that the route is for a first mode of transportation, the electronic device 500 navigates along the route includes referring to the respective segment using a first name. In some embodiments, while navigating using the first mode of transportation (e.g., bicycle), the electronic device refers to a respective road or path using a generic term "e.g., the bike path" instead of the official name, which may not be posted near the road or path (and thus may not be visible to a bicyclist) or may not be typically used in conversation about the first mode of transportation. For example, the electronic device refers to a bike path merely as "the bike path" instead of the official/long-form name of the bike path when providing navigation directions by bicycle, or as "the alley" instead of Smith Alley. In some embodiments, such as in FIG. 10M, in accordance with a determination that the route is for a second mode of transportation, different from the first mode of transportation, the electronic device 500 navigates along the route does not include referring to the respective segment using the first name. In some embodiments, the electronic device always refers to streets, highways, and other roads used by automobiles by the official names of the roads when navigating by automobile. Thus, navigation directions by automobile optionally do not include directions to turn left into "the alley", but rather includes directions to turn left onto "Smith Alley." The above-described manner of referring to the respective segment using the first name when navigating by the first mode of transportation but not when navigating by the second mode of transportation enables the electronic device to provide directions that are easily understood by the user based on the mode of transportation being used, which simplifies the interaction between the user and the electronic device and enhances the operability of the electronic device and makes the user-device interface more efficient (e.g., by reducing user error and enabling the user to efficiently travel along the navigation route), which additionally reduces power usage and improves battery life of the electronic device by enabling the user to use the electronic device more quickly and efficiently.

In some embodiments, such as in FIGS. 10I-10L, while navigating along the route, in accordance with a determination that the route is for a first mode of transportation (e.g., bicycle), the electronic device 500 navigates along the route includes presenting maneuvering prompts at first distance or time-based intervals (e.g., once per two miles, once per mile, twice per mile, etc.). In some embodiments, in addition to generating indications of the maneuver at regular, distance-based intervals while navigating using the first mode of transportation, the electronic device generates a prompt for the maneuver when the location of the electronic device is within a threshold distance of the location of the maneuver (e.g., 1000 feet, 500 feet, etc. and again at 100 feet, 50 feet, 10 feet, etc. In some embodiments, such as in FIGS. 10M-10Q, in accordance with a determination that the route is for a second mode of transportation, different from the first mode of transportation, navigating along the route including presenting the maneuvering prompts at second distance or time-based intervals, different from the first distance or time-based intervals. In some embodiments, when navigating by automobile, the electronic device presents indications of the respective maneuver at longer distance-based intervals. For example, the electronic device presents an indication of the maneuver when the location of the electronic device is within a threshold distance of the maneuver (e.g., 10 miles, 5 miles, etc. and again at 1 mile, 0.5 miles, 0.25 miles, etc.). In some embodiments, the electronic device presents indications of an upcoming maneuver more frequently when navigating by bicycle than when navigating by automobile. The above-described manner of presenting indications of a maneuver of the navigation directions at different distance-based intervals for different modes of transportation enables the electronic device to provide indications of the maneuver at intervals that suite the mode which simplifies the interaction between the user and the electronic device and enhances the operability of the electronic device and makes the user-device interface more efficient (e.g., by automatically presenting indications of the next maneuver at intervals likely to be helpful to the user based on the mode of transportation used), which additionally reduces power usage and improves battery life of the electronic device by enabling the user to use the electronic device more quickly and efficiently.

In some embodiments, such as in FIG. 10D, while navigating along the route, in accordance with a determination that the route includes a hazard between a location of the electronic device and the second respective location, the electronic device 500 displays, via the display generation component 504, a visual indication 1004*d* of the hazard with the visual characteristic having a third value, different from the first and second values. In some embodiments, the electronic device also presents a voice prompt to indicate the hazard. In some embodiments, the visual characteristic is color. For example, the indication of the maneuver is first displayed in white text on a black background and then displayed in blue text and the indication of the hazard is displayed in orange text. In some embodiments, the visual indication of the hazard is displayed at the same size as the indication of the maneuver. The above-described manner of presenting the visual indication of the hazard with the visual characteristic having the third value different from the first and second value enables the electronic device to efficiently communicate to the user the difference between an indication of a maneuver and an indication of a hazard, which simplifies the interaction between the user and the electronic device and enhances the operability of the electronic device and makes the user-device interface more efficient (e.g., by efficiently communicating maneuvers and hazards to the user), which additionally reduces power usage and improves battery life of the electronic device by enabling the user to use the electronic device more quickly and efficiently.

In some embodiments, such as in FIGS. 10A-10C, updating the visual indication of the maneuver is performed in response to detecting that a location of the electronic device has changed from being greater than a predetermined threshold distance (e.g., 100, 200, 300, 400, 500 feet, etc.) from a location at which the maneuver is to be performed to being less than the predetermined threshold distance from the location at which the maneuver is to be performed. In some embodiments, the electronic device is in communication with a location sensor (e.g., GPS) and the electronic device uses the location sensor to determine the current location of the electronic device with respect to the location at which the maneuver is to be completed. In some embodiments, the visual characteristic is a color of the visual indication. For example, when the location of the electronic device is at least the threshold distance away from the location of the maneuver, the indication of the maneuver is displayed in white on a black background and when the location of the electronic device is less than the threshold distance away from the location of the maneuver, the indication is displayed in blue. The above-described manner of updating the visual indication in accordance with the distance between the electronic device and the location of the maneuver enables the electronic device to efficiently communicate to the user how far the electronic device (and the user) is from the location of the maneuver which simplifies the interaction between the user and the electronic device and enhances the operability of the electronic device and makes the user-device interface more efficient (e.g., by enabling the user to quickly determine whether they or not they are relatively close to the location of the maneuver), which additionally reduces power usage and improves battery life of the electronic device by enabling the user to use the electronic device more quickly and efficiently.

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 1100 described above with respect to FIG. 11. For example, the ways of presenting indications of navigation directions described above with reference to method 1100 optionally have one or more of the characteristics of the ways of presenting safety characteristics of a navigation route, presenting options related to navigation directions etc., described herein with reference to other methods described herein (e.g., methods 700 and 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 11 are, optionally, implemented by components depicted in FIGS. 1A-1B. For example, displaying operation 1102 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, determining the location of the electronic device enables the electronic device to provide navigation directions. Accordingly, use of such personal information data enables users to share and receive content with/from other electronic devices. Further, other uses for personal information data that benefit the user are also contemplated by the present disclosure. For instance, calendar information may be used to suggest destinations for navigation directions.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can select not to enable location services that determine the location of the electronic device or can select to only enable location services while using the electronic device for navigation purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed as new and desired to be protected by Letters Patent of the United States is:

1. A method, comprising:
   at an electronic device in communication with a display generation component and one or more input devices:
   receiving, via the one or more input devices, a sequence of one or more inputs corresponding to a request to display navigation directions using a respective mode of transportation from a first physical location to a second physical location; and
   in response to the sequence of one or more inputs corresponding to the request to display the navigation directions, displaying, via the display generation component, the navigation directions including a visual representation of a first navigational segment of the navigation directions and a visual representation of a second navigational segment of the navigation directions, wherein:
   the visual representation of the first navigational segment is separate from the visual representation of the second navigational segment;

in accordance with a determination that the respective mode of transportation is a first mode of transportation:
the visual representation of the first navigational segment includes a visual indication of a first safety characteristic of the first navigational segment, wherein the first safety characteristic is associated with the respective mode of transportation, and the first safety characteristic is a first type of safety characteristic; and
the visual representation of the second navigational segment includes a visual indication of a second safety characteristic of the second navigational segment; and
in accordance with a determination that the respective mode of transportation is a second mode of transportation, different from the first mode of transportation:
the visual representation of the first navigational segment does not include any visual indication of any safety characteristic of the first type of safety characteristic; and
the visual representation of the second navigational segment does not include the visual indication of the second safety characteristic of the second navigational segment.

2. The method of claim 1, wherein:
in accordance with a determination to use a first vehicle for the respective mode of transportation, the navigation directions are first navigation directions; and
in accordance with a determination to use a second vehicle, different from the first vehicle, for the respective mode of transportation, the navigation directions are second navigation directions, different from the first navigation directions.

3. The method of claim 1, further comprising:
in response to the sequence of one or more inputs corresponding to the request to display the navigation directions:
in accordance with a determination that a setting to record user activity data while navigating using the navigation directions is enabled, collecting user activity data, from a second electronic device in communication with the electronic device, as a user navigates using the navigation directions; and
in accordance with a determination that the setting to record user activity data while navigating using the navigation directions is not enabled, forgoing collecting the user activity data as the user navigates using the navigation directions.

4. The method of claim 1, wherein the sequence of one or more inputs includes an audio input directed to a virtual assistant of the electronic device, and the method further comprises:
in response to the sequence of one or more inputs and before a user begins navigating using the navigation directions, providing an audio response indicating (1) road conditions associated with the navigation directions or (2) elevation information associated with the navigation directions.

5. The method of claim 1, wherein:
the request to display navigation directions includes a request for the navigation directions using a first mode of transportation,
displaying the navigation directions includes displaying a visual representation of the navigation directions on a map, including a first respective segment accessible via the respective mode of transportation and a second respective segment not accessible via the respective mode of transportation, and a visual indication of a location at which the respective mode of transportation is not permitted,
the first respective segment is displayed on the map with a visual characteristic having a first value, and
the second respective segment is displayed on the map with the visual characteristic having a second value, different from the first value.

6. The method of claim 1, wherein:
in accordance with a determination that a respective navigational segment of the navigation directions includes an elevation offset that satisfies one or more criteria, displaying the navigation directions includes displaying a visual indication of the elevation offset in association with the respective navigational segment.

7. The method of claim 1, wherein the safety characteristic of a respective navigational segment comprises a visual indication that the respective navigational segment includes (1) a road having one or more lanes accessible both to automobiles and bicycles, (2) a road accessible to automobiles at one or more of a speed or volume greater than a predetermined threshold, (3) a bike path, (4) a road accessible to automobiles at one or more of a speed or volume less than a predetermined threshold, (5) a bike lane, (6) a hill at an incline that exceeds a predetermined threshold, (7) stairs, or (8) information about modes of transportation permitted to access the respective navigational segment.

8. The method of claim 1, wherein the visual indication of the safety characteristic of the first navigational segment is a first visual indication of a third safety characteristic of the first navigational segment, the visual representation of the first navigational segment includes the first visual indication of the third safety characteristic of the first navigational segment and a second visual indication of a fourth safety characteristic, different from the third safety characteristic, of the first navigational segment, and the third and fourth safety characteristics are associated with the respective mode of transportation.

9. An electronic device, comprising:
one or more processors;
memory; and
one or more programs, wherein the one or more programs are stored in the memory and configured to be executed by the one or more processors, the one or more programs including instructions for:
receiving, via one or more input devices, a sequence of one or more inputs corresponding to a request to display navigation directions using a respective mode of transportation from a first physical location to a second physical location; and
in response to the sequence of one or more inputs corresponding to the request to display the navigation directions, displaying, via a display generation component, the navigation directions including a visual representation of a first navigational segment of the navigation directions and a visual representation of a second navigational segment of the navigation directions, wherein:
the visual representation of the first navigational segment is separate from the visual representation of the second navigational segment;
in accordance with a determination that the respective mode of transportation is a first mode of transportation:

the visual representation of the first navigational segment includes a visual indication of a first safety characteristic of the first navigational segment, wherein the first safety characteristic is associated with the respective mode of transportation, and the first safety characteristic is a first type of safety characteristic; and the visual representation of the second navigational segment includes a visual indication of a second safety characteristic of the second navigational segment; and in accordance with a determination that the respective mode of transportation is a second mode of transportation, different from the first mode of transportation:

the visual representation of the first navigational segment does not include any visual indication of any safety characteristic of the first type of safety characteristic; and the visual representation of the second navigational segment does not include the visual indication of the second safety characteristic of the second navigational segment.

10. The electronic device of claim 9, wherein:

in accordance with a determination to use a first vehicle for the respective mode of transportation, the navigation directions are first navigation directions; and in accordance with a determination to use a second vehicle, different from the first vehicle, for the respective mode of transportation, the navigation directions are second navigation directions, different from the first navigation directions.

11. The electronic device of claim 9, wherein the one or more programs further include instructions for:

in response to the sequence of one or more inputs corresponding to the request to display the navigation directions:

in accordance with a determination that a setting to record user activity data while navigating using the navigation directions is enabled, collecting user activity data, from a second electronic device in communication with the electronic device, as a user navigates using the navigation directions; and in accordance with a determination that the setting to record user activity data while navigating using the navigation directions is not enabled, forgoing collecting the user activity data as the user navigates using the navigation directions.

12. The electronic device of claim 9, wherein the sequence of one or more inputs includes an audio input directed to a virtual assistant of the electronic device, and one or more programs further include instructions for:

in response to the sequence of one or more inputs and before a user begins navigating using the navigation directions, providing an audio response indicating (1) road conditions associated with the navigation directions or (2) elevation information associated with the navigation directions.

13. The electronic device of claim 9, wherein:

the request to display navigation directions includes a request for the navigation directions using a first mode of transportation, displaying the navigation directions includes displaying a visual representation of the navigation directions on a map, including a first respective segment accessible via the respective mode of transportation and a second respective segment not accessible via the respective mode of transportation, and a visual indication of a location at which the respective mode of transportation is not permitted, the first respective segment is displayed on the map with a visual characteristic having a first value, and the second respective segment is displayed on the map with the visual characteristic having a second value, different from the first value.

14. The electronic device of claim 9, wherein:

in accordance with a determination that a respective navigational segment of the navigation directions includes an elevation offset that satisfies one or more criteria, displaying the navigation directions includes displaying a visual indication of the elevation offset in association with the respective navigational segment.

15. The electronic device of claim 9, wherein the safety characteristic of a respective navigational segment comprises a visual indication that the respective navigational segment includes (1) a road having one or more lanes accessible both to automobiles and bicycles, (2) a road accessible to automobiles at one or more of a speed or volume greater than a predetermined threshold, (3) a bike path, (4) a road accessible to automobiles at one or more of a speed or volume less than a predetermined threshold, (5) a bike lane, (6) a hill at an incline that exceeds a predetermined threshold, (7) stairs, or (8) information about modes of transportation permitted to access the respective navigational segment.

16. The electronic device of claim 10, wherein the visual indication of the safety characteristic of the first navigational segment is a first visual indication of a third safety characteristic of the first navigational segment, the visual representation of the first navigational segment includes the first visual indication of the third safety characteristic of the first navigational segment and a second visual indication of a fourth safety characteristic, different from the third safety characteristic, of the first navigational segment, and the third and fourth safety characteristics are associated with the respective mode of transportation.

17. A non-transitory computer-readable storage medium storing one or more programs, the one or more programs comprising instructions, which when executed by one or more processors of an electronic device, cause the electronic device to:

receive, via one or more input devices, a sequence of one or more inputs corresponding to a request to display navigation directions using a respective mode of transportation from a first physical location to a second physical location; and in response to the sequence of one or more inputs corresponding to the request to display the navigation directions, display, via a display generation component, the navigation directions including a visual representation of a first navigational segment of the navigation directions and a visual representation of a second navigational segment of the navigation directions, wherein:

the visual representation of the first navigational segment is separate from the visual representation of the second navigational segment;

in accordance with a determination that the respective mode of transportation is a first mode of transportation:

the visual representation of the first navigational segment includes a visual indication of a first safety characteristic of the first navigational segment, wherein the first safety characteristic is associated with the respective mode of transportation, and the first safety characteristic is a first type of safety characteristic; and the visual representation of the second navigational segment includes a visual indication of a second safety characteristic of the second navigational segment; and in accordance with a determination that the respective mode of transportation is a second mode of transportation, different from the first mode of transportation:

the visual representation of the first navigational segment does not include any visual indication of any safety characteristic of the first type of safety characteristic; and the visual representation of the second navigational segment does not include the visual indication of the second safety characteristic of the second navigational segment.

18. The non-transitory computer-readable storage medium of claim 17, wherein:

in accordance with a determination to use a first vehicle for the respective mode of transportation, the navigation directions are first navigation directions; and in accordance with a determination to use a second vehicle, different from the first vehicle, for the respective mode of transportation, the navigation directions are second navigation directions, different from the first navigation directions.

19. The non-transitory computer-readable storage medium of claim 17, wherein the instructions further cause the electronic device to:

in response to the sequence of one or more inputs corresponding to the request to display the navigation directions:

in accordance with a determination that a setting to record user activity data while navigating using the navigation directions is enabled, collecting user activity data, from a second electronic device in communication with the electronic device, as a user navigates using the navigation directions; and in accordance with a determination that the setting to record user activity data while navigating using the navigation directions is not enabled, forgoing collecting the user activity data as the user navigates using the navigation directions.

20. The non-transitory computer-readable storage medium of claim 17, wherein the sequence of one or more inputs includes an audio input directed to a virtual assistant of the electronic device, and the instructions further cause the electronic device to:

in response to the sequence of one or more inputs and before a user begins navigating using the navigation directions, provide an audio response indicating (1) road conditions associated with the navigation directions or (2) elevation information associated with the navigation directions.

21. The non-transitory computer-readable storage medium of claim 17, wherein:

the request to display navigation directions includes a request for the navigation directions using a first mode of transportation, displaying the navigation directions includes displaying a visual representation of the navigation directions on a map, including a first respective segment accessible via the respective mode of transportation and a second respective segment not accessible via the respective mode of transportation, and a visual indication of a location at which the respective mode of transportation is not permitted, the first respective segment is displayed on the map with a visual characteristic having a first value, and the second respective segment is displayed on the map with the visual characteristic having a second value, different from the first value.

22. The non-transitory computer-readable storage medium of claim 17, wherein:

in accordance with a determination that a respective navigational segment of the navigation directions includes an elevation offset that satisfies one or more criteria, displaying the navigation directions includes displaying a visual indication of the elevation offset in association with the respective navigational segment.

23. The non-transitory computer-readable storage medium of claim 17, wherein the safety characteristic of a respective navigational segment comprises a visual indication that the respective navigational segment includes (1) a road having one or more lanes accessible both to automobiles and bicycles, (2) a road accessible to automobiles at one or more of a speed or volume greater than a predetermined threshold, (3) a bike path, (4) a road accessible to automobiles at one or more of a speed or volume less than a predetermined threshold, (5) a bike lane, (6) a hill at an incline that exceeds a predetermined threshold, (7) stairs, or (8) information about modes of transportation permitted to access the respective navigational segment.

24. The non-transitory computer-readable storage medium of claim 17, wherein the visual indication of the safety characteristic of the first navigational segment is a first visual indication of a third safety characteristic of the first navigational segment, the visual representation of the first navigational segment includes the first visual indication of the third safety characteristic of the first navigational segment and a second visual indication of a fourth safety characteristic, different from the third safety characteristic, of the first navigational segment, and the third and fourth safety characteristics are associated with the respective mode of transportation.

* * * * *

UNITED STATES PATENT AND TRADEMARK OFFICE
CERTIFICATE OF CORRECTION

PATENT NO. : 11,796,334 B2
APPLICATION NO. : 17/030091
DATED : October 24, 2023
INVENTOR(S) : Usama M. Hajj et al.

It is certified that error appears in the above-identified patent and that said Letters Patent is hereby corrected as shown below:

In the Claims

In Column 92, Line 29, in Claim 16, delete "claim 10," and insert -- claim 9, --.

Signed and Sealed this
Twenty-third Day of September, 2025

John A. Squires
*Director of the United States Patent and Trademark Office*